United States Patent
Lee et al.

(10) Patent No.: US 10,411,532 B2
(45) Date of Patent: Sep. 10, 2019

(54) SOFTWARE-DEFINED ELECTRIC MOTOR

(71) Applicant: Moovee Innovations Inc., Vancouver (CA)

(72) Inventors: Yee-Chun Lee, Millbrae, CA (US); Donald Ho-Yin Wong, Vancouver (CA)

(73) Assignee: Moovee Innovations Inc., Vancouver, British Columbia (CA)

( * ) Notice: Subject to any disclaimer, the term of this patent is extended or adjusted under 35 U.S.C. 154(b) by 145 days.

(21) Appl. No.: 14/525,182

(22) Filed: Oct. 27, 2014

(65) Prior Publication Data

US 2015/0171674 A1    Jun. 18, 2015

Related U.S. Application Data

(60) Provisional application No. 61/896,124, filed on Oct. 27, 2013.

(51) Int. Cl.
| | |
|---|---|
| *H02K 1/24* | (2006.01) |
| *H02K 3/28* | (2006.01) |
| *H02P 25/22* | (2006.01) |
| *H02K 29/00* | (2006.01) |
| *H02K 1/27* | (2006.01) |

(Continued)

(52) U.S. Cl.
CPC ............. *H02K 1/246* (2013.01); *H02K 1/276* (2013.01); *H02K 3/28* (2013.01); *H02K 16/04* (2013.01); *H02K 19/103* (2013.01); *H02K 29/00* (2013.01); *H02P 25/08* (2013.01); *H02P 25/22* (2013.01); *H02K 7/006* (2013.01); *H02K 21/14* (2013.01)

(58) Field of Classification Search
CPC .............................. H02K 11/0073; H02K 3/28

USPC .......................................................... 318/724
See application file for complete search history.

(56) References Cited

U.S. PATENT DOCUMENTS

| 4,322,665 A | 3/1982 | Landgraf |
| 4,937,513 A | 6/1990 | Hoemann et al. |
| (Continued) | | |

FOREIGN PATENT DOCUMENTS

| WO | 2010058278 A2 | 5/2011 |
| WO | 2012073290 A1 | 6/2012 |

*Primary Examiner* — Jorge L Carrasquillo
*Assistant Examiner* — Devon A Joseph
(74) *Attorney, Agent, or Firm* — McCarthy Tétrault LLP

(57) ABSTRACT

A motor is provided that is capable of electronically switching between operating in a high torque mode and a low torque mode. The high torque mode may be switched reluctance mode and the low torque mode may be synchronous reluctance mode. The motor has a stator having two sets of armature windings, and a rotor having two sets of flux barriers each adapted to shape a magnetic flux distribution generated by a corresponding one of the sets of armature windings. The stator may comprise a plurality of teeth circumferentially spaced apart from one another around a rotation axis of the motor. The armature windings may include switched reluctance armature windings, each wrapped around a single stator tooth, and synchronous reluctance windings, each wrapped around multiple adjacent stator teeth. An inverter and controller may be connected to each set of armature windings for controlling the electronic switching of the armature windings. The inverter and controller are operable to toggle the motor between the two modes of operation using pulse-width modulation-like techniques.

12 Claims, 30 Drawing Sheets

(51) Int. Cl.
*H02K 16/04* (2006.01)
*H02K 19/10* (2006.01)
*H02P 25/08* (2016.01)
*H02K 7/00* (2006.01)
*H02K 21/14* (2006.01)

(56) References Cited

U.S. PATENT DOCUMENTS

| | | | | |
|---|---|---|---|---|
| 5,168,187 | A * | 12/1992 | Baer | H02K 1/2793 310/185 |
| 5,481,147 | A * | 1/1996 | Kaplan | H02K 19/103 310/112 |
| 5,545,938 | A | 8/1996 | Mecrow | |
| 5,828,153 | A | 10/1998 | McClelland | |
| 5,990,657 | A * | 11/1999 | Masaki | B60L 15/025 318/139 |
| 6,242,884 | B1 | 6/2001 | Lipo et al. | |
| 6,255,755 | B1 | 7/2001 | Fei | |
| 6,628,105 | B1 | 9/2003 | Tankard | |
| 6,727,618 | B1 | 4/2004 | Morrison | |
| 6,784,634 | B2 | 8/2004 | Sweo | |
| 6,812,661 | B2 | 11/2004 | Maslov et al. | |
| 7,259,493 | B2 | 8/2007 | Oshidari et al. | |
| 7,863,789 | B2 | 1/2011 | Zepp et al. | |
| 8,138,652 | B2 * | 3/2012 | Davis | H02K 11/048 310/114 |
| 8,390,163 | B2 | 3/2013 | Saito | B60K 6/448 310/156.53 |
| 2004/0232800 | A1 * | 11/2004 | Seguchi | F02N 11/04 310/266 |
| 2005/0151491 | A1 * | 7/2005 | Nakai | H02P 5/747 318/98 |
| 2007/0024220 | A1 * | 2/2007 | Shirazee | H02K 3/28 318/400.41 |
| 2010/0019613 | A1 * | 1/2010 | Saban | H02K 1/02 310/216.086 |
| 2011/0186320 | A1 * | 8/2011 | Ito | B25B 21/008 173/176 |
| 2011/0298310 | A1 * | 12/2011 | Ross | H02K 41/06 310/20 |
| 2012/0032622 | A1 * | 2/2012 | Lipo | H02P 21/0089 318/400.27 |
| 2013/0094979 | A1 * | 4/2013 | Schrems | H02K 23/36 417/410.1 |
| 2013/0106226 | A1 * | 5/2013 | Aoyama | H02K 21/14 310/156.53 |
| 2013/0106227 | A1 * | 5/2013 | Aoyama | H02K 21/14 310/156.53 |
| 2013/0106228 | A1 * | 5/2013 | Aoyama | H02K 21/14 310/156.53 |
| 2013/0119810 | A1 * | 5/2013 | Aoyama | H02K 21/145 310/156.53 |
| 2013/0134839 | A1 * | 5/2013 | Boughtwood | B60L 7/006 310/67 R |
| 2014/0145547 | A1 * | 5/2014 | Nakano | H02K 21/16 310/216.069 |
| 2014/0148984 | A1 * | 5/2014 | Nishi | B60K 6/485 701/22 |
| 2015/0001975 | A1 * | 1/2015 | Nakazono | H02K 1/06 310/152 |
| 2015/0137648 | A1 * | 5/2015 | Kato | H02K 1/276 310/156.53 |
| 2015/0171674 | A1 * | 6/2015 | Lee | H02K 1/246 318/724 |
| 2015/0295455 | A1 * | 10/2015 | Nemoto | H02K 21/14 310/216.094 |
| 2016/0049835 | A1 * | 2/2016 | Fukumoto | H02K 1/246 310/46 |

* cited by examiner

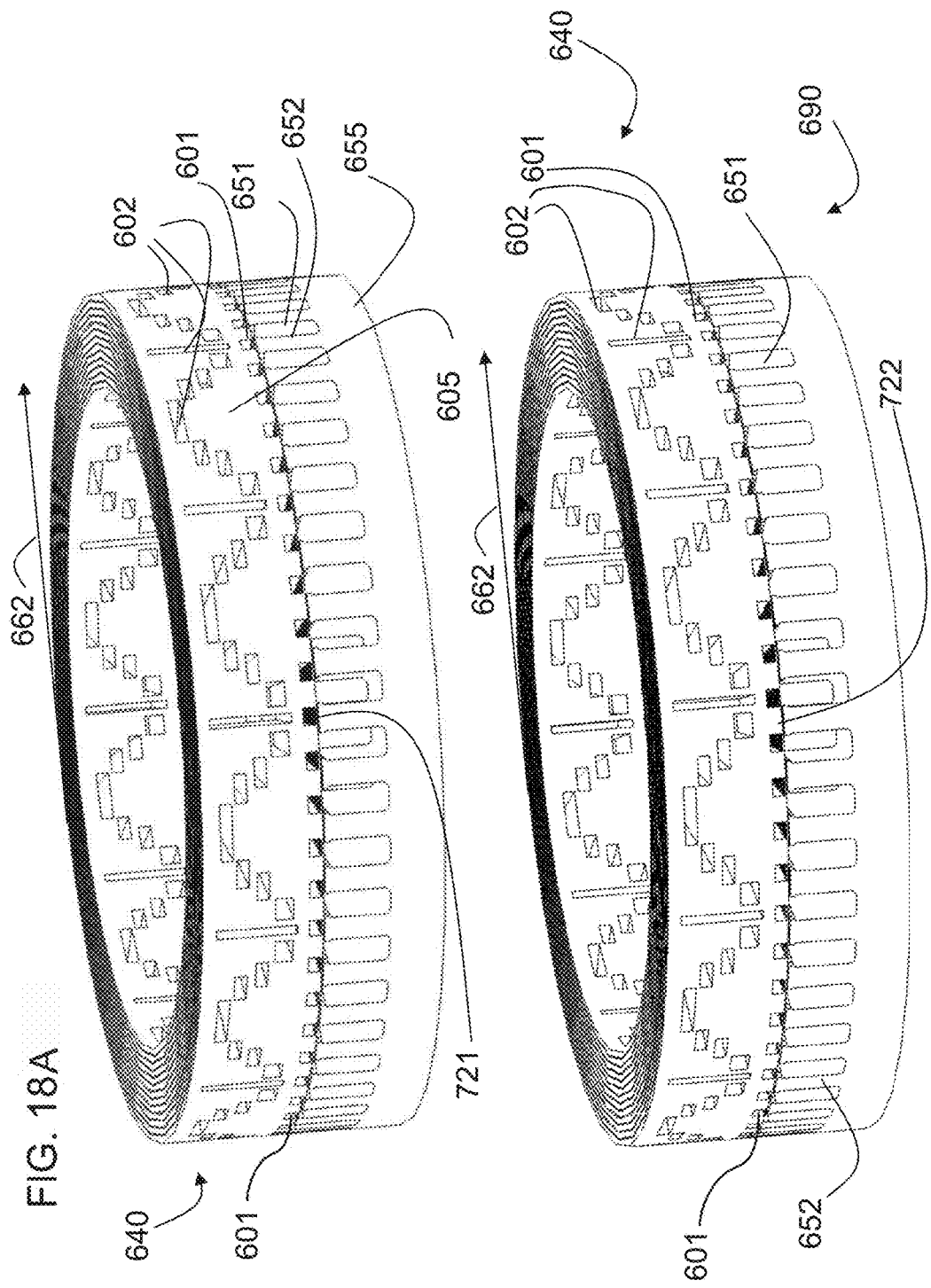

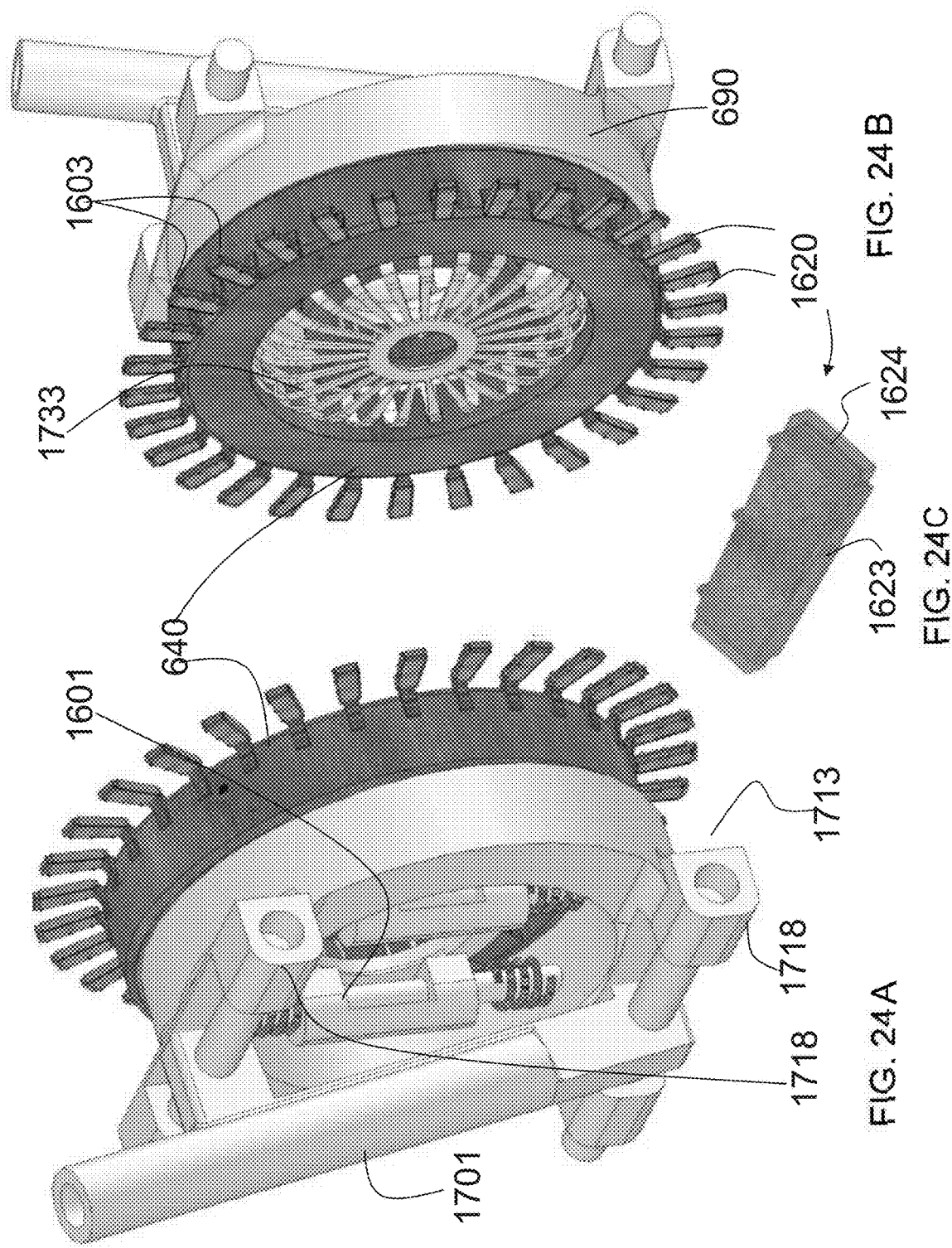

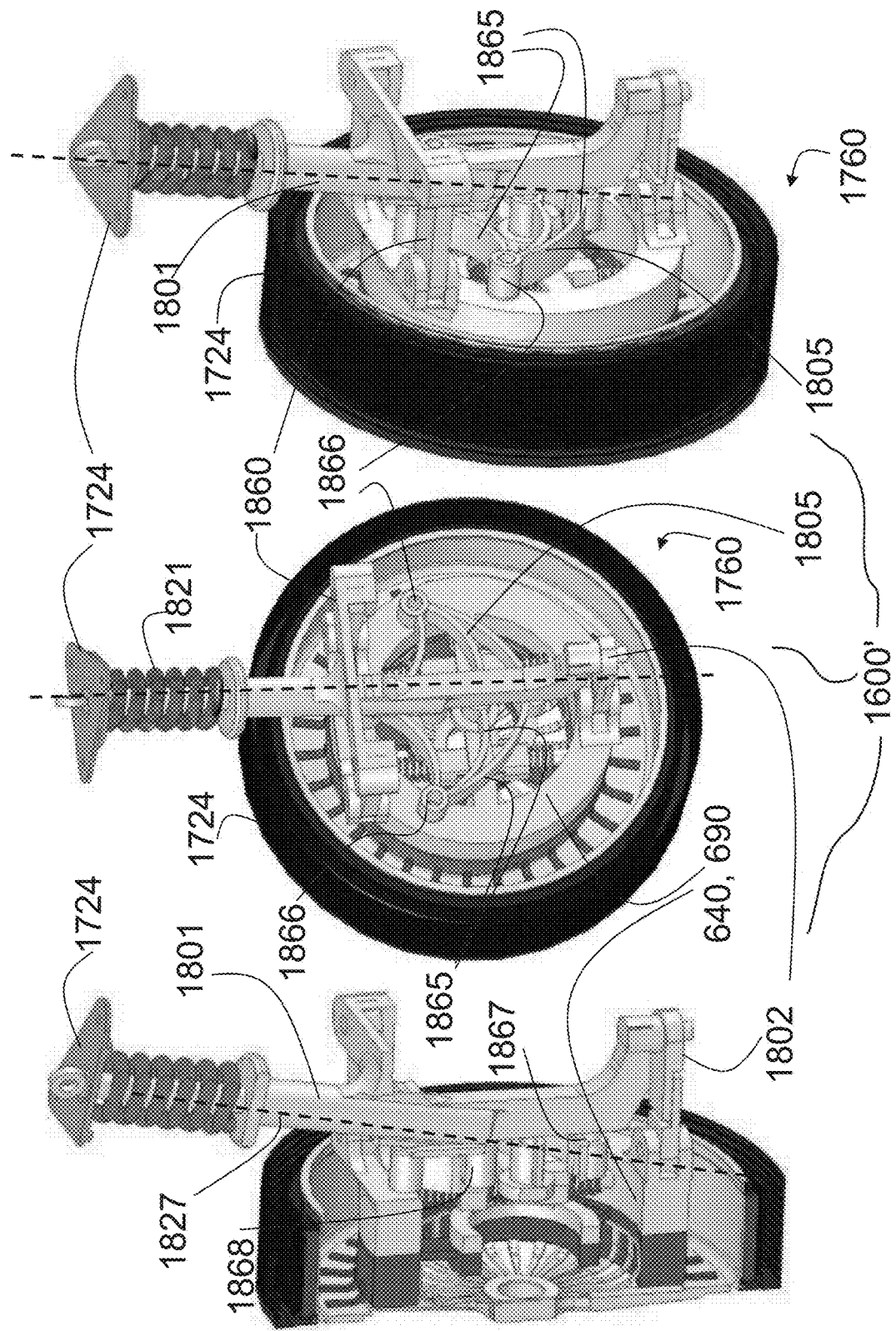

SOFTWARE-DEFINED ELECTRIC MOTOR

RELATED APPLICATIONS

This application claims the benefit of the priority of U.S. application No. 61/896,124 filed 27 Oct. 2013, which is hereby incorporated herein by reference.

TECHNICAL FIELD

The technology described herein relates to electric motors. Particular embodiments relate to apparatus and systems for providing an electric motor for an electric vehicle with motoring and regenerative braking capabilities.

BACKGROUND

Rising oil prices and global climate changes are driving efforts to phase out carbon dioxide-emitting, energy inefficient internal combustion-powered vehicles in favour of cleaner and more energy-efficient vehicles. Such eco-friendly vehicles may include electric vehicles and electric hybrid vehicles incorporating electric motors.

Conventional electric motors are generally single-speed machines. Improvements in digitally controlled power electronics have led to the emergence of electric motors whose speeds may be digitally controlled. Moreover, such machines can act as a generator through regenerative braking.

The ability of electric motors to alternate between motoring and regenerative braking functions, combined with their relatively wide speed range, may allow for the delivery of electric vehicles with similar performance as internal combustion-powered vehicles, but with improved energy efficiency and a reduced carbon footprint. However, even with such advantages, current electric vehicles cannot compete with internal combustion-powered vehicles in range of speed, weight and cost, in part because of the substantial increase in the energy storage (i.e. the battery pack) required for electric vehicles.

One way to make electric vehicles a more attractive option for consumers is to reduce the cost and complexity of the electric drive train. Typically, there is a desire for electric drive trains need to satisfy various performance objectives, which may include: high starting and low speed climbing torques, high regenerative and non-regenerative braking torques, high overall power conversion and energy efficiencies, and low motor noises and torque ripples at higher speeds. However, to satisfy such objectives, electric drive trains often require complex, bulky, heavy and inefficient speed reduction gears. This in turn makes it difficult to free up space for a larger electric vehicle battery.

Conventionally, automobiles are designed to have the minimum power engine or electric motor and drive train that can meet the desired performance envelope. Take for example, a 1400 kg passenger car with design objectives of accelerating from 0-60 mph (approximately 0-100 km/h) in 8 seconds, maintaining 80 mph (approximately 130 km/h) steady speed at 6% grade, and providing a total braking deceleration of 0.8 $g_0$ (7.8 m/s$^2$). An engine or motor sized for this specification would be rated for 160 hp (approximately 120 kW) to meet the 0-60 mph acceleration design objective, and 50 hp (approximately 37 kW) to meet the 6% grade design objective. Consequently, a 160 hp engine or motor is typically selected since it satisfies all of the power train objectives. However, this is not the most energy efficient solution, since the peak power for acceleration is typically needed less than 1% of the time and the 6% grade is encountered infrequently except in a mountainous area. The vehicle would also need to include a separate large and powerful mechanical braking system.

A hybrid vehicle aims to address the foregoing problems by incorporating both an internal combustion engine and an electric motor. This allows the hybrid vehicle to use a smaller engine, relying on the electric motor to provide the extra performance boost when desired. For the design specification of the 1400 kg passenger car in the above example, the electric vehicle's internal combustion engine would handle the 6% grade while the electric motor would handle the 0-60 mph acceleration. However, it is a challenge to supply an electric motor to provide a rated 110 hp or 81 kW (for example), to provide the performance boost desired. Instead, the electric motor is generally derated to 50 hp or 37 kW, for example, and a super capacitor and a boost converter are used to turbo charge the motor to 110 hp or 81 kW for the brief period needed to achieve the 0-60 mph acceleration design objective. This is accomplished by energizing the motor stator winding with sufficient current to momentarily increase the torque and power, since both are proportional to the stator phase current in a magnetic flux saturated core. Although a hybrid vehicle is fueled entirely by petroleum fuel, its ability to run the undersized engine more efficiently at or near its optimal speed range most of the time, together with the regenerative braking capabilities and load balancing between the engine and motor, make it a more fuel efficient vehicle than a conventional petroleum internal combustion-powered vehicle.

Current hybrid vehicles still generally rely on the use of two different power trains, using mechanical and electro-mechanical switching and coupling to combine the power trains. Thus, hybrid vehicles can be complex to manufacture, making them generally more expensive than internal combustion-powered vehicles.

Electric vehicles and electric hybrid vehicles can provide regenerative braking capabilities. Typically, regenerative braking cannot provide braking forces similar to those provided by engine braking in conventional internal combustion-powered vehicles. In electric or electric hybrid vehicles, regenerative braking generally provides only about a tenth of the full braking torque desired. Conventional friction brakes (mechanical brakes) are still typically needed to supplement regenerative braking.

There has been some effort in the field of active or regenerative suspension to provide electric motors and generators by interconverting linear motions and circular motions through mechanical means such as a ball screw. Such designs typically have low conversion efficiencies and may generate only enough power to supply the electricity desired for the controllers and the actuators. Hence, these are customarily termed self-powered or zero-powered active suspension systems, which serve to deemphasize the electricity regeneration aspect.

For example, FIG. 1 shows a rotary regenerative shock damper 100 which converts linear vibration energy to electrical energy using a linear to circular motion converter. Damper 100 has a ball screw 107 consisting of a vertical spiral screw shaft or a rack and pinion 103 which is coupled to a sliding nut 102. Nut 102 is in turn connected to a vertical slider 106 with one end connected to the vehicle chassis. Nut 102 is prevented from rotating by slider 106, which forces spiral screw shaft 103 to rotate. The damper includes a coaxial coil spring 104 which provides the suspension force. This type of damper is called a spring-strut type damper. Alternatively, the coil spring or other spring types could be used separately to isolate the suspension function from the damping function. Spiral screw shaft 103 is geared to a planetary gear set 101 to amplify its rotation speed, and the geared up spinning motion is fed to a DC motor/generator 105 (also referred to herein as a motor or generator depending on the context). In the damper mode, generator 105 converts mechanical linear vibrations into electricity. In the actuation mode, motor 105 drives ball screw 107 directly to extend slider 106 in and out against the chassis to dynamically change the suspension geometry of the vehicle.

Several inefficiencies are apparent from the design of this rotary regenerative shock damper 100. First, the ball screw mechanism for converting linear vibrations to circular motion imparts considerable frictional resistance to the movement of nut 102 against spiral screw shaft 103. This makes the linear to rotational conversion inefficient. The inefficiency is further hampered by planetary gears 101 which become inefficient above a certain gear ratio (typically in the order of 30:1 to 100:1 for the suspension RMS speed to the base speed of the generator) to enable the use of a lightweight motor/generator 105. Second, the conversion from linear to rotational motion is not unidirectional, but consists of rapid back-and-forth rotational movements. Due to the inherent rotational inertias of both the rotor of motor 105 and the mechanical converter (planetary gear set 101 and ball screw 107 itself), and the compliance and deflection of the electromechanical chain which introduces significant backlash, such a regeneration mechanism would be unable to capture the higher frequency vibrations which would merely cause the damper drive train to oscillate at various resonance frequencies of the drive train. Third, because of the randomness of the back-and-forth rotation of the rotor of generator 105, the instantaneous rotation speed tends to stay far below the base speed for generator 105. Since generator 105 only becomes efficient when the rotation speed is at least a finite fraction of the base speed due to ohmic heating, the average mechanical to electric conversion efficiency is low. Fourth, the electromechanical drive train is heavy, complex and costly to build. Since a suspension damper adds to both the sprung weight and the unsprung weight of the vehicle, any gain in ride comfort and road handling performance derived from such a damper is compromised by the added unsprung weight. The above criticisms also apply to other regenerative suspension designs which rely on mechanical linear to rotational conversions such as those incorporating rack and pinion types, step-up gear boxes and rotational electric generators.

FIG. 2A shows a direct electromechanical conversion damper or shock absorber 200. Damper 200 directly uses the relative linear motion between a linear magnetic pole stack 220 (shown in FIG. 2B) consisting of an array of alternating permanent magnetic rings 206, 207, and linearly-wound field coil stack 210. Pole stack 220 and field coil stack 210 together provide a linear electromagnetic motor/generator 230 (also referred to herein as a motor or generator depending on the context) which generates power based on Faraday's law of magnetic induction. If linear field windings or coils 203 can be made sufficiently lightweight, damper 200 would in theory be able to respond to higher vibration frequencies, thereby capturing a larger spectrum of the road noises and yielding higher electromechanical conversion efficiencies. However, despite such promises, the inherent lack of magnification of the linear motion makes it difficult to develop a lightweight linear electromagnetic motor 230 to effectively capture relatively small linear motion (i.e. movements with a linear velocity typically below 10 cm/s). Motor 230 is generally effective at capturing linear motion only at very high vehicle speeds and on rough road surfaces. In consequence, damper 200 is unable to convert much of the linear vibrations to electricity, and the corresponding effective damping coefficients are typically lower than those achieved by dampers relying on linear to circular conversion and step-up gearing. Although not as complex as a rotary regenerative shock damper, manufacturing a linear electromagnetic damper 200 is still challenging due to the desirability of mounting a large number of magnetic rings 206, 207 and windings 203 and the extremely small air gaps desirable to pick up minute vertical displacements typical of road irregularities. Further, it is desirable that damper 200 be larger and heavier than a rotary regenerative shock damper to achieve similar damping coefficients, thus compromising its performance.

There is a general desire for apparatus and systems that address and/or ameliorate at least some of the aforementioned problems. For example, there is a general desire to provide an electric motor which can dynamically adapt to supply the instantaneous power train demands of a vehicle but still satisfy high efficiency design objectives. There is a general desire to provide an electric motor that can function as a generator through regenerative braking and provide sufficient braking torque to meet vehicle braking demands. There is a general desire to provide an electric motor that enables regenerative damping of lateral vibrations typically encountered when a vehicle drives on a road.

The foregoing examples of the related art and limitations related thereto are intended to be illustrative and not exclusive. Other limitations of the related art will become apparent to those of skill in the art upon a reading of the specification and a study of the drawings.

SUMMARY

Aspects of the technology described herein provide an electric motor capable of switching between two distinct motor types or modes of operation. In some embodiments, the motor is capable of operating in either a high efficiency mode or a high torque mode depending on the current application and performance objectives. In particular embodiments, the high efficiency mode is a synchronous reluctance mode, and the high torque mode is a switched reluctance mode. In some embodiments the motor is capable of rapidly toggling back and forth between the modes to function in a hybrid of the modes.

Certain aspects of the technology described herein provide methods and apparatus for software-defined electric machinery capable of being switched from one motor configuration to another. Such switching may include fast pulse-width modulation (PWM)-like switching in particular embodiments. The multiple configurations may include: a high efficiency motoring mode, a high torque motoring mode, a high efficiency regenerative braking mode, a high torque braking mode, an active suspension mode, a regenerative damper mode, an efficient reverse motoring mode, and a high torque reverse motoring mode.

Further aspects of the technology described herein provide methods and apparatus for performing real time sensing and monitoring of the status of an electric machine and its environment and for dynamically reconfiguring the machine hardware configuration.

In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed herein are to be considered illustrative rather than restrictive.

FIGS. 18A and 18B respectively show perspective views of the stator and the rotor at one particular instance of time and the stator and the rotor at a later instance of time where the rotor has rotated by a slight amount relative to the stator.

FIGS. 24A and 24B are perspective views of the FIG. 23 motor suspension system with the addition of a steering spindle and disc spring. FIG. 24C depicts the bushings for the spoke springs of the motor suspension system.

FIG. 26A is a side cross sectional perspective view, FIG. 26B is a rear perspective view, and FIG. 26C is a perspective side view of a motor suspension system according to another embodiment.

DESCRIPTION

Figure 1:
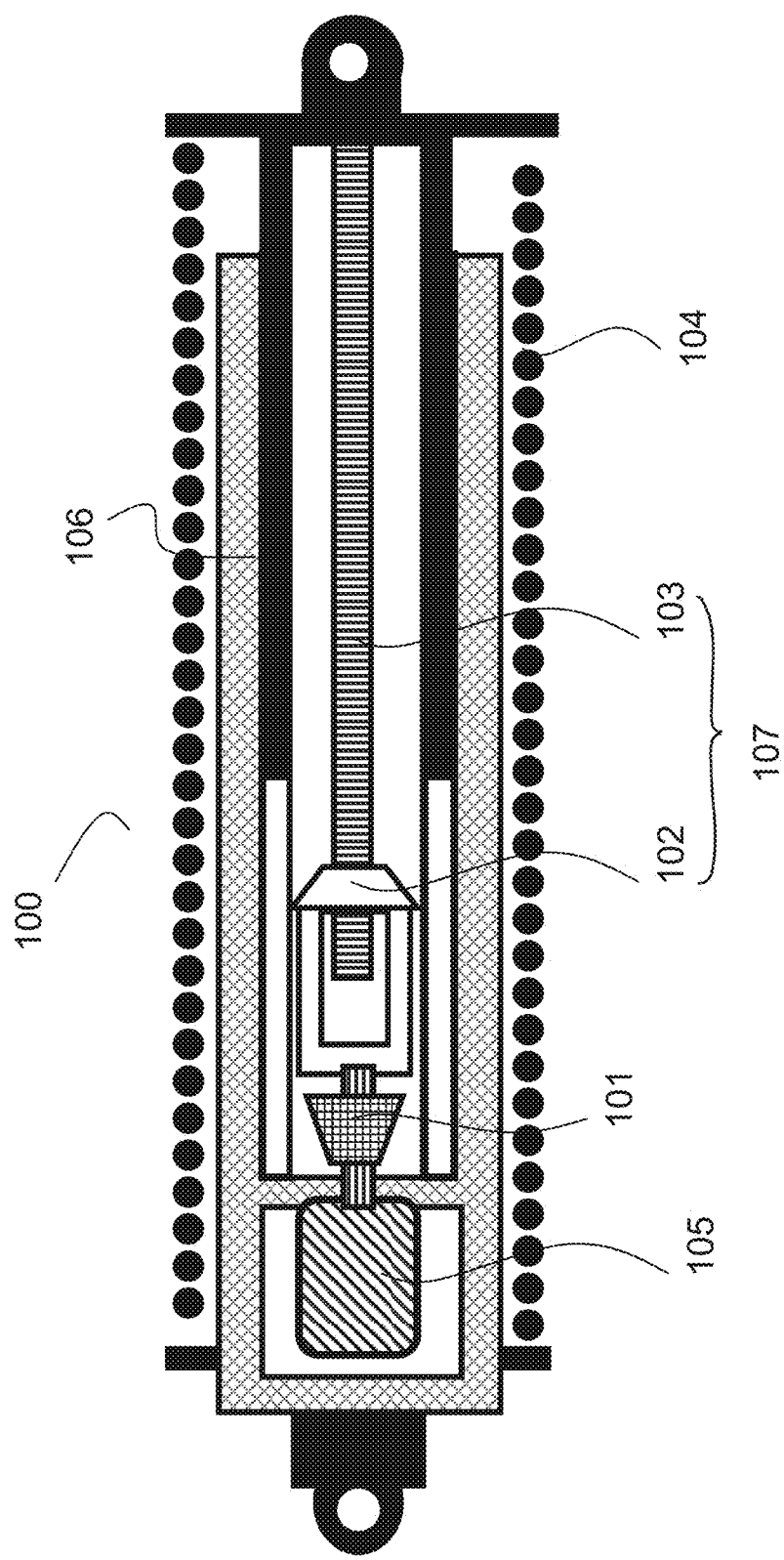
FIG. 1 illustrates a conventional DC generator-based rotary regenerative shock damper relying on linear-to-rotary motion conversion and step-up gearing.
Figures 2A, 2B:
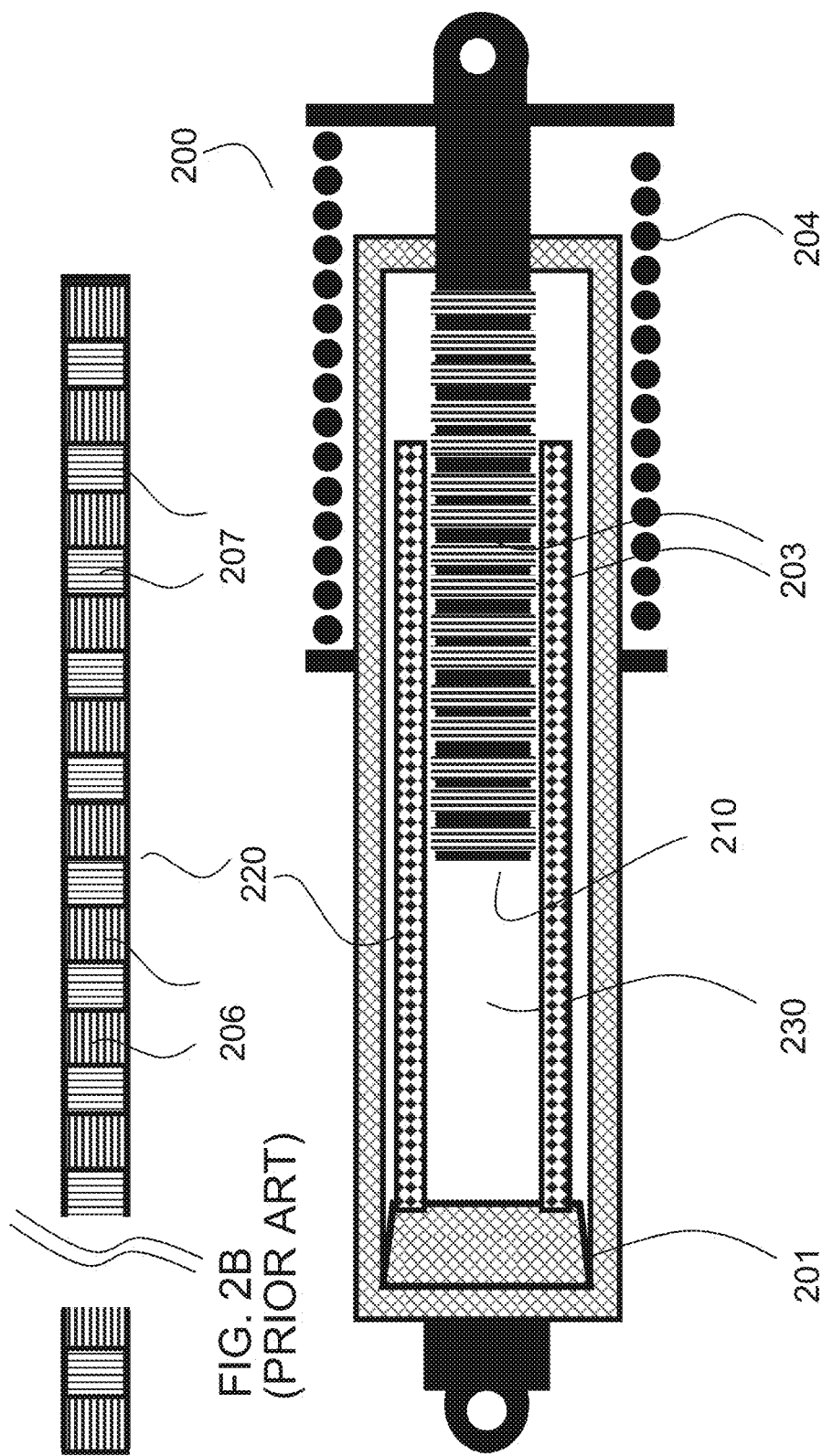
FIG. 2A illustrates a conventional DC generator-based direct linear electromagnetic suspension damper.
FIG. 2B illustrates a magnetic pole stack that may be used in the damper of FIG. 2A.

Throughout the following description, specific details are set forth to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Particular embodiments provide an electric motor for electric vehicles. The motor is capable of operating in one of two distinct modes of operation or motor types. The first mode is a high efficiency/low torque mode. The second mode is a high torque/high power mode. In particular embodiments, the first mode (high efficiency mode) is a synchronous reluctance mode, and the second mode (high torque mode) is a switched reluctance mode. A synchronous reluctance motor is one exemplary type of motor that is suitable for maintaining high efficiency operation at higher speeds or once the vehicle has reached a certain threshold speed (e.g. such as a speed above 5 km/h). A switched reluctance motor is one exemplary type of motor that is suitable for high torque operations, typically at lower speeds (e.g. such as a speed below 5 km/h). In some embodiments, other types of motors may be used for the high efficiency mode and/or for the high torque mode.

According to particular embodiments described herein, the hardware structure for the motor remains constant. In particular embodiments, the motor includes only one stator and one rotor. Using high-speed electronic switches, the motor is digitally controllable to toggle between the two modes. In this respect, the motor can be referred to as a "software-defined" or "cognitive" motor.

The choice of mode depends on the instantaneous performance objectives of the electric vehicle. To operate a vehicle more efficiently, high efficiency mode (e.g. synchronous reluctance mode) can be used most of the time. For short periods when bursts of power are desired (e.g. high acceleration, hill climbing, starts or stops), high torque mode (e.g. switched reluctance mode) can be used. For certain applications, a hybrid of the two modes can be used by toggling between high efficiency mode (e.g. synchronous reluctance mode) and high torque mode (e.g. switched reluctance mode) using fast pulse-width modulation (PWM)-like switching or other techniques.

During vehicle braking, the motor can be operated to function as a generator through regenerative braking. The motor/generator can be operated in either high efficiency or high torque mode (or a hybrid of the two modes) depending on the performance objectives. In part because of the motor's ability to toggle between different modes of operation, all of the vehicle braking objectives can be supplied by the motor/generator without the friction braking that is typically required to supplement regenerative braking in existing electric or hybrid electric vehicles.

In particular situations, the motor rapidly switches between a first mode and a second mode. The motor may switch back and forth between the two modes to function in a hybrid of the two modes. This enables a balancing of trade-offs between torque output and speed at any speed, comparable to a conventional electric machine coupled to a continuously variable transmission box. However, the fast switching between high efficiency (low torque) and high torque modes in accordance with the embodiments described herein has no conventional mechanical analogy since it would be impractical to rapidly switch between such modes mechanically. The design of the hybrid winding circuits combined with the fast electronic duty cycle switching between two distinct modes of motor operation according to the embodiments described herein make it practical to achieve continuous gearing for an electric motor/generator.

Particular embodiments provide a software-reconfigurable electromagnetic motor having two sets of armature coils providing distinct physical attributes. Each set of armature coils is driven by a respective inverter which translates software commands into physical voltage/current waveforms to excite the armature coils. A power switching control system is provided which is capable of rapid millisecond switching between the application of driving waveforms to the different sets of coils. IN some embodiments, the control system hybridizes the distinct physical attributes, providing for any linear convex combination thereof. In particular embodiments, the distinct physical attributes are those associated with low torque/high speed and high torque/low speed modes of operation. The hybridization of the attributes would therefore yield any torque-speed combination, similar to what is achieved by a conventional continuous variable speed transmission coupled to an electric motor. However, unlike such conventional machines, the speed/torque transformation in the embodiments described herein can be accomplished without any mechanical leverage mechanism, using instead only solid state switches controlled by software.

In certain embodiments the motor includes a multi-slotted laminated stator with two sets of phased copper windings to generate phased rotating magnetic fields when the field windings are selectively energized. The motor also includes a laminated rotor with multiple sets of slots or orifices with distinct spatial periodicities. Some of these slots are optionally filled with permanent magnets in some embodiments. A plurality of magnetic flux circuits is formed upon excitation of the stator windings, exerting a torque on the rotor to commence spinning, accelerating, or stopping depending on the stator phased rotating magnetic fields. A software-controlled solid state power switching network controls the excitation of the stator windings. The stator windings can be excited selectively, either singly or in a pre-specified combination of windings.

The selective excitation of the stator windings, as controlled by the software, causes the stator magnetic field to exhibit specific shapes, and facilitates the output of distinct combinations of physical attributes or characteristics of the motor. These include combinations of physical attributes or characteristics suitable for: high efficiency forward and backward motoring, high torque forward motoring, high efficiency regenerative braking, regenerative back braking, high starting and pull-away torque, high torque dissipative braking, regenerative suspension damping (in which the relative displacement between the stator and rotor is no longer rotational, but linear), and active suspension leveling (in which the shaped stator field in combination with the slotted rotor promotes a vertical force rather than a rotational torque to help adjust the suspension travel). The attributes or characteristics may include, for example, torque, power efficiency, rotational speed, heat generation (a negative attribute which would limit the operation duration of the motor), regenerative braking, forward motoring, backward motoring, high torque braking (non-regenerative or partially regenerative, or simulating a mechanical brake), and/or the like.

In particular embodiments, a MIMO (multiple-input-multiple-output) controller (or a set of non-overlapping or redundantly overlapped controllers) is used with a plurality of sensors and a corresponding set of reference inputs. The sensors monitor the outputs of the motor. These outputs are compared against corresponding reference inputs to generate an error vector. The error vector is provided to the controller, which computes a corrective action in accordance with a suitable control algorithm or an adaptive learning program for the purpose of maintaining overall system stability and to minimize future error vectors. The corrective action may include providing an input to the solid state power switching network so that a particular set of stator windings is selectively excited in a pre-specified manner to promote certain distinct physical attributes of the motor.

A motor in accordance with any one of the embodiments described herein can be installed in each wheel of a vehicle using a direct-drive "in-wheel" or hub motor design as shown in the embodiments illustrated in FIGS. 23 to 26.

Figure 5:
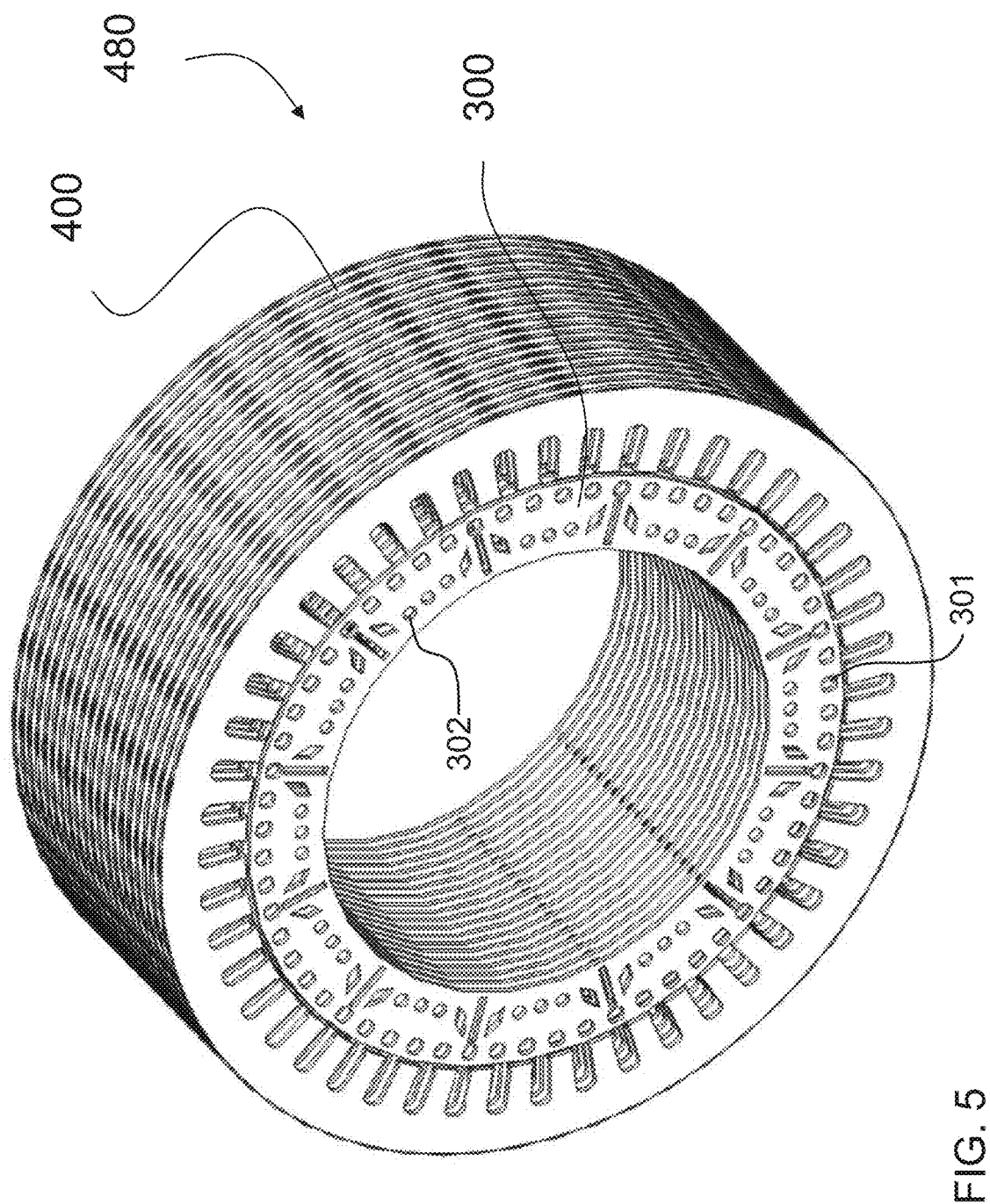
FIG. 5 illustrates the FIG. 3 rotor paired with the FIG. 4 stator to provide the synchronous reluctance/switched reluctance motor.

FIG. 5 shows a motor 480 according to one embodiment that is capable of toggling between synchronous reluctance and switched reluctance modes of operation. The FIG. 5 embodiment is directed to a "radial flux" configuration, as explained in more detail below. Motor 480 includes a rotor 300 (also referred to herein as a rotor core) and a non-rotating armature or stator 400 (also referred to herein as a stator core). The synchronous reluctance mode may be employed as the "main" or primary mode of operation (e.g. high efficiency mode). The switched reluctance mode may be employed as the "auxiliary" or secondary mode of operation (e.g. for short periods when bursts of power are needed).

By way of explanation, reluctance motors are based on the principle that a magnetic rotor core (e.g. motor core 300) will tend to move to complete a magnetic flux path which has the least magnetic reluctance, thereby generating torque. There are various types of reluctance motors, including synchronous reluctance motors and switched reluctance motors which are the subject of particular embodiments of the technology described herein.

A synchronous reluctance motor is a type of brushless AC machine, having an equal number of stator poles and rotor poles. Only the stator incorporates armature windings. When a temporally sinusoidal armature current is applied to the spatially sinuosoidal stator windings, a spatial sinusoidally distributed magnetomotive force is introduced in the air gap between the stator and rotor that attempts to align a rotor pole with the nearest stator pole. The stator teeth are arranged to provide holes or internal flux barriers which direct the magnetic flux; in addition slots may be provided in the rotor to serve as flux barriers. As the rotor rotates, changes in reluctance of the flux path through the stator and rotor produce a synchronous torque. No torque is produced if the major flux path is through one of the least reluctance paths within the rotor core. Any deviation from the least reluctance path generates a net torque. For motoring operations, the rotating magnetic field generated by the stator current leads the rotor's least reluctance path. Conversely, for regenerative braking operations, the major axis of the rotating magnetic field lags the rotor's least reluctance path. Once the rotor reaches the synchronous speed (the speed at which the rotor rotates in step with the rotating magnetic field of the stator), the advance angle (or retardation angle) between the rotating magnetic field and the rotor's least reluctance axis (called the d-axis) will remain fixed. The larger the load torque, the higher the advance angle. When the drive frequency is fixed, the rotor cannot reach the synchronous speed by itself and a "kick start" is needed. With a variable frequency drive (VFD) controller or a more advanced PWM controller, the rotation frequency of the magnetic field can be controlled, and no kick starting is necessary. With digital PWM control, both the rotor speed and the torque can be changed by varying the drive frequency and advance angle. For smooth operation, it is generally desirable for a synchronous motor to have at least two phases, but three-phase operation is generally common due to its high efficiency and low torque ripple.

A switched reluctance motor is a type of brushless stepper machine. Like the synchronous reluctance motor, only the stator contains armature windings. When the stator windings are energized, the magnetic reluctance of the rotor produces a magnetomotive force that attempts to align a rotor pole with the nearest stator pole. Unlike the synchronous reluctance machine, the switched reluctance machine is driven with a DC voltage supply that energizes the stator coils in succession. In addition, the switched reluctance motor generally has a fewer number of rotor poles than stator poles. This can reduce torque ripple and also allows for torque to be generated from any position since the poles are never aligned simultaneously.

A synchronous reluctance motor employs a sinusoidally distributed armature current so that all stator poles are excited at once. By contrast, in a switched reluctance motor, only a small fraction of the armature windings are fired at any given time. For example, in a switched reluctance motor with a 6/4 configuration (6 stator poles and 4 rotor poles) only one stator pole pair is excited at any time. Because the armature current is not distributed among all windings, the concentration of armature current in a switched reluctance motor tends to generate more copper loss (e.g. ohmic loss due to current flow in the windings) than a synchronous reluctance motor. On the other hand, the stator current of the switched reluctance motor typically is kept to a maximum value during firing to ensure maximum torque production, whereas the armature current in a synchronous reluctance motor must vary sinusoidally. Although the torque generated by a synchronous reluctance motor is nearly constant once synchronous speed has been reached, it is generally smaller than the average torque value produced by a similarly configured switched reluctance motor. These characteristics make synchronous reluctance mode more suitable for high efficiency operations (once a certain vehicle speed has been reached) and switched reluctance mode more suitable for high torque operations.

For synchronous reluctance machines, the stator pole number equals the rotor pole number. For switched reluctance machines, there is usually a fixed ratio between the stator pole number and the rotor pole number. Typically that ratio is either 3/2 or 4/3 (although other ratios are possible). So, for example, if there are 72 stator poles, then there are 48 rotor poles or saliencies if the stator/rotor ratio is 3/2, or 54 rotor poles or saliencies if the stator/rotor ratio is 4/3. Smaller switched reluctance machines typically have a 6/4 configuration (i.e. 6 stator poles and 4 rotor poles). Switched reluctance machines with a stator/rotor ratio of 3/2 can be driven conveniently by a three-phase converter. Generally, the higher the pole number, the higher the torque generation capability for the machine, whether it is in synchronous reluctance or switched reluctance mode of operation.

The stator core of the synchronous reluctance motor is typically slotted to generate a spatially sinusoidal magnetomotive force. The slotting of the stator core also introduces the saliencies desired for the switched reluctance motor. Since the generated torque in a switched reluctance motor has a nearly linear relationship to the number of stator (and rotor) saliencies and there are far more slots than there are synchronous stator poles, a switched reluctance motor designed for the saliencies introduced by slotting can generate far higher torque than could the synchronous reluctance motor itself. The flux barrier structure of the synchronous reluctance motor can also be designed to "resonate" with the stator saliencies. Thus, the synchronous reluctance motor and switched reluctance motor can advantageously use the same stator and rotor cores with little increase in space requirement other than the space required for the additional switched reluctance windings. As few as a single saliency winding (a single winding per salient stator pole) may be used for switched reluctance mode operation.

Figure 3:
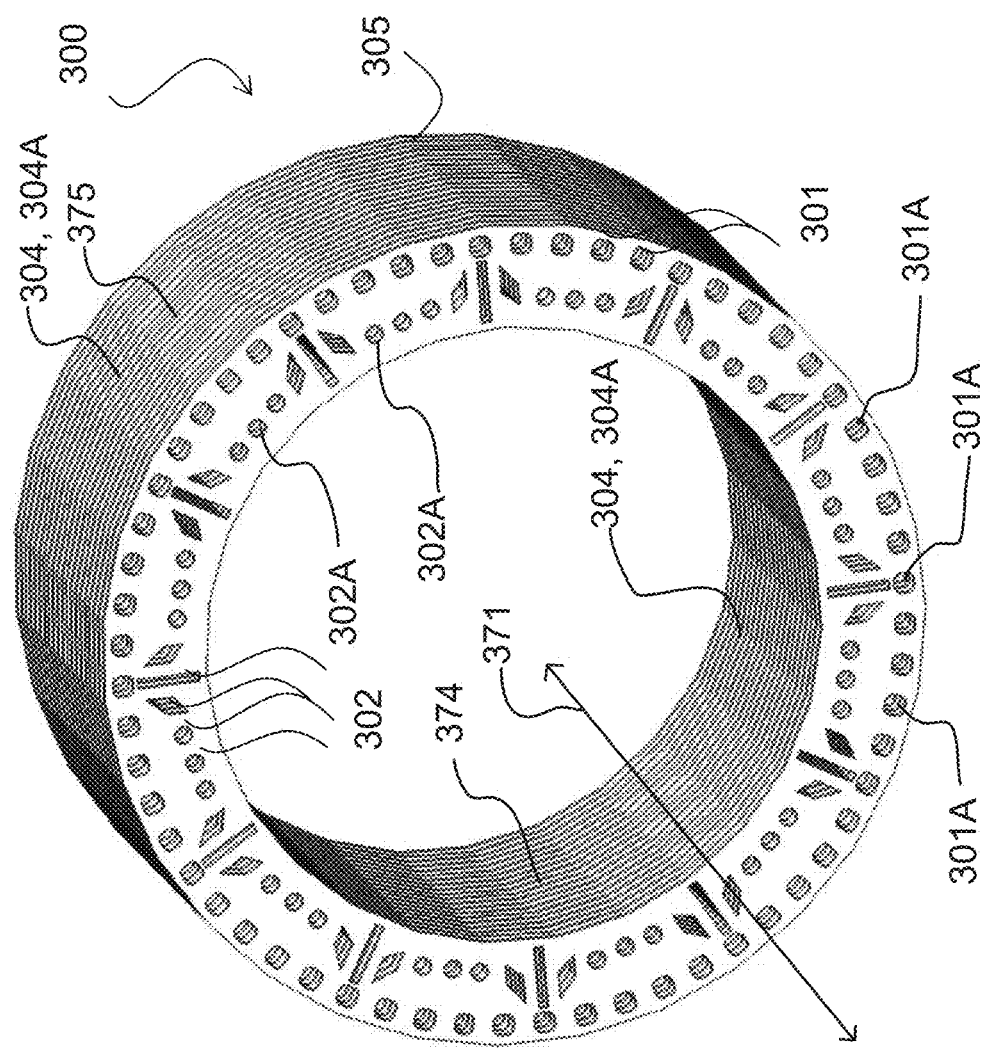
FIGS. 3 and 4 illustrate a rotor and a stator respectively of a synchronous reluctance/switched reluctance motor according to one embodiment.

FIG. 3 illustrates rotor 300 of the FIG. 5 motor 480. Rotor 300 may be made from silicon steel or other magnetic material with high magnetic permeability. In particular embodiments, the magnetic material of rotor 300 has comparably high conductivity. (While non-conductive magnetic materials such as ferrite may also reduce or eliminate eddy current, ferrite is less permeable to magnetic flux than metallic ferromagnetic materials. This may present challenges to achieving minimum magnetic reluctance for the rotor, thereby lowering its maximum power density and power efficiency.)

Rotor 300 may be laminated to prevent large scale eddy current from forming by blocking the dominant eddy current flow path. Rotor 300 may be laminated using materials with high magnetic permeability and mechanical strength, such as silicon steel, mu-metal, and permalloy. For radial flux motor geometry, as is the case in the illustrated embodiment of FIGS. 3, 4 and 5 (where the magnetic flux is in the radial direction at or around the air gap between the rotor and stator), the lamination may be in the axial direction 371. As illustrated, a lamination 304 of rotor 300 may be provided by stacking planar magnetic laminates 304A along axial direction 371, on both the rotor's radially inwardly facing peripheral surface 374 and radially outwardly facing peripheral surface 375.

As seen in FIG. 3, rotor 300 has a plurality of spaced-apart slots or cavities 301A, 302A. These slots serve as flux barriers to increase the magnetic reluctance in regions occupied by the slots for the purpose of assisting and guiding the flow of the magnetic field through rotor 300. Two sets of flux barriers with different angular periodicities are illustrated in FIG. 3. One set of flux barriers 301, comprising sixty (60) equally-spaced slots 301A in the case of the illustrated example embodiment, is located relatively close to the radially outer perimeter of the rotor (or relatively far from the rotation axis of the motor). Slots 301A provide flux barriers for the auxiliary or switched reluctance mode of operation. A second set of flux barriers 302, comprising seventy-two (72) slots 302A arranged in twelve equally spaced subsets of identical slot patterns in the case of the illustrated example embodiment, is located relatively further away from the radially outer perimeter of the rotor (i.e. closer to the radially inner perimeter of the rotor and closer to the rotation axis of the motor). Slots 302A act as flux barriers for the synchronous reluctance mode of operation. Slots 301A, 302A shape the magnetic flux paths so that non-salient rotor poles are located between adjacent flux barriers or slots.

In particular embodiments, the radially outer set of flux barriers 301 (the switched reluctance flux barriers) is predisposed to resonate strongly with a rotating stator magnetic field when the radially outer set of flux barriers 301 has an azimuthal spatial periodicity of 30. One way to realize this resonance is to use a 60/72 rotor/stator pole configuration for a 6-phase switched reluctance motor drive. A three-phase drive is also possible, but will increase the number of stator slots for switched reluctance operation to 90, for a 60/90 rotor/stator pole configuration. As will be explained in more detail below, having a greater number of rotor slots increases maximum torque output.

In particular embodiments, the inner set of flux barriers 302 (the synchronous reluctance flux barriers) is arranged to have a periodicity of 12 azimuthally. For synchronous reluctance operation, the motor may be designed to be driven by a three-phase drive and have a 12/12 rotor/stator pole configuration.

The inner set of flux barriers 302 causes the reluctance of rotor 300 to vary in a spatially sinusoidal manner. For a rotor that is made of material with high magnetic permeability, the magnetic field has an effective penetration length which is roughly the distance between two adjacent opposing poles of equal pole strength. Beyond such distance, the two opposing poles contribute to almost equal magnetic field in both strength and direction but with opposite signs, hence largely canceling their contributions. For multiple poles with alternating poles of equal strength, the cancellation from all of the poles causes the magnetic field strength to decay almost exponentially.

Thus, when the stator excitation comprises 60 poles for the switched reluctance operations, the excited magnetic field within the rotor travels about ⅟₆₀th of the rotor circumference. Hence the 60-pole switched reluctance excitation would produce a magnetic field affected by the outer flux barriers 301.

By comparison, a 12-pole synchronous reluctance excitation will be able to penetrate about ⅟₁₂th of the rotor circumference. Hence a 12-pole synchronous excitation would produce a magnetic field affected by the inner flux barriers 302, resulting in the period-12 sinusoidal magnetic reluctance variation. The influence of the outer flux barriers will constrict the flux path to some extent for the 12-pole excitation which produces a slight modulation of the reluctance variation azimuthally, but should not substantially affect the 12-pole synchronous reluctance operation.

There are additional benefits to the outer flux barriers 301, given that they effectively increase the air gap distance between the stator and the rotor. For a rotor 300 made of material with high magnetic permeability, little magnetic energy is stored in the rotor core material; almost all of the magnetic energy is stored in either the air gap or the flux barriers 301. Therefore, the maximum torque and power output can be increased with additional flux barriers 301. Flux barriers 301 also permit the divergence of the flux into the barriers, which retards flux saturation within the core, further increasing the maximum torque and power output achievable by the machine. However, larger peak current may be desired to drive the machine, which increases copper conduction loss.

Figure 4:
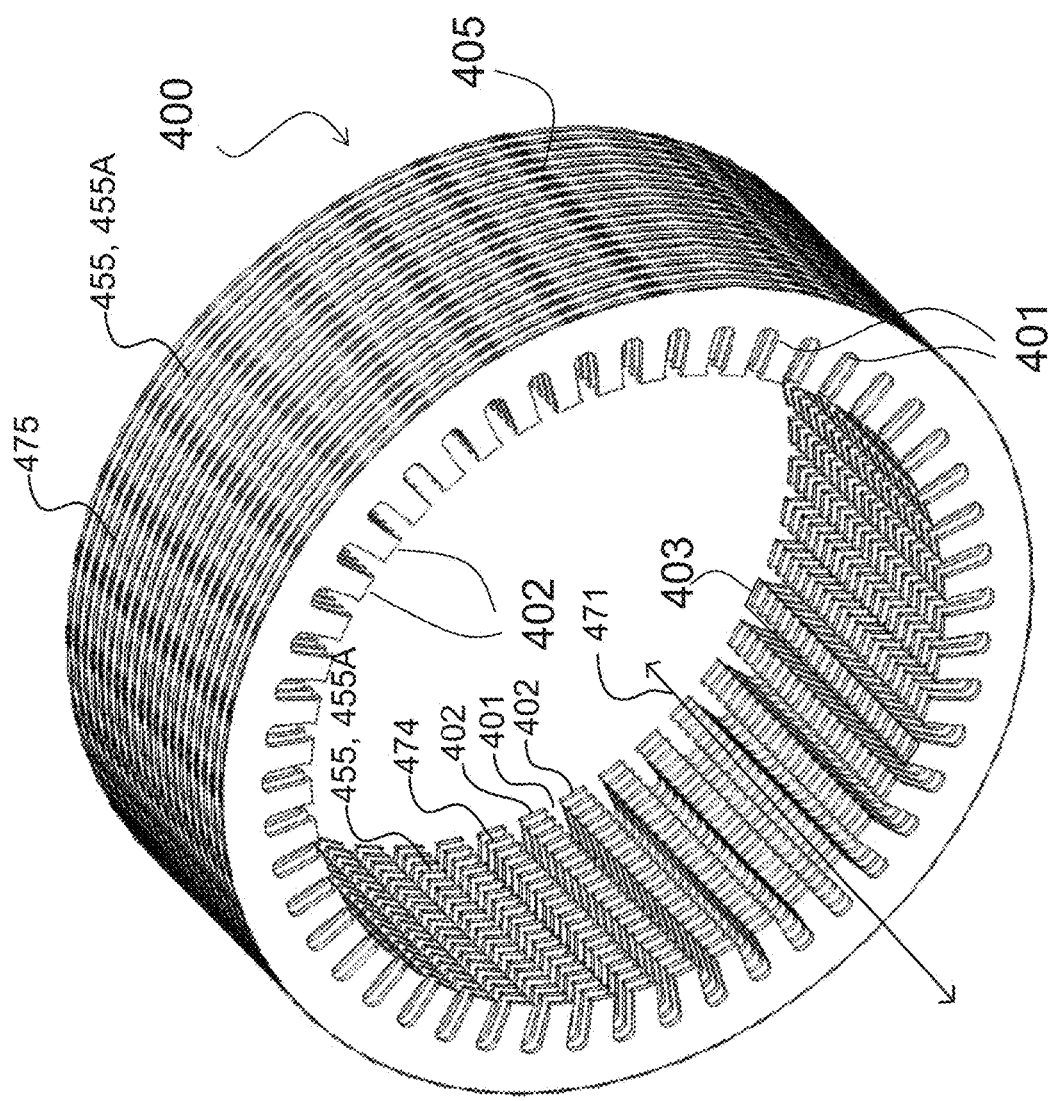

In addition to rotor 300, motor 480 of FIG. 5 includes stator 400. As best seen in FIG. 4, stator 400 comprises a plurality of circumferentially (e.g. azimuthally) spaced apart teeth 402 (spaced apart around a circumference that extends around the axis of motor rotation). In the FIG. 5 embodiment, teeth 402 project radially inward toward the stator's central axis. The length of each tooth 402 extends axially from one planar side of the stator 400 to the other. The teeth 402 define axially extending and radially inwardly opening slots 401 therebetween for accommodating two types of armature windings: switched reluctance and synchronous reluctance coils (not shown in FIG. 4). Switched reluctance coils can be wrapped around individual teeth 402. On top of the switched reluctance coils, synchronous reluctance multiple poly-phase coils can be wrapped around multiple adjacent teeth 402. Alternatively, the switched reluctance coils can be wound around the axially-extending back irons connecting adjacent teeth 402 as explained below with reference to FIG. 9A. A sufficient number of slots 401 can be provided to accommodate armature windings to produce a desired sinusoidal-like azimuth variation. The armature windings may be made of copper. As used herein, "copper" is used as a term of convention to refer generally to the armature windings, although it is to be understood that armature windings may also be made of other suitable conductive materials. The stator winding geometry will be described in more detail below with reference to their illustration in FIGS. 6A to 6C, 7, 8, 9A and 9B.

Stator 400 may be laminated similarly to rotor 300. In the illustrated embodiment, the lamination 455 of stator 400 is provided by stacking planar magnetic laminates 455A along axial direction 471 on both the radially inwardly facing peripheral surface 474 and radially outwardly facing peripheral surface 475 of stator 400. The lamination covers each tooth 402 and also covers the surfaces of the slots 401 in between each tooth 402. In particular embodiments, the lamination subdivides the stator core into parallel planar sheets of high-Mu material sandwiched by insulating resins which bind the sheets together while maintaining electrical isolation between the sheets. The lamination 455 depicted in FIG. 4 is shown greatly exaggerated; the actual laminations are preferably only about 1 mm thick.

Each tooth 402 may be considered to be one stator pole. FIG. 4 indicates a pole face area 403 for one tooth 402. The net pole face 403 area (i.e. the area of all of pole faces 403 of stator 400) may be decreased to make space for slots 401 to accommodate the armature windings. To maintain the power efficiency at the desired level, almost the same copper (armature winding) space is desired regardless of the pole geometry. An advantage of the slotted stator design is that additional high pole number single coil per slot (switched reluctance) windings may be introduced in the space provided by the slots, provided that the additional auxiliary (switched reluctance) windings do not add significantly to the overall copper volume, to allow the same current flow. In practice, due to copper losses, such additional auxiliary windings are useful generally for operations of short time bursts where the copper heating time is limited (so that the net increase in core temperature is limited), or when the auxiliary operation (e.g. switched reluctance mode) can be employed together with the main operation (e.g. synchronous reluctance mode) using PWM or PWM-like time division switching to hybridize the machine operations, which may help to reduce the risk of overheating, as described in further detail below.

FIG. 5 shows the pairing of rotor 300 and stator 400 to provide a hybrid synchronous reluctance/switched reluctance motor 480. As explained in further detail below, the combination of the flux barriers 301, 302 and the armature windings enable a multitude of distinct or hybridized operations of the motor controllable by software (thus, this machine can be considered a "software-defined motor"). For example, a synchronous reluctance inverter and controller may be connected to the synchronous reluctance windings, and a switched reluctance inverter and controller may be connected to the switched reluctance windings. By controlling each inverter to activate the electronic switches for the windings at the appropriate time (e.g. when the rotor is in a particular position relative to the stator), the motor can be operated in a synchronous reluctance mode or a switched reluctance mode, or a hybrid of the two modes (e.g. using PWM or PWM-like techniques to combine the two modes) to allow for continuous gearing.

Figure 6:
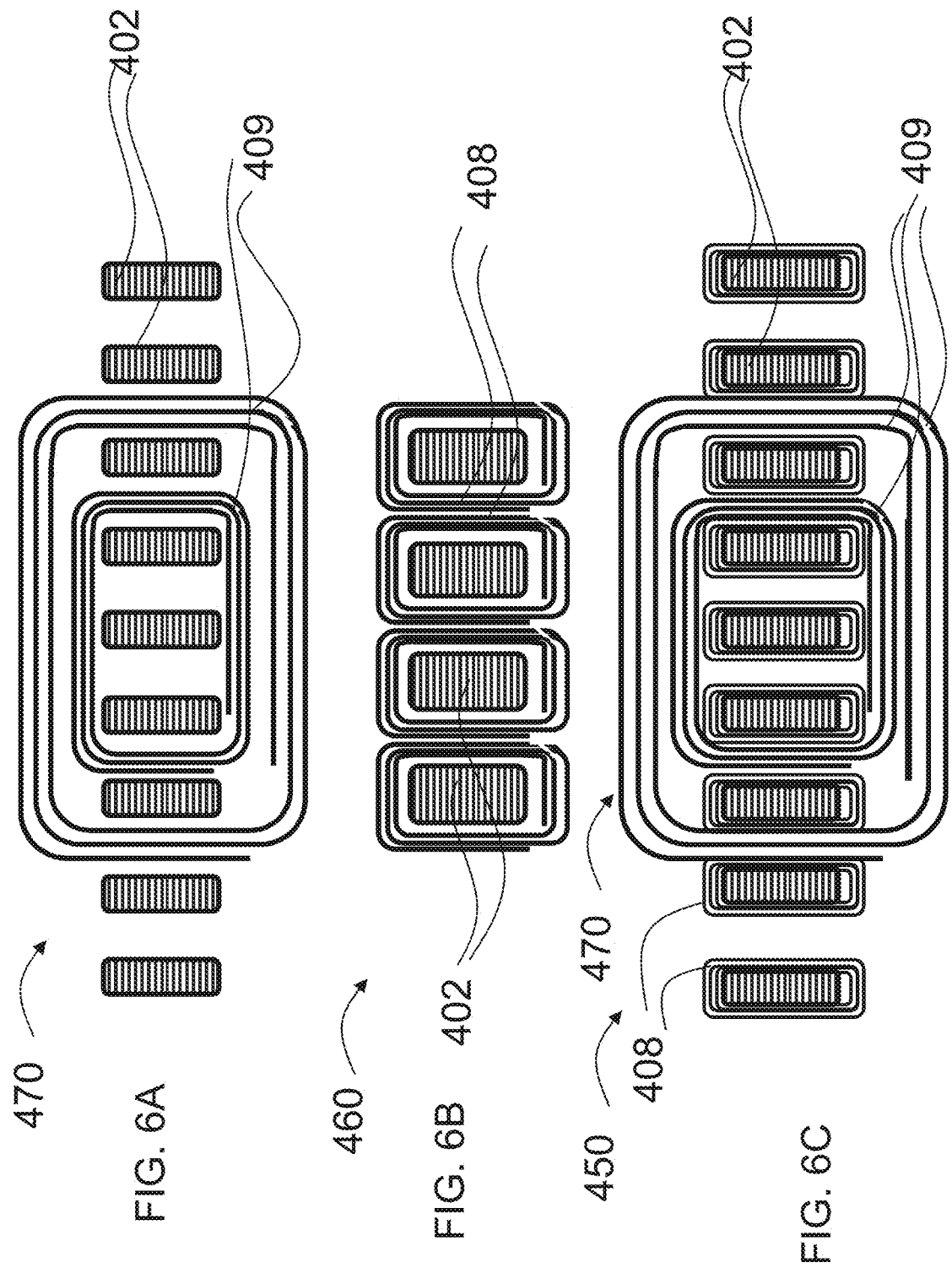
FIG. 6A illustrates a distributed poly-phase stator winding for a synchronous reluctance mode of operation.
FIG. 6B illustrates a single coil per tooth poly-phase stator winding for a switched reluctance mode of operation.
FIG. 6C illustrates a hybrid of synchronous and switched reluctance windings comprising synchronous (distributed poly-phase) windings as the primary or main stator windings, and switched reluctance (single coil per tooth poly-phase) windings as the secondary or auxiliary stator windings, for a synchronous reluctance/switched reluctance motor in accordance with one embodiment.

FIG. 6A shows a distributed poly-phase stator winding 470 for a synchronous reluctance mode of operation. In the illustrated embodiment, winding 470 comprises multiple sets of coils 409 or copper windings, each set wrapped around a plurality of adjacent neighboring teeth 402. In some embodiments, one or more of the sets of coils 409 may wrap around a single stator tooth 402. Different coils 409 may have different current carrying characteristics. The desired current distribution among the varying coils can be determined by a Fourier analysis to mimic the desired sinusoidal variation.

FIG. 6B illustrates a single coil per tooth poly-phase stator winding 460 for a switched reluctance mode of operation. In the illustrated embodiment, winding 460 comprises multiple sets of coils 408 or copper windings, each wrapped around a single tooth 402.

FIG. 6C shows a hybrid winding 450 for a hybrid synchronous reluctance/switched reluctance machine, which integrates the FIG. 6A synchronous reluctance winding 470 and the FIG. 6B switched reluctance winding 460. The integration of the two types of windings in one stator 400 may be facilitated by allotting a smaller percentage of the available copper space (i.e. volume) to the coils 408 of the switched reluctance winding 460 than to the coils 409 of the synchronous reluctance winding 470.

In the illustrated FIG. 6C embodiment, the synchronous reluctance coils 409 are designated as the primary (main) winding while the switched reluctance coils 408 are designated as the secondary (auxiliary) winding. While it is possible to reverse this designation (i.e. so that the synchronous reluctance coils 409 become the "secondary" winding and the switched reluctance coils 408 become the "primary" winding), such reversal may not produce the desired performance and usability objectives of an electric vehicle. Higher order pole geometries (as desired for the switched reluctance mode of operation) typically involve the use of higher currents to reach the same peak magnetic field, due to the inherent destructive interference nature of having spatially alternating currents in close proximity where the magnetic field generated by one current segment is canceled by that generated by current flow in the opposite direction. Higher current distribution involves designating more space for thicker copper wirings, or lower power efficiency as a consequence of higher copper loss. In addition, the performance objectives for electric vehicle applications may be satisfied by having the hybrid motor assume the more efficient synchronous reluctance mode for typical lower power/lower torque operations most of the time. The less efficient, higher power/higher torque switched reluctance mode may be reserved for short bursts desired for high acceleration, hill climbing, start and stop modes of operations, and/or the like, where power efficiencies are of lesser concern. In situations where the power and/or torque objectives are between those that can be provided by either mode, hybridized pulse-width modulation-like time division switching can be employed to switch between the two modes in rapid succession. Such hybridized operations can lower the temperature increase or the rate of temperature increase to reduce the risk of overheating.

Figure 7:
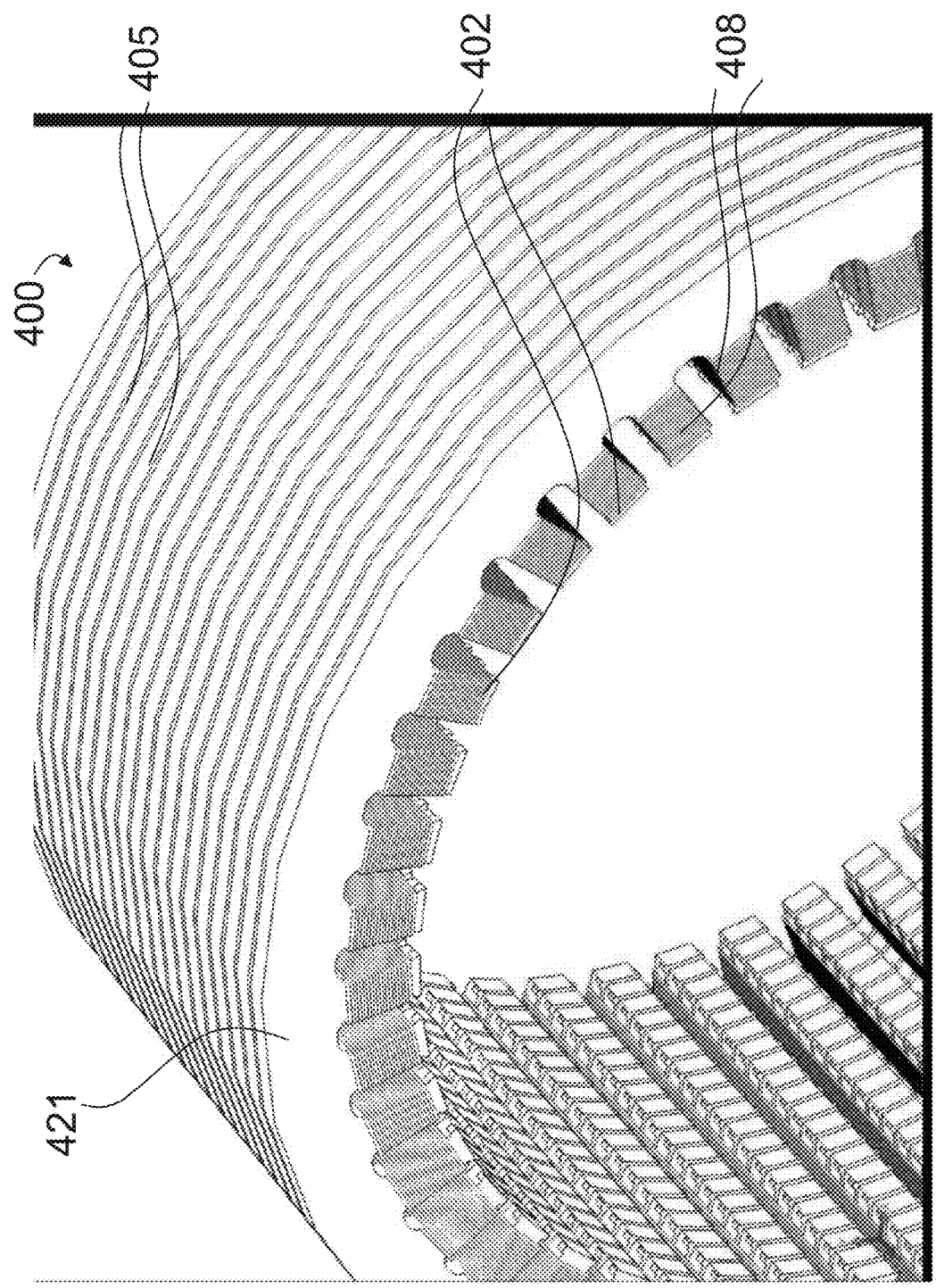
FIG. 7 is a detailed partial perspective view of a stator according to one embodiment wherein the secondary stator windings are wrapped around individual teeth.

FIG. 7 is a detailed perspective view of stator 400 in one example embodiment wherein sets of secondary coils 408 are wrapped around individual teeth 402 (similarly to the switched reluctance winding 460 shown in FIGS. 6B and 6C). Sets of primary coils 409 (not shown in FIG. 7) may then be wound around a plurality of adjacent teeth 402, on top of secondary coils 408 (similarly to the synchronous reluctance winding 470 shown in FIGS. 6A and 6C). The primary coils 409 may be wrapped around an odd number of adjacent teeth (e.g. such as 7, 5, 3, 1, etc.).

In particular embodiments, the largest winding of primary coils 409 wraps around the largest number of teeth and serves as the main winding since it is the most efficient—i.e. with the same amount of current it can generate the largest magnetic flux. The largest number of teeth wrapped by the primary winding also defines the pole pitch for the synchronous reluctance winding since those teeth span the angular extension of each "pole" of the synchronous reluctance motor. For example, if the maximum angular extension encompasses 7 teeth, then there may be: a first primary coil 409 serving as the main winding which wraps around the 7 teeth; a second primary coil 409 that wraps around 5 middle teeth; a third primary coil 409 that wraps around 3 middle teeth; and a fourth primary coil 409 that wraps around only the center tooth, all in nested fashion. The current carried by the smaller windings is typically smaller and is used to shape the air gap magnetic field to be closer to a sinusoidal shape. This field-shaping is important for a synchronous reluctance machine and for other synchronous machines since any deviation from a true sinusoidal shape would contribute to zero time-averaged torque. Switched reluctance motors, on the other hand, operate on different principles and do not require sinusoidal shaped air gap field distribution. Typically, the switched reluctance motor air gap field distribution resembles more of a square wave, which partially accounts for its higher torque capability.

It is generally preferable to wrap secondary coils 408 first before wrapping primary coils 409. The wrapping of primary coils 409 around adjacent teeth may physically interfere with any subsequent wrapping of secondary coils 408 around individual teeth. Also, since the magnetic excitation generated by secondary coils 408 has a shorter depth of penetration into the high permeability magnetic core 405, secondary coils 408 may be positioned closer to core 405. The back iron 421 of stator 40 may provide the return flux path for secondary windings 408.

Figure 8:
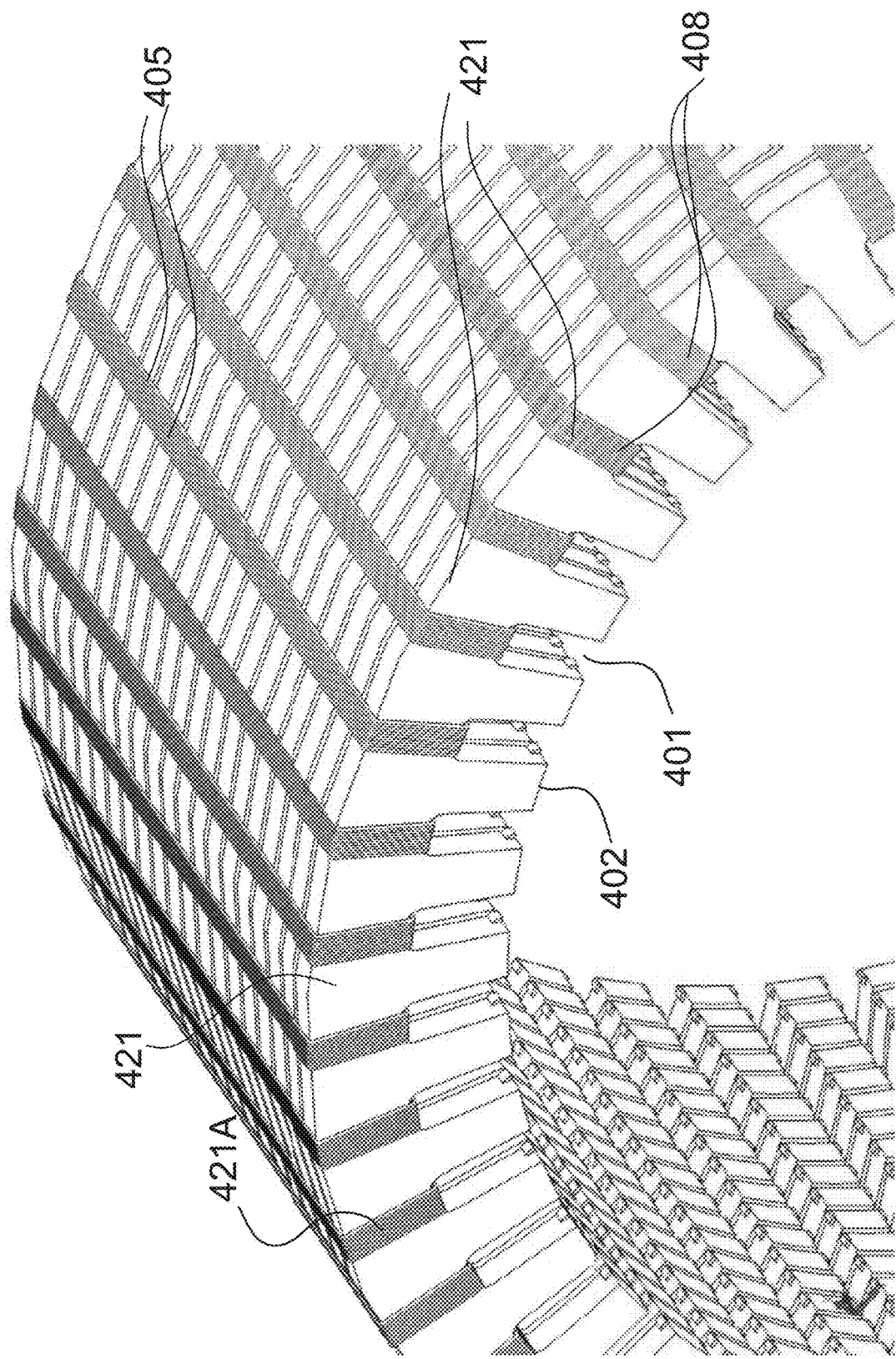
FIG. 8 is a detailed partial perspective view of a stator according to another embodiment wherein the secondary stator windings are wrapped around portions of back irons connecting adjacent teeth.

FIG. 8 is a detail perspective view of a stator 400 according to another example embodiment wherein sets of secondary coils 408 are wrapped around portions 421A of back iron 421 connecting adjacent teeth 402. This winding configuration excites adjacent teeth 402 into magnetic poles of opposite polarity. The FIG. 8 winding geometry may be less efficient than the FIG. 7 winding geometry for switched reluctance operations, due in part to the increased length of the secondary coils 408 in FIG. 8. However, as seen in FIG. 8, wrapping secondary coils 408 around the back iron 421 frees up additional space for primary coils 409 (not shown in FIG. 8) to be wrapped around teeth 402. This may make the FIG. 8 winding geometry more efficient for the synchronous reluctance or primary mode of operation. Primary coils 409 may be wrapped around groups of teeth 402 in a similar nested fashion, as shown in FIGS. 6A and 6C and described above. For example, if the angular pole pitch comprises 7 teeth, then the primary windings 409 may wrap around sets of 7, 5, 3 and 1 teeth in nested fashion.

Figure 9:
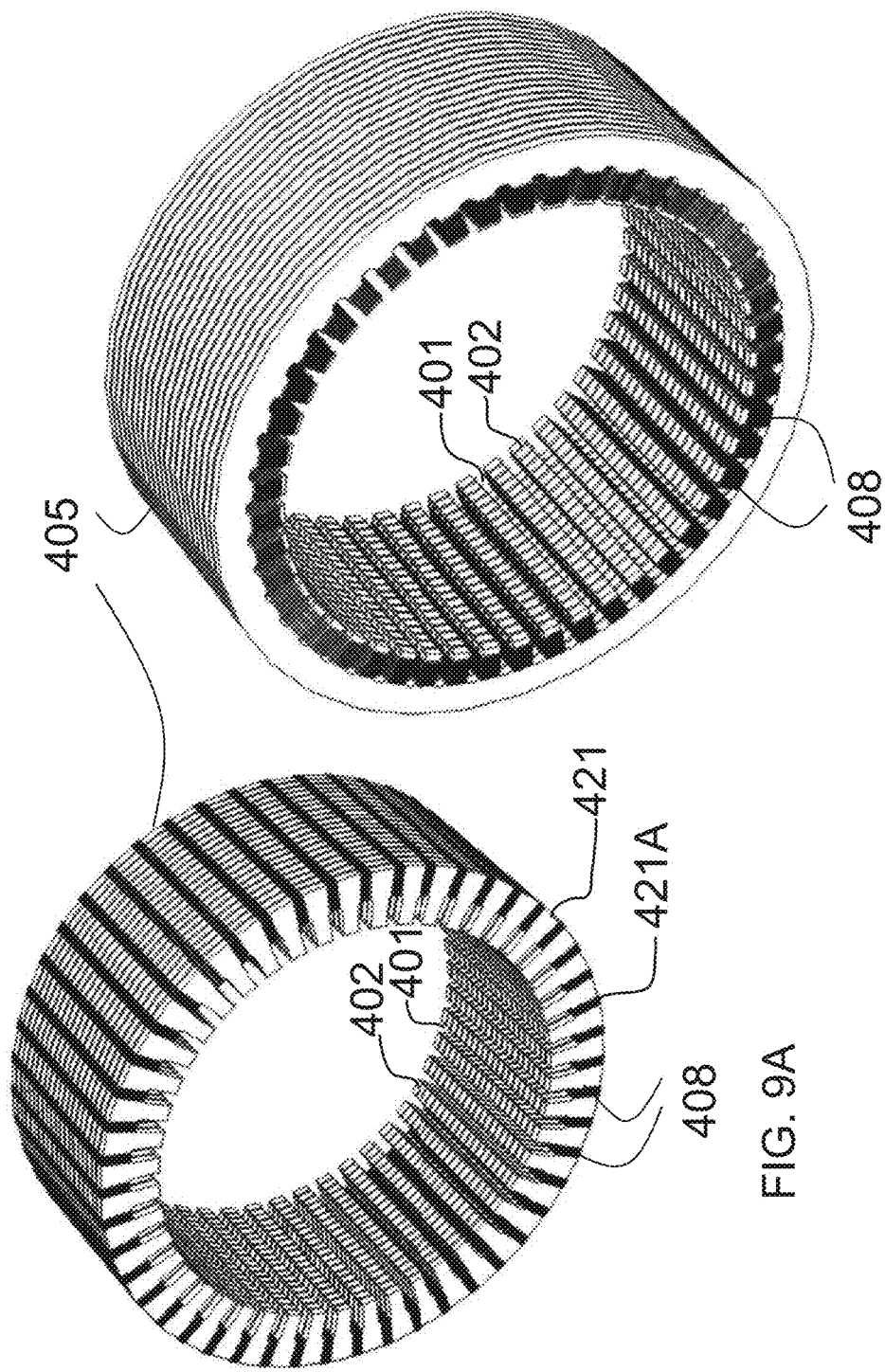
FIGS. 9A and 9B are perspective views of the secondary winding configurations of the stator shown in FIGS. 7 and 8 respectively.

FIGS. 9A and 9B are perspective views of the different secondary winding configurations for the stator in FIGS. 8 and 7 respectively. FIGS. 9A and 9B illustrate the reduction in space available for primary coils in the FIG. 7 (FIG. 9B) winding configuration as compared to the FIG. 8 (FIG. 9A) winding configuration. As seen in FIG. 9B, the secondary coils 408 are wound so that they occupy some space around each of teeth 402, thereby reducing the volume of space in slots 401 available for the primary coils 409 (not shown in FIGS. 9A, 9B). As seen in FIG. 9A, the secondary coils 408 are wound instead around portions 421A of back iron 421 between adjacent teeth 402 (i.e. in slots 401), thereby freeing up space around teeth 402 for the primary coils 409 (not shown).

The FIG. 9A secondary winding configuration produces transverse flux paths extending from one coil to the next (rather than axial flux paths as is the case for the FIG. 9B configuration). However, in the FIG. 9A configuration, if currents are run through a pair of adjacent coils in opposite directions, then the adjacent transverse flux paths would be forced to flow toward the bottom edge of the tooth shared by both coils, with the return flux flowing along the back iron toward the tooth. This produces almost the same flux path as the secondary winding configuration of FIG. 9B. This is because with a single switched reluctance coil (FIG. 9B), the flux is directed toward the bottom of the tooth, but the return flux must come from another coil at a conjugate tooth location or multiple coils at a multitude of conjugate locations. For example, a 6-stator pole switched reluctance stator in a three-phase drive configuration will have one excited coil at one stator tooth and another coil with opposite polarity at the conjugate location 3 stator teeth away. If one numbers the stator teeth locations by 1, 2, 3, 4, 5, 6, for example, then for one excited tooth at location 1, the conjugate location is at 4. For a 12-tooth configuration, then for one excited tooth at location 1, the conjugate locations are 4, 7, and 10. The return flux of the FIG. 9B secondary winding configuration would flow toward the first tooth transversely along the annular back iron. Even though the FIG. 9A winding configuration would involve twice the number of excitations to produce the same flux pattern as the FIG. 9B winding configuration, the FIG. 9A winding configuration would not use twice the current, since the currents from adjacent coils in FIG. 9A add; hence only half of the current is used to drive each individual coil and the total current stays the same.

Therefore, the FIGS. 9A and 9B winding configurations may generate equivalent flux patterns, when pairs of adjacent coils in the FIG. 9A configuration carry half of the current as in the FIG. 9B configuration and in opposite directions. The FIG. 9A winding configuration does involve a longer secondary winding length to extend over the back iron. Therefore, the FIG. 9A configuration uses slightly more copper (increasing the weight), slightly more space, and has slightly more copper loss than the FIG. 9B configuration. However, the FIG. 9A configuration advantageously frees up space to permit denser packing of the primary windings. Hence, while it may reduce the performance of the switched reluctance mode, the FIG. 9A configuration has the potential to improve performance of the synchronous reluctance mode.

Figure 10:
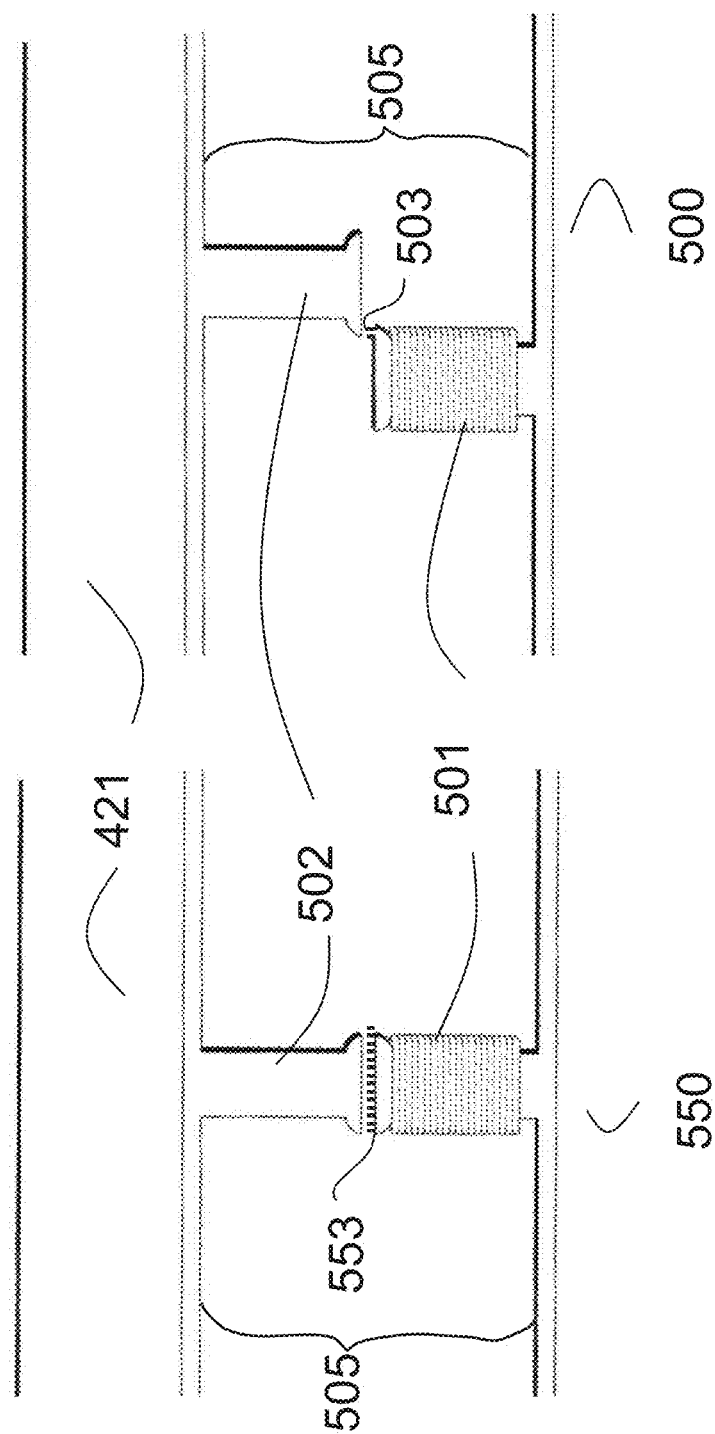
FIGS. 10A and 10B are side-by-side views of a stator and rotor pole pair in aligned and unaligned positions, respectively.

FIGS. 10A and 10B are side-by-side views of a single stator and rotor pole pair 505 in an aligned position 550 and an unaligned position 500, respectively. The illustration of FIGS. 10A, 10B is useful for the purpose of extracting the scaling law between maximum available torque production and number of stator and rotor poles (or teeth) 501, 502. The scaling behavior is applicable to both synchronous reluctance and switched reluctance modes. However, it is relatively more simple to identify a single saliency in the switched reluctance mode of operation (i.e. where a single tooth is a pole), as compared to in the synchronous reluctance mode (i.e. where multiple teeth form a single "pole"). In general, as a result of the scaling laws discussed below, for both synchronous reluctance and switched reluctance modes the torque produced is almost linearly proportional to the number of poles, bearing in mind that for synchronous reluctance mode multiple teeth form a single "pole". The saliencies (whether explicitly provided by projecting poles, or implicitly provided by flux barriers or rectangular slots) both generate reluctance variation profiles which are similar and can be made the same with proper tuning of the shapes.

In aligned position 550 (FIG. 10A), each salient rotor pole 502 is shown fully aligned with an adjacent salient stator pole 501. In this fully aligned position, the stator-rotor pole pair 505 is in a position of minimum reluctance. In the unaligned position 500 (FIG. 10B), each salient rotor pole 502 is not in alignment with the adjacent salient stator pole 501 in the pole pair 505. The pole pair 505 assumes a position of maximum magnetic reluctance where the rotor pole 502 is equidistant from two adjacent stator poles 501.

The torque generated by the mutual attraction between an excited stator pole 501 and the nearest adjacent salient rotor pole 502 can be expressed mathematically as the negative of the partial derivative of the "co-energy" associated with the pole pair with respect to the rotational angle (azimuth angle). For a core of extremely high magnetic permeability, the co-energy is almost equal to the magnetic energy stored within the space in and around the air gap 503 between the rotor and stator poles 501, 502. Suppose that the rotor pole 502 is being pulled from right to left (i.e. from unaligned position 500 in FIG. 10B to aligned position 550 in FIG. 10A). The stator pole 501 is excited whenever the nearest rotor pole 502 is within range. When the pole pair 505 is in the unaligned position 500, as shown in FIG. 10B, the air gap 503 stores almost no magnetic energy, and hence the co-energy is essentially zero. The opposite is true for when the pole pair 505 is in the aligned position 550, as shown in FIG. 10A, where the co-energy is at its peak. Hence the co-energy increases as the rotor pole 502 travels to the left, and the rate of change of the energy stored in the air gap 503 with respect to the angle is the generated torque.

For maximum torque generation, the difference in air gap energy between the aligned and unaligned positions 550, 500 may be as large as possible, meaning that the magnetic field should likewise be at its peak. Thus, the magnetic core material within and around each tooth 402 may be at or near saturation, e.g. such that an increase in applied external magnetic field cannot further increase the magnetization of the material. Since the saturation flux value for a given magnetic material depends on the manufacturing tolerance and is generally constant, the energy stored in the air gap may be proportional to the air gap distance and the effective net area of the pole face (note that where the rotor pole and the stator pole have different pole areas, the smaller of the pole areas can be assumed to be the effective pole area). Although this relationship between air gap energy and air gap distance would suggest that an increase in the air gap tends to increase the torque generation of the motor (since the reluctance decreases roughly in inverse proportion to the air gap distance), the increase in the air gap would also require proportionally higher current to reach local core saturation. This higher current would increase copper losses. Consequently, there is an inverse relationship between motor efficiency and torque production.

Due to the relatively high magnetic permeability of silicon steel or other laminated magnetic metals such as permalloy or mu-metal (which have even higher relative permeability than silicon steel), a fairly accurate approximation can be made by assuming that the magnetic permeability of the magnetic material approaches infinity except at or near core saturation point. Based on this approximation, the reluctance of the magnetic circuit is primarily a function of the flux within and around the air gap, because the magnetic H-field, while equal to the magnetic B-field outside the cores, is virtually negligible inside the cores. Hence, the effect of the cores may be considered to be negligible. Using the integral formulation of Ampere's law, the air gap magnetic H-field (not including the fringe field) can be shown to be the ampere-turn or NI of the stator tooth winding (assuming a switched reluctance mode of operation) divided by the air gap distance d:

$$H = \frac{AmpereTurn}{d} = \frac{NI_{stator}}{d} \quad (1)$$

Where N is the number of turns in the winding, $I_{stator}$ is the current passing through the winding and d is the air gap distance. Thus, the air gap magnetic H-field only depends on the air gap distance d and shows linear behavior in relation to the air gap, with no significant nonlinear behavior even well into the saturation region. Nonlinear behavior sets in only when certain regions of the stator pole face become fully saturated, at which point the magnetic H-field no longer increases linearly with the Ampere turn of the armature. In the fringe field regions, the H-field line takes a longer tour than the air gap length d, hence the H- or B-field becomes correspondingly smaller. A fairly accurate estimate could be made by assuming that the equation (1) air gap H-field expression remains valid until saturation of the cores near the pole faces. To avoid large hysteresis loss incurring in the saturated regions, current limiting may be imposed to prevent the cores from being driven into saturation, so that equation (1) remains generally valid.

One way to compute the motoring torque is to calculate the co-energy, which is defined as the pole face flux (the phase flux) integrated over Ampere turn. Expressing the flux as a "surface integral" of the magnetic B-field over the surface of a pole face (assuming the fringe field contribution is negligible, which is a valid assumption when the air gap is sufficiently small compared to the length and width (e.g. by orders of magnitude)), the below equation can be derived:

$$\text{Coenergy} = W_{co} = \int \psi dNI = \iiint B \cdot dA dNI \quad (2)$$

where:

$$W_{co} = \frac{H^2}{2} A \cdot d \quad (3)$$

Where H is the magnetic field strength, d is the air gap distance and A is the pole face area. Equation (3) is an expression of the magnetic energy stored within the air gap. This is also the total magnetic energy stored within the motor given that within the high permeability approximation, the magnetic field stored in the high permeability cores is essentially zero (due to the small magnetic H-field within the cores and the fact that the magnetic energy density of the field is the product of the magnetic B-field and H-field). For imperfectly aligned pole pairs, the pole face area A can be taken to be the area of the overlapping region between the stator and rotor poles. Therefore, in accordance with the high permeability approximation, the rotor torque can be deduced from the change of the co-energy with respect to the azimuth angle of the rotor pole during the active phase when the armature coil is energized, as follows:

$$\text{Instantaneous Torque} = \frac{\partial}{\partial \theta} W_{co} = \frac{H^2}{2} d \cdot \frac{\partial}{\partial \theta} A_{active} \quad (4)$$

and:

$$\text{Average torque} = \frac{B_{saturate}^2}{2} d \frac{A_{max}}{\theta_{pitch}} \quad (5)$$

where $\theta_{pitch}$ is the angular span of a pole pitch. The maximum pole face area $A_{max}$ is the maximum area of overlap between the stator pole and the rotor pole (or their equivalent). Put another way, the maximum pole face area $A_{max}$ is the smaller of the pole face areas between the stator tooth and the rotor tooth and corresponds to the sum of all active pole face areas. The rotor pole may have a larger area than the stator pole, given that the rotor pole may have a larger angular span than the stator pole (and the air gap is quite small, typically less than 1 mm); thus if the stator and rotor poles are maximally aligned, the maximum area of overlap is the stator pole area, the smaller of the two pole faces. The total pole face area is directly proportional to both the length and the diameter of either of the stator or rotor, plus the number of teeth (for either the stator or the rotor, depending on which one has the larger air gap area).

The FIGS. 10A and 10B configurations and above equations can be employed to provide an estimate of the scaling behavior between the total number of poles (stator poles and rotor poles or teeth or reluctance saliencies) and torque production. Consider, for example, the configuration of the motor 400 depicted in FIG. 5. There may be some non-linear frequency mixing or coupling leading to some interaction between the two sets of flux barriers (e.g. due to flux saturation). However, for purposes of estimating the switched reluctance torque production, the effects of the inner rotor slots or synchronous reluctance flux barriers can be ignored since they are located too far from the switched reluctance stator saliency to have significant effect on the switched reluctance torque production when averaged over many cycles. The inner rotor slots also have a pitch or spatial periodicity that will not achieve resonance with the switched reluctance excitations. Resonance occurs when the rotor rotation causes the phase reluctance to vary periodically in time to match the excitation periodicity of the switched reluctance windings. The number of rotor and stator poles in the FIG. 5 configuration of motor 400 may be varied without changing the area ratio between the aligned zones and the unaligned zones. This could be accomplished for the stator by making the stator tooth width inversely proportional to the number of stator teeth, so that the total stator tooth area remains unchanged; the same variations and relationships can be used for the rotor with respect to the rotor poles. It is also to be understood that the diameter of the stator or rotor stays the same. As a result, the total peak air gap energy remains about the same as long as the air gap distance is not changed. However, since the angular partial derivative of the co-energy is inversely proportional to the teeth spacing (which itself is inversely proportional to the number of stator poles), the peak torque production is directly proportional to the number of stator poles.

If, on the other hand, the diameter of the rotor or stator core is increased, while keeping the number of poles constant, then, since both the effective pole area and the lever arm (the radius of the rotor) also increase, the resulting increase in torque production is proportional to the product of the effective pole area and the lever arm, or the square of the machine core diameters.

For direct drive (i.e. no speed-reducing gears) "in-wheel" or hub motor electric vehicle applications, maximizing peak torque production is important. Based on the scaling behaviors discussed above, particularly for high power/high torque operations, it can be appreciated that the motor core diameter may be made as large as possible (in some cases, almost as large as the wheel rim diameter) and the number of poles may also be high. However, there is a practical limit to the pole number. A higher pole number involves using a correspondingly higher percentage of the slot space for copper (i.e. armature windings), since a certain amount of copper cross-section is desired to accommodate the ampere turn and to generate the magnetic H-field in accordance with the equations described above. The increased copper volume ultimately reduces the torque output due to the decrease in the effective pole area, and may lower the power efficiency and result in overheating.

In particular applications for compact sized electric vehicles, the inventors have determined that the number of stator poles for the motor's high efficiency or synchronous reluctance mode of operation should be around 12. A pole number higher than 12 may reduce power efficiencies. A pole number lower than 12 may provide inadequate torque production, even for a usage case where there is a higher percentage of lower torque operations. A typical usage case would involve a fair percentage of moderate torque loading. Operating in a switched reluctance mode may be too inefficient for those moderate torque operations and could either lead to overheating or dramatically lower the overall power efficiency when the not insignificant percentage of moderate torque loading operations is factored into consideration. However, a 12-pole synchronous reluctance motor would not provide adequate torque for most starts and stops, steep hill climbing, and hard braking operations. By combining a 12-pole synchronous reluctance machine with a high pole number switched reluctance machine in accordance with the hybrid embodiments described herein, a versatile electric machine is provided which can support efficient motoring and regenerative braking functions for light to moderate loads and can provide high torque operations for short durations when desired.

By providing a high number of polarities just below the outer diameter of the rotor, a high torque production can be realized for switched reluctance (high torque) mode of operation. Since the motoring power is related to the product of the produced torque and the angular speed, the motor power output at a given speed is also increased proportionally by the high pole number, provided that the speed is not greater than the base speed corresponding to the high pole number configuration. The base speed of a motor is defined in terms of the maximum motor (angular) speed for which the back or counter-electromagnetic force (EMF) does not exceed the DC link supply voltage. In other words, the base speed is the motor speed at which the back EMF on the stator phase coils is equal to the DC link voltage. The back EMF is proportional to the rate of change of flux, which is the product of the armature current and the frequency at which each stator pole is excited and extinguished, which in turn is proportional to the speed at which the rotor rotates and the number of rotor poles. Such frequency is equal to the number of rotor north poles passing by a given stator pole per unit time, which in turn is equal to the product of the number of rotor pole pairs and the rotor shaft rotation frequency. By way of explanation, in switched reluctance operations, a salient stator pole generates a flux emanating from that pole, which flows through the rotor core, and eventually returns back to the same pole. To make the flux path well-defined and symmetric, another stator pole (or a multitude of poles) at one or more conjugate location(s) is fed a negative current to direct the flux through the rotor core and to return to the original stator pole to complete the closed loop. Conjugate pairs of rotor poles may be referred to as rotor pole pairs.

Accordingly, the motor base speed is inversely proportional to the number of rotor pole pairs. A 32-pole rotor configuration for switched reluctance mode, for example, will have close to 8 times the maximum torque as a 4-pole rotor, ignoring the expected small deviations from the ideal scaling behavior due to other ancillary factors not considered here, such as the localization of the induced magnetic field. At the same time, the base speed of the 32-pole rotor configuration will have only ⅛th the base speed of a 4-pole rotor configuration. A switched reluctance motor typically has three distinct torque-speed behaviors. At speeds lower than the base speed, the torque is generally constant as the armature back EMF increases linearly with the shaft speed along with the motor output power. At speeds greater than the base speed, the power will stay constant with the torque decreasing in inverse proportion to the shaft speed, until the shaft speed reaches a point beyond which the output power starts to decrease as well. It follows from this that the maximum power of a switched reluctance motor is reached when the shaft speed is equal to or slightly greater than the base speed.

It can be appreciated by one of skill in the art from the above discussion that the peak output power is proportional to the product of the peak torque and the base speed. Therefore, the peak output power is not substantially dependent on the number of rotor pole pairs. In this respect, increasing the number of rotor and stator poles may have an effect similar to coupling a low pole number electric machine to a reduction gear box. For example, one could couple the aforementioned 4-pole rotor machine to a gearbox to reduce the shaft speed by a factor of 8. To have the same shaft speed (at the output of the gearbox), the 4-pole rotor would need to spin 8 times faster to compensate for the 8:1 gear ratio. The gear-reduction factor of 8 also means that, at the original motor's base speed, the output shaft speed is 8 times lower. Also, the output torque is 8 times higher at shaft speeds below ⅛th of the 4-pole rotor's base speed. It thus becomes apparent that the effective "base speed" of the output shaft (at the output of the gearbox) is reduced from the motor base speed to ⅛th of the motor base speed. A corollary of this is that the peak output shaft power remains generally unchanged, apart from the reduction of power arising from mechanical transmission loss through the gear train.

A conventional low pole number electric machine is incapable of the high torque and high power objectives of a direct drive in-wheel motor at lower speeds. Likewise, a conventional high pole number toroidal motor cannot meet the high power efficiency and high base speed objectives of a direct drive in-wheel motor. One solution according to some embodiments involves providing a motor with a sufficiently high pole number to satisfy reduced peak torque and peak low end power objectives, while still providing sufficient power efficiency and a low temperature envelope. Another solution according to some embodiments involves providing a high-speed, low pole number motor with high efficiency, and coupling it to a continuous variable transmission gearbox. However, these approaches reduce the overall power efficiency or increase the design complexity and weight. Such compromised approaches may explain why direct drive in-wheel or hub motors have not been widely favored.

A hybrid synchronous reluctance/switched reluctance motor according to the embodiments described herein exhibits a reduced complexity of the high pole number machine design relative to that of a conventional geared machine. In addition, the effective "gear ratio" of the hybrid synchronous reluctance/switched reluctance motor can be changed through PWM-like hybridization between the low pole number configuration (synchronous reluctance mode) and the high pole number configuration (switched reluctance mode), without requiring a heavy and complex gearbox. Therefore the technology according to the embodiments described herein may advantageously be applied to a direct drive in-wheel or hub motor design, and is configurable to handle situations where the peak torque desired exceeds the peak power attribute of the motor, without significantly compromising on the space and weight constraints.

Figure 11:
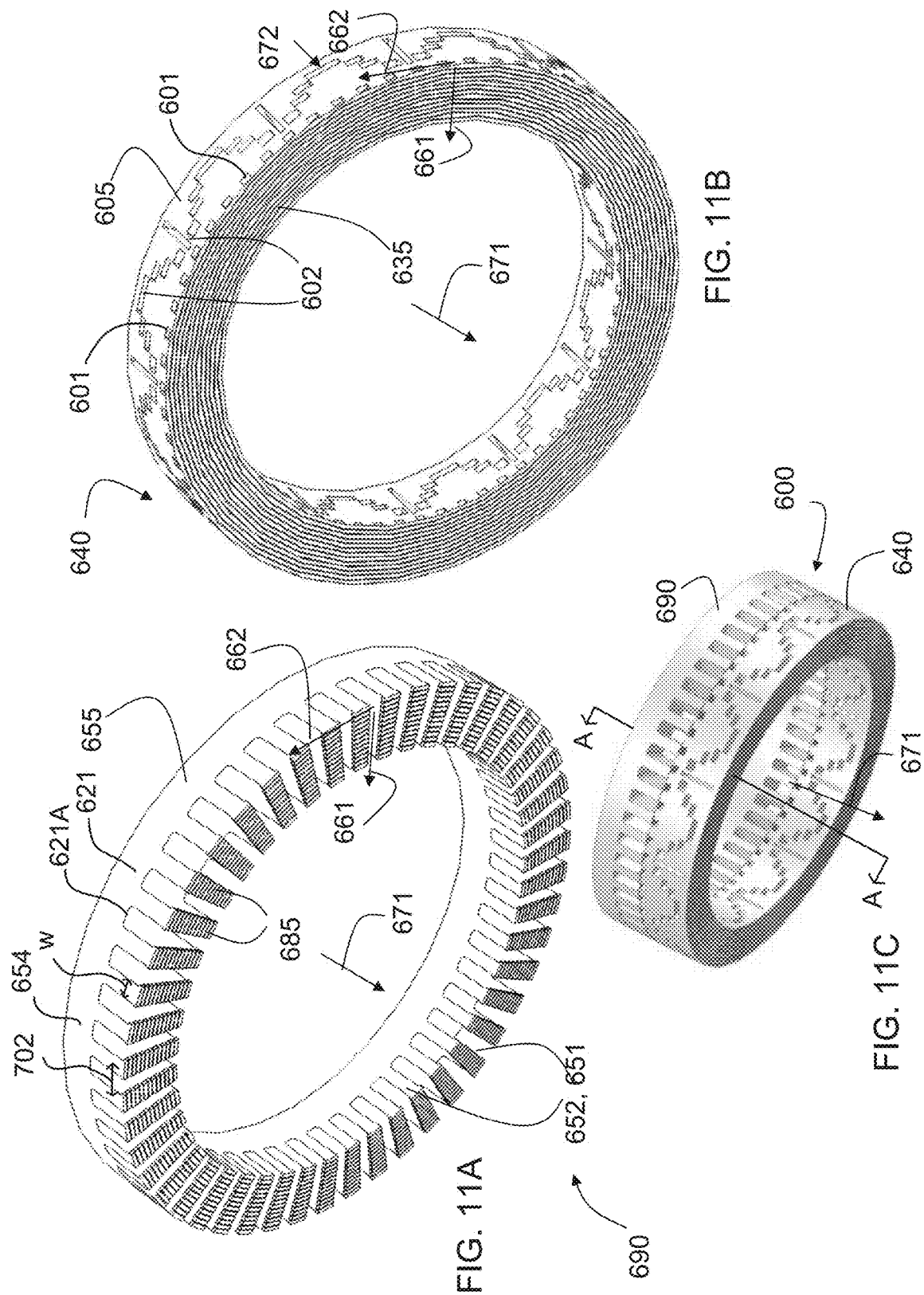
FIGS. 11A and 11B illustrate a stator and a rotor respectively of a synchronous reluctance/switched reluctance motor according to another embodiment.
FIG. 11C illustrates the FIG. 11A stator paired with the FIG. 11B rotor to provide the synchronous reluctance/switched reluctance motor.

FIGS. 11A, 11B and 11C (collectively, FIG. 11) show a synchronous reluctance/switched reluctance motor 600 according to another embodiment. Unlike the FIG. 5 embodiment with radial flux geometry, where rotor 300 is concentrically disposed within stator 400 so that stator 400 encircles rotor 300, in the FIG. 11 embodiment rotor 640 is arranged side-by-side with, and stacked axially adjacent to stator 690. In this FIG. 11 configuration, the magnetic flux at or around the air gap is oriented in the axial direction, or in the direction of the rotation axis (i.e. the axis about which rotor 640 rotates. In the FIG. 11 embodiment, the stator slot arrangement has a predominantly axial orientation (i.e. axially opening slots) similar to that of the pole region flux in both the stator and rotor cores to provide flux barriers for both the synchronous reluctance and switched reluctance modes of the hybrid motor. FIG. 11A shows a stator 690 of motor 600 having a plurality of circumferentially (e.g. azimuthally) spaced apart stator teeth 652 which are spaced apart around a circumference extending around the motor rotation axis. To facilitate flux coupling between rotor 640 and stator 690 predominantly in an axial direction 671, teeth 652 may project in axial direction 671 away from a cylindrical base portion 654 of stator 690 as shown in FIG. 11A. Each tooth 652 may also extend in a radial direction 661. Each pair of adjacent teeth 652 is separated by a slot 651. Slots 651 also extend radially and axially and, as shown in FIG. 11C, open in an axial direction toward rotor 640. FIG. 11B shows a rotor 640 of motor 600 having a first plurality of flux barriers 601 to provide spatial switched reluctance periodicity for the switched reluctance or auxiliary operations and a second plurality of flux barriers 602 to provide spatial synchronous reluctance periodicity for the synchronous reluctance or primary operations.

Stator 690 and rotor 640 include laminations 655, 605, respectively. Laminations 655, 605 differ from those of the FIG. 5 motor 480. Instead of stacking planar magnetic laminates along the axial direction 471 as described for motor 480, in FIGS. 11A and 11B the magnetic laminates are concentric, radially stacked layers. Both opposing planar faces of the stator 690 and rotor 640 may be laminated in this manner. Because of the prevailing axial orientation of the air gap flux, the eddy current induced by the stator excitation in the FIG. 11 embodiment is preeminently X-Y oriented (i.e. in the plane perpendicular to axial direction 671), which can be blocked efficiently with radial stacking of the magnetic laminates. Magnetic fluxes in both the rotor 640 and stator 690 exhibit azimuth direction 662 and the axial direction 671 to close the circuit; hence they are not affected by such radial stacking of magnetic laminates.

For the FIG. 11 configuration, secondary coils may be wrapped around individual stator teeth 652 (similarly to the FIG. 9B winding configuration) or around portions 621A of back irons 621 connecting adjacent teeth 652 (similarly to the FIG. 9A winding configuration). Primary coils may then be wrapped around groups of adjacent stator teeth 652 in a nested fashion, similarly to the primary winding described above for primary coils 409. These winding configurations may produce the desired excitations and magnetic flux paths for switched reluctance and synchronous reluctance modes of operations, based on the principles already discussed above.

Another aspect depicted in FIG. 11 is the introduction of saliencies 635 for rotor 640 and saliencies 685 for stator 690 along the radial direction 661. Saliencies 635, 685 may be provided by orienting the stator teeth 652 axially (i.e. teeth 651 project in an axial direction 671 away from a cylindrical base portion 654 of stator 690) and orienting the through-holes 672 for the rotor flux barriers 601, 602 along the radial direction 661 while varying their axial locations periodically along the circumferential/azimuthal direction to promote sinusoidal reluctance variation. Saliencies 635, 685 reduce the flux saturation effect by spreading magnetic fluxes to permit more air gap energy to be stored before core flux saturation.

Figure 16:
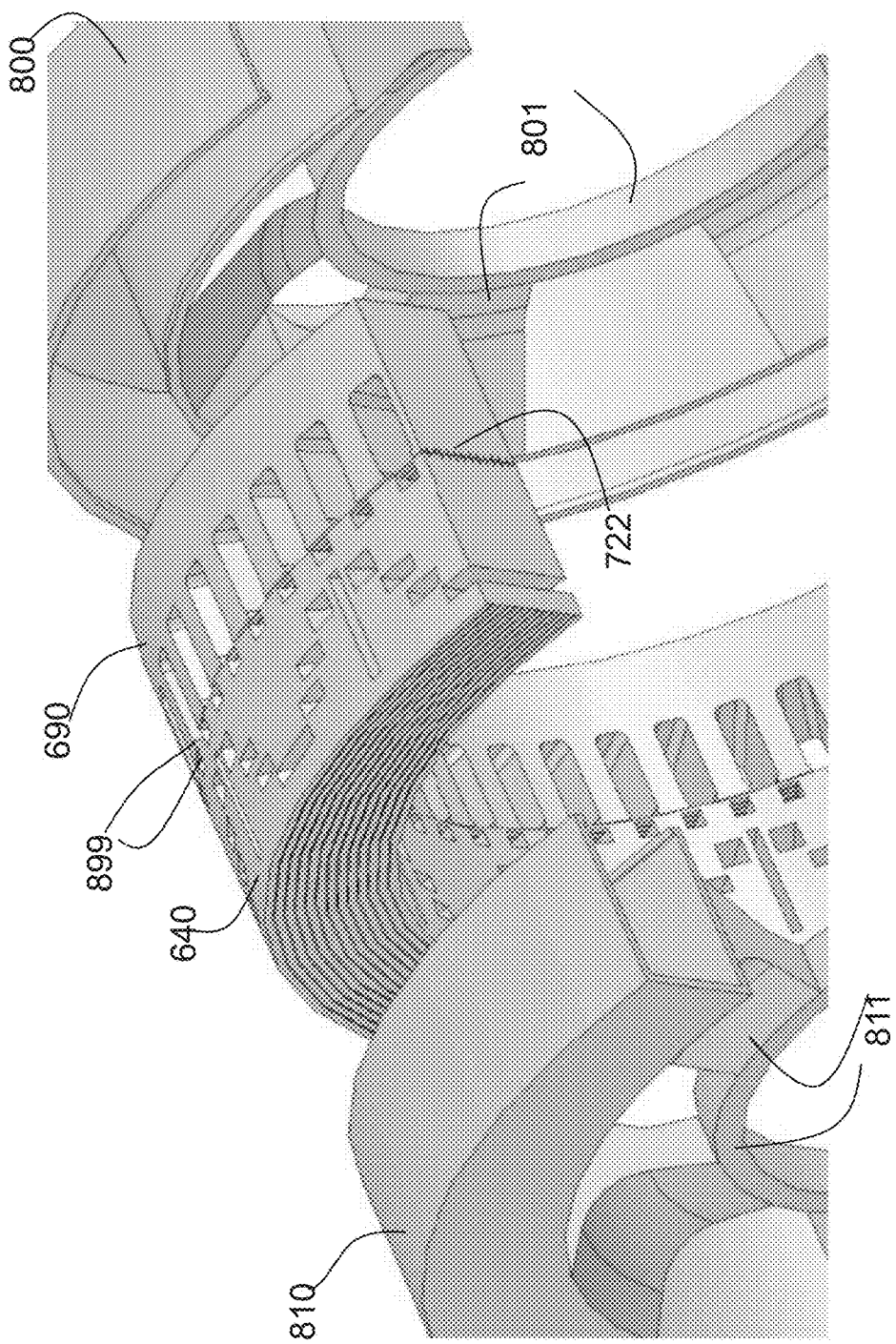
FIG. 16 is an exploded detailed partial cross sectional view of the motor of FIGS. 14 and 15.
Figure 17:
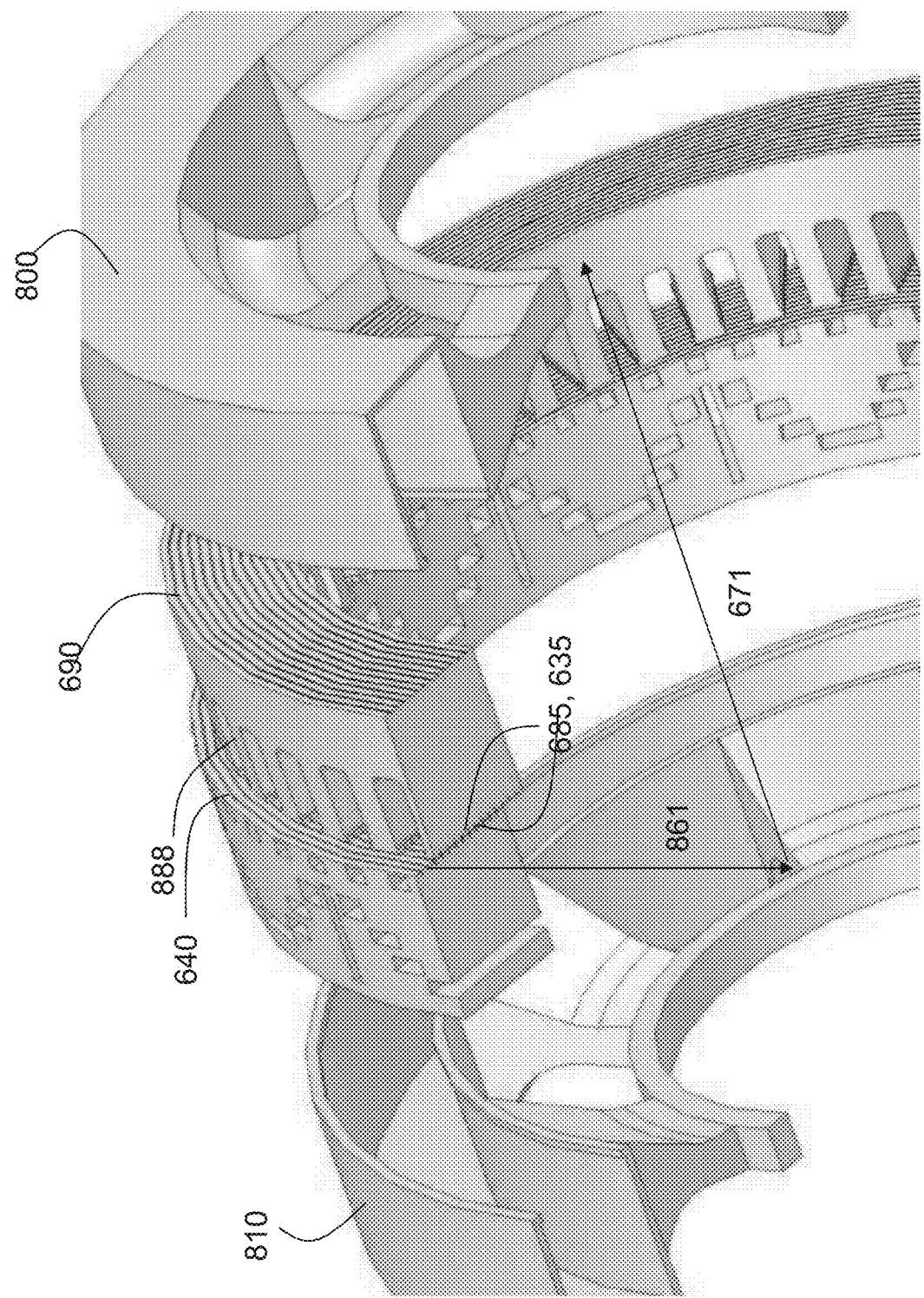
FIG. 17 is an exploded detailed partial cross sectional view of the motor of FIG. 14 showing the rotor and stator with their respective housings wherein the rotor and the stator are in an azimuthally aligned but vertically unaligned position.

Another important function of radial saliencies 635, 685 is to permit the variation of sinusoidal reluctance with respect to lateral displacement between rotor 640 and stator 690. This enables regenerative damping of lateral vibrations, providing active shock damping and suspension capabilities. In particular embodiments, a stiffly sprung lateral suspension system is provided to allow for a bounded lateral movement of rotor 640 relative to stator 690. The rotor 640 and the stator 690 are permitted to have a relative displacement radially (which may be in the generally vertical direction when motor 600 is used in an in-wheel or hub embodiment) by about 1 cm or so. As used herein, "vertical" refers to any direction generally pointing toward the center of the earth (i.e. aligned in the direction of gravity), since the suspension system constrains the rotor 640 and the stator 690 to be displaced relative to one another in such direction in response to the tire contacting bumps in the road. This relative radial/vertical displacement is best illustrated by FIGS. 16 and 17. In FIG. 16 the rotor 640 and the stator 690 are coaxially aligned, whereas in FIG. 17 the rotor 640 and the stator 690 have been vertically displaced relative to one another so that they are no longer coaxially aligned. The radial saliencies 635, 685 will not affect normal rotational operations of the motor, but when the tire hits a bump for example, the resulting vertical movement of the rotor 640 relative to the stator 690 introduces additional back EMF (due to the corrugations in the rotor and stator faces introduced by the radial saliencies). This back EMF may be used to generate electricity, as explained in more detail below. The additional compliance between rotor 640 and stator 690 makes it possible for rotor 640 to be stiffly suspended by the wheel rim, and for stator 690 to be stiffly suspended by the hub, which in turns suspends a vehicle chassis through conventional suspension linkage and suspension springs. Such a multi-level suspension system can provide a higher order filtering of road noises and vibrations than conventional two degrees of freedom (DOF) systems incorporating two-level (4th order) suspensions comprising the tire and the main suspension spring and linkages.

The radial movement between rotor 604 and stator 690 enables motor 600 to function as a linear reluctance motor/generator (also referred to herein as a motor or generator depending on the context). It acts as a generator by converting mechanical energy, e.g. the up and down displacement of the wheel, into electrical energy. The EMF induced in the stator coils by the vertical/radial movement (which is proportional to the relative velocity between the rotor and stator) creates an opposing force to the vertical displacement, causing a viscous damping effect on the vertical movement. The reverse is also possible by passing PWM modulated current to the stator coils on a sector-by-sector basis to turn the damper into an actuator. Such actuation could be used to modify the suspension force to provide better control of handling, braking, and ride comfort.

In such embodiments, the vertical movement of the wheel may be strongly coupled to the rotational motion of the wheel. Therefore, the rotational motion of rotor 640 may be considered in conjunction with its linear vertical/radial motion in the design of the linear reluctance motor/generator. Even at a relatively high vehicular speed of 60 mph, the typical vertical displacement frequency is only of the order of 10 Hz, and the root mean square (RMS) vertical displacement rate ranges from 1 cm/s to about 10 cm/s (depending on the roughness of the road surface), which is dwarfed by typical tire rim linear speed of 27 m/s.

Figure 13:
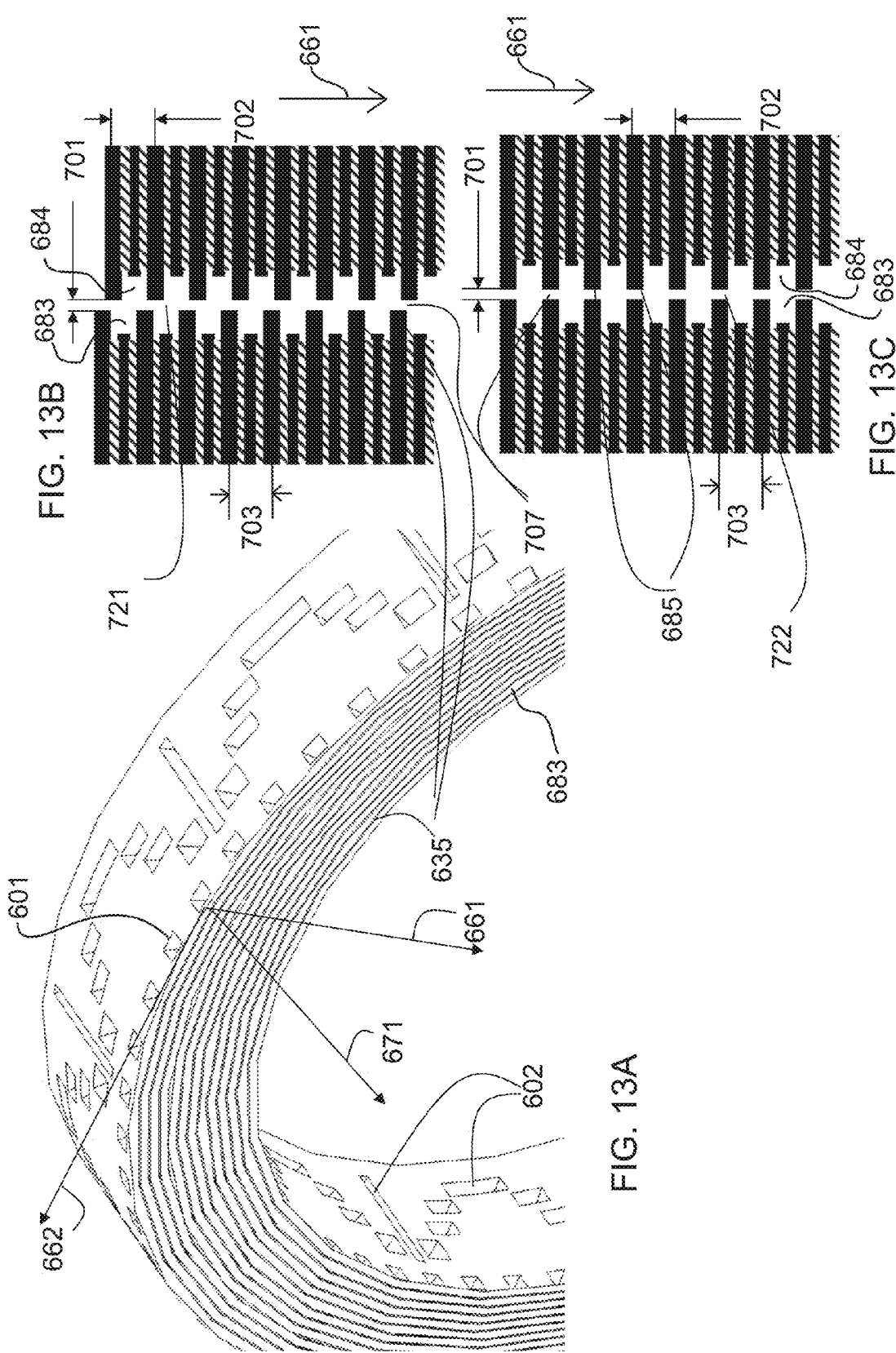
FIG. 13A is a detailed partial perspective view of the FIG. 11B rotor.
FIGS. 13B and 13C are cross section detailed views taken along line A-A in FIG. 11C showing rotor/stator radial saliencies in an unaligned and aligned position, respectively.

As noted above, radial saliencies 635 and 685 can be used to recapture energy arising from the relative vertical/radial displacement between the rotor 640 and the stator 690. Although the radial direction for a particular radial saliency is not always aligned in a vertical direction, as long as the angle between the vertical direction and radial direction is less than 90 degrees, radial saliencies 635, 685 can be used to translate vertical movement into back EMF on the switched reluctance coil. This back EMF arises from the variation of the reluctance as the radial saliencies from rotor 640 and stator 690 move from aligned to misaligned positions. FIG. 13B shows misaligned radial saliencies 635, 685 between the rotor 640 and the stator 690, and FIG. 13C shows these radial saliencies in alignment. In FIGS. 13B and 13C, the vertical direction of the illustrated view coincides with the radial direction 661. The reluctance change from moving from a fully aligned to a fully misaligned position would generate a back EMF, based on Faraday's and Lenz's laws which provide that magnetic flux that lies within a hi-Mu medium tends to resist any change in the flux value by inducing a back EMF on the coil. Therefore, when the reluctance in a particular flux path increases sharply, the back EMF would induce a voltage to try to increase the current to compensate. Where implemented as an in-wheel or hub motor embodiment, this back EMF has a frequency spectrum related to the road roughness and the speed of the vehicle, so in general it has frequencies in the range from a few Hz to a few hundred Hz. Such frequencies can be rectified to provide DC current.

The vertical/radial damping and actuation forces can be enhanced by making the width of each radial saliency larger than the air gap length between rotor 640 and stator 690. This increases the partial derivative of the reluctance with respect to the vertical/radial displacement. Since the width w of a salient stator pole along the azimuth direction 662 (see FIG. 13A) is much larger than the air gap length and the force in any direction is proportional to the partial derivative along that particular direction, this would provide roughly an order of magnitude amplification of the vertical displacement rate. Additional improvement of the vibration induced EMF can be provided by careful tuning of the wheel rotor resonance frequency to around 10 Hz to 20 Hz, so that it is close to the dominant road vibration frequencies. Such resonance effect can increase the relative rotor vertical displacement by a factor of 3 to 5. Therefore, while the vibration power induced by road irregularities at a speed of 60 mph is estimated to be no more than about 10% of the motor average output power, resonant tuning can magnify the vertical displacement rate for it to be useful to harness for mechanical to electrical energy conversion in a linear reluctance motor/generator.

The switched reluctance mode regeneration mechanism (based on rotary action of the wheel) depends on the temporal variation of the reluctance for each closed loop flux path. Consider the situation where the rotor and stator are aligned so that a particular pole pair (or pole multiplet) is at a point where the path reluctance is at a minimum. If the rotor is then caused to rotate from its current angular position, the flux path reluctance is increased, inducing a back EMF in the same direction as that of the DC-link voltage. This back EMF will in-turn increase the armature current of the switched reluctance windings encircling that pole and will lead to a current amplification, which is the basic mechanism for switched reluctance mode regeneration. Back EMF may also be induced by vertical/radial displacement between the rotor and stator. Since the path reluctance can be altered by a combination of vertical/radial and rotary motions, the same stator and rotor cores can be used to capture several independent motions at the same time. In addition, separate coils are not required to capture the vertical displacement energy since the same armature coils used for switched reluctance mode rotary motion motoring and braking regeneration would still be usable to capture vertical/radial motion as long as the vertical/radial displacement can change the reluctance. This is the reason for adding azimuthally oriented radial saliencies (which are created by providing uneven lamination to create jagged edges with azimuthally oriented and radially arranged bumps to provide reluctance variations). Since the vertical/radial motion has relatively low velocity and oscillating frequency (for typical in-wheel or hub motor embodiments), the number of bumps in the lamination along the radial direction may be sufficiently large to effectively capture the vertical motion. In addition, the air gap distance may be relatively small (less than 1 mm) to provide for a large reluctance ratio between vertically/radially aligned saliency and unaligned saliency.

The armature may be briefly energized at the beginning of each regeneration phase (which corresponds to the start of an ascent of the phase reluctance). The back EMF so induced would then provide current amplification. However, since the armature is already energized during normal rotary motoring and braking regeneration, there is no need to insert an additional brief energization phase for vertical/radial movement/vibration regeneration. Since the energy recovered by the vertical/radial movement (from suspension motion) is small, i.e. on the order of 5% to 10% of the motion, and often considerably smaller, one can use the switched reluctance windings and the associated switched reluctance converter circuit to recapture the kinetic energy contained in the suspension motion.

Since the back EMF could be directed either way depending on the angular and vertical movement at that moment, a control algorithm may be provided to detect the orientation direction of the back EMF and to either block or permit the armature current to pass through to ensure that regeneration current is captured. It may be useful in some embodiments to have a digital controller which will not circumscribe the stator armature current strictly, but will allow the armature current to make small and short duration excursions beyond the predefined limit. For example, during the constructive interference phase when the vibration induced back EMF adds to the rotational EMF, the vibration energy is converted to rotational energy, which may be manifested in the form of a slight increase in armature current and torque. Such a control algorithm permits direction conversion of vibration energy to mechanical rotational energy without the need to store the converted electrical energy in a battery, a super-capacitor, a large DC-link capacitor, or other storage device. If the added mechanical energy is not needed, the controller can then lower the average armature voltage to reduce the draw from the battery. When a back EMF generated by vertical motion occurs during braking instead of motoring, there is a reduction of current amplification. Accordingly, in this situation, when strong braking force is desired, the control algorithm may block (or at least PWM constrict) the armature current for the affected pole or poles to avoid reducing the braking force. The ability to combine different motoring and regeneration tasks into a single motor without introducing additional motors or windings advantageously provides for weight and space savings for an electric vehicle.

Because the vibration (vertical/radial) motion is relatively small compared to the rotational motion of the rotor, the vibration-induced EMF modulates the rotational EMF by a small amount. To harness the vibration motion, low-side solid state switch(es) of a half bridge inverter for the secondary coils or switched reluctance armature windings can be pulsed (on and off at the relatively low frequencies of the vertical movements) when the vibration-induced EMF and the rotational EMF are in phase (i.e. additive phase) to promote free wheeling of the armature current through the flyback diode. High-side solid state switch(es) of the corresponding half bridge inverter can be pulsed whenever the vibration-induced EMF opposes the rotational EMF, so as to reduce the draining of the battery energy to vibration. The regeneration current may be collected by a flyback diode when the switched reluctance solid state switches (both high side and low side) are switched off. This can apply also during the motor's synchronous reluctance active and inactive periods, the difference being that during the synchronous reluctance "off" or inactive period, the switched reluctance windings may be briefly excited to provide the seed magnetic flux to produce back EMF. While generally, to avoid overheating, the synchronous reluctance and switched reluctance converters are not operating at the same time, in the case of the brief excitation, for regeneration, the switched reluctance current is expected to be small enough so as to be unlikely to cause overheating. The control of the armature windings will be described in more detail below with respect to FIGS. 20, 21 and 22.

Figure 12:
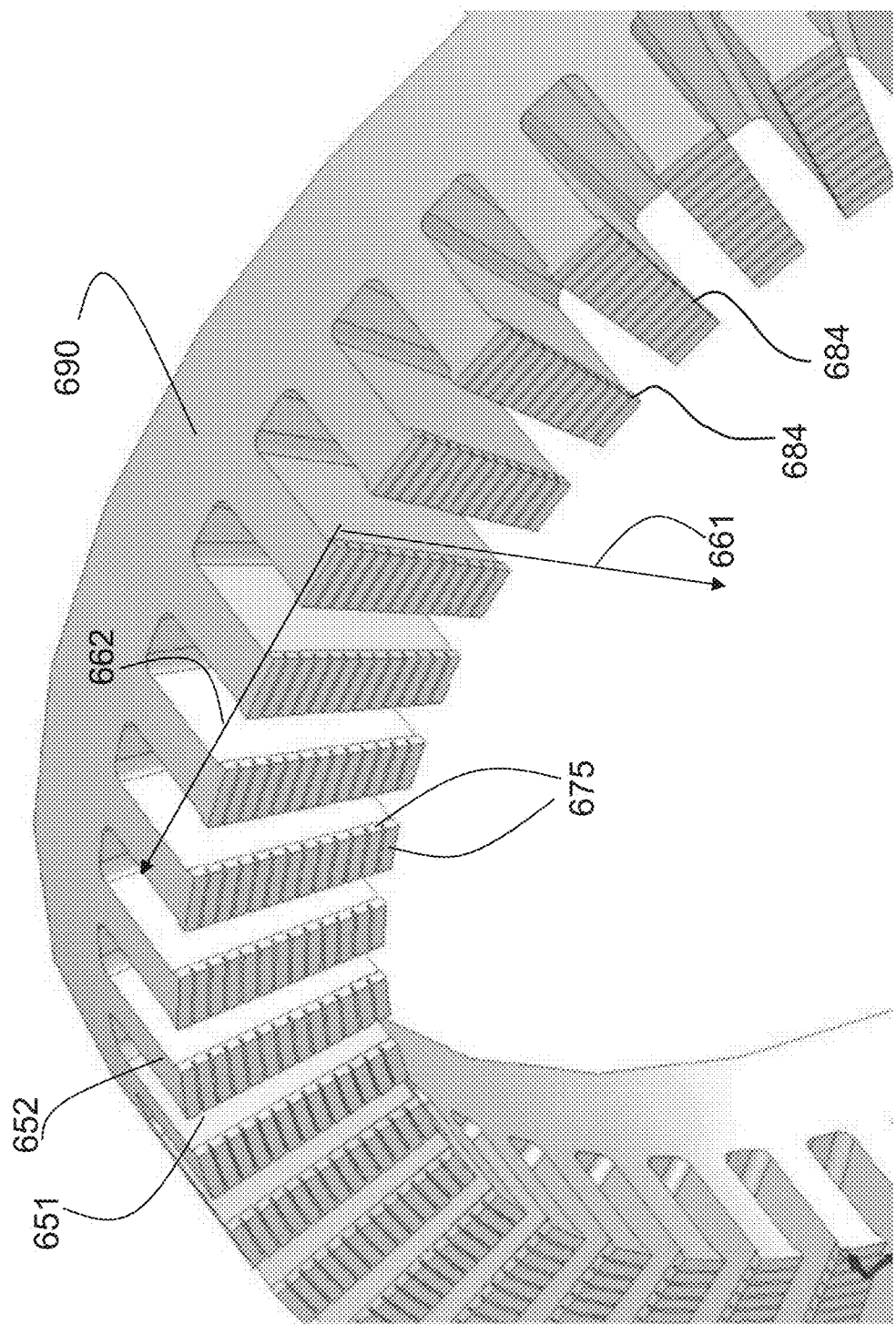
FIG. 12 is a detailed partial perspective view of the FIG. 11A stator.

FIG. 12 is a detailed partial perspective view of the FIG. 11A stator 690. As shown in FIG. 12, the face of each stator tooth 652 is provided with sub-teeth 675 oriented in azimuth direction 662 which define azimuthally oriented slots 684 between sub-teeth 675. Each slotted sub-tooth 675 within a stator tooth 652 has a sub-tooth spacing or width 702 defining a sub-tooth pitch in the radial direction 661 (see FIGS. 13B and 13C). Referring to FIGS. 13B and 13C, slots 684 are shown in aligned and unaligned radial saliency positions, respectively. Sub-tooth spacing 702 may be at least a bit longer than the air gap length 701, since as discussed above, the multi-pole magnetic field has a penetration depth about the same as the sub-tooth spacing 702.

FIG. 13A shows a detailed partial view of the FIG. 11B rotor 640. In the illustrated embodiment of FIG. 13A, the flux barrier configuration provides no external rotor saliency along the azimuth direction 662 (unlike the stator configuration of stator 690). However, to generate a pronounced reluctance saliency in the vertical/radial direction, radially spaced apart circumferentially/azimuthally extending troughs or slots 683 may be cut or otherwise provided along azimuth direction 662 to create an uneven lamination on the face of rotor 640. Troughs 683 are also shown in FIGS. 13B and 13C in aligned and unaligned radial saliency positions, respectively. The spacing 703 in the radial direction 661 between adjacent troughs 683 (i.e. the trough pitch 703) may be longer than the air gap length 701 for the same reasons discussed above for the stator sub-tooth spacing 702. In addition, the rotor trough pitch 703 may match the stator sub-tooth pitch 702 to maximize radial reluctance variation with respect to vertical/radial displacement between the stator 690 and rotors 640.

In some embodiments, an armature winding may be wrapped around individual sub-teeth 675 within each stator tooth 652 for the purpose of linear switched reluctance mode regenerative damper operations. This winding configuration may be useful for recapturing the energies (both kinetic and potential) associated with vertical/radial displacements to take advantage of the aforementioned radial saliencies 635, 685 in both the stator and rotor cores. This winding configuration permits energy regeneration each time a radial sub-tooth 675 shifts from an aligned position 722 (FIG. 13C) to an unaligned position 721 (FIG. 13B). Therefore the motor can handle energy regeneration even when different radial saliency or pole pairs 685, 635 within a stator tooth 652 contribute oppositely.

Regeneration of the vibration energy may be facilitated by constraining the lateral displacement between rotor 640 and stator 690 to be in the vertical direction. This permits a sector by sector control of the armature currents (wherein a "sector" contains neighboring poles exhibiting similar behavior with respect to the back EMF; for example, a six-sector designation can include top, bottom, upper left, upper right, lower left, and lower right sectors). In addition, energy regeneration may be facilitated by matching the stator sub-tooth pitch 702 to the rotor trough pitch 703. Pitch matching minimizes the mutual cancellations among different radial saliency pairs 685, 635 with the single coil per stator tooth type of a switched reluctance winding. A single stator switched reluctance coil can pick up any net radial reluctance change due to relative vertical/radial displacement of the rotor and stator and generate a back EMF. The effect of this extra back EMF on the electric machine depends on which sector the stator tooth is on.

As one example, the vertical (vibration-induced) back EMF and the rotational back EMF roughly reinforce each other in the top sector. In the top sector, the vertical and rotational displacements cause both the radial alignment (in radial direction 661) and azimuth alignment (in azimuth direction 662) to be approached at the same time. The rotary and vertical motions in the top sector both cause the path reluctance of a particular pole to increase, which may be used to perform energy regeneration from both motions. Meanwhile, in the bottom sector, the same rotational motion causes a rotor pole 635 to approach its respective stator pole 685 while the same vertical motion brings the rotor 640 away from radial alignment. Therefore, the reluctance changes in the bottom sector subtract from one another, rather than combining as in the top sector. In this case, the controlled phase current in the top sector may be permitted to increase whereas the controlled phase current may be reduced in the bottom sector. The work done by the EMF generated from the vertical movement to the machine in the top sector, which is equal to such EMF multiplied by the phase current, is greater than the negative work done by the EMF in the bottom sector, as the bottom vibration-induced EMF is opposite to the direction of the phase current. This produces a net absorption of the vibration energy by the motor. The degree to which the control phase current is allowed to increase or decrease within each sector is a function of the desired damping force as determined by a damper controller based on criteria such as ride comfort, controllability, and fuel economy, among others. It is noted here that in this particular aspect of the technology, the regenerative damping does not result directly in the generation of electricity, but rather, there is more excess current produced by the vertical movement in sectors where the vertical EMF is in the direction of the phase current. When taken together with the reduction of phase currents in other sectors, the excess current leads to a net reduction of DC link current, which means that less DC link energy is expended by the motor. Note that it is relevant whether the positive reinforcement of the rotary and vertical movements occurs during motoring or braking. During motoring, regeneration can take place without having to store the regenerated energy. However, during braking the regenerated energy needs to be retarded.

By contrast, some conventional machines provide for direct conversion of vibration energy into electricity to power an active electromagnetic damper, resulting in "zero power" active suspension. The technology described herein has particular advantages over such conventional machines in being able to avoid the relatively inefficient cycle of electricity generation, conversion, regulation (since the voltage needs to match the DC-link voltage) and storage, before the recouped energy can be used. Although the allowance of temporally increases above the maximum control phase current runs counter to conventional strategies of strictly keeping the maximally allowed phase current fixed, the relatively small amount of regenerative energy (estimated to be no more than 6% of the energy used for motoring, even on poor, rough road surfaces) means that any additional heating of the armature coils by such excess phase current would be relatively minor.

Figure 14:
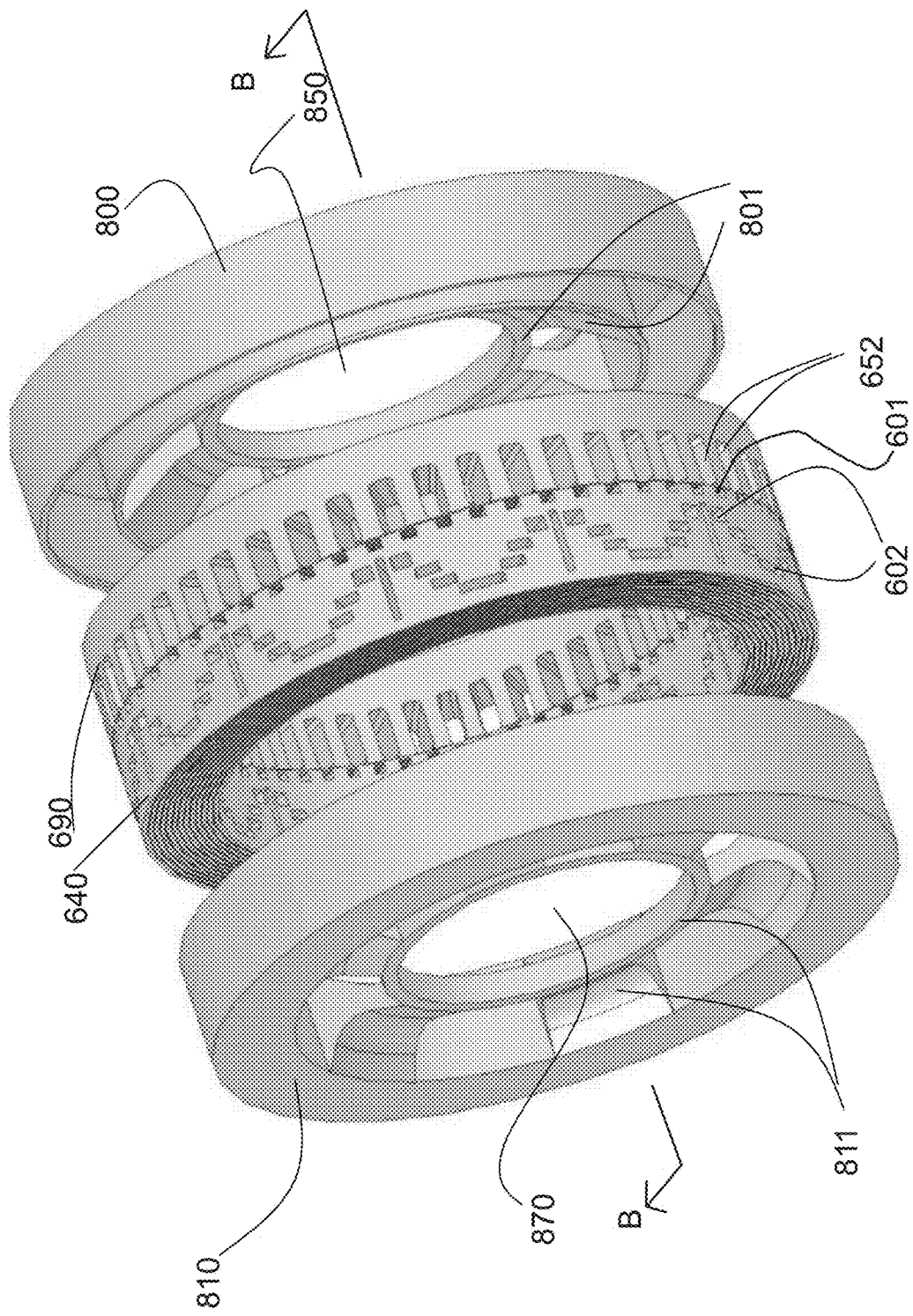
FIG. 14 is an exploded view of a synchronous reluctance/switched reluctance motor in accordance with one embodiment showing a rotor and stator with their respective housings and in an azimuthally and vertically aligned position.

FIG. 14 is an exploded view of the FIG. 11 synchronous reluctance/switched reluctance motor 600 showing rotor 640 and stator 690 with their respective housings 800, 810. Rotor 640 and stator 690 are shown (in FIG. 14) in an azimuthally and vertically aligned position. Housings 800, 810 provide mechanical support for the stator 690. Housings 800, 810 also constrain the motion of rotor 640. The relatively large center holes 850, 870 of the housings 800, 810, respectively, permit large diameter rotary bearings (not shown) to be employed to accurately constrain the air gap between rotor 640 and stator 690 to within a finite limit against the expected strong lateral impacts exerted on a hub motor.

Figure 15:
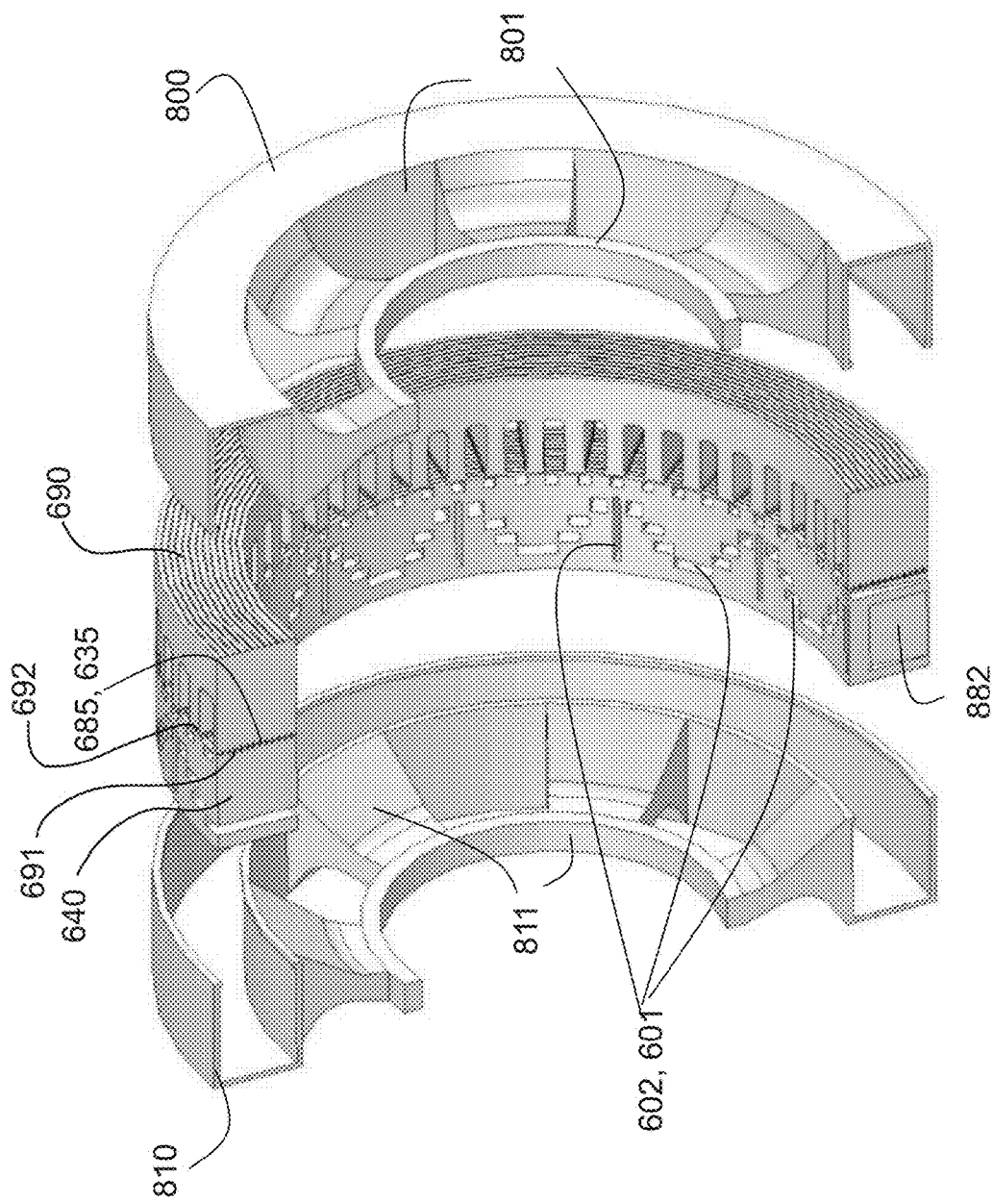
FIG. 15 is an exploded partial cross sectional view of the FIG. 14 motor taken along line B-B in FIG. 14.

FIG. 15 is an exploded partial cross sectional view of the FIG. 14 motor taken along line B-B in FIG. 14, and rotated so that housing 800 is positioned in the foreground. FIG. 15 shows housings 800, 810 encasing rotor 640 and stator 690, except for the pole faces 691, 692 of rotor 640 and stator 690 respectively. This two-part housing structure facilitates the mounting of stator 640 and rotor 690 inside the housing structure; housings 800, 810 may then be welded together (or otherwise sealed) to prevent dust particles and moisture from entering. The relatively thin features of the annular cores of rotor 640 and stator 690 can be easily deformed with the stresses and strains they are constantly subjected to. Thus, housings 800, 810 can be reinforced with spoke ring structure 801, 811, respectively to improve its second transversal cross section moment for enhanced bending stiffness, much like the web and flange construction of an I-beam.

FIG. 16 is an exploded partial detailed cross sectional view of the motor of FIGS. 14 and 15 and its housing. In FIG. 16, rotor 640 and stator 690 are also shown in an azimuthally and vertically aligned position (i.e. they are coaxially aligned—aligned both in the azimuth direction 662 and in the vertical/radial direction 861). In this position, the rotor 640 is concentric with respect to the stator 690. In such concentric position, there is maximum overlap between the pole faces 691, 692 of the stator and rotor cores. This alignment would therefore provide the highest power and torque output. Hence, it is useful to choose this position as the neutral position for an unloaded electric vehicle.

FIG. 17 illustrates the same motor components as FIG. 16, with the difference being that in FIG. 17, rotor 640 and stator 690 are aligned in the azimuth direction 662, but not in the vertical/radial direction 861—i.e. rotor 640 and stator 690 are vertically/radially displaced relative to one another so that they are no longer coaxially aligned. FIG. 17 illustrates one example position that rotor 640 and stator 690 might assume (and move into and out of) as a result of the tire of a vehicle travelling on a bumpy road surface. In the FIG. 17 position, the magnetic reluctance is in one of the local minimum points (but not necessarily the global minimum). The local minimum reluctance occurs at a vertical/radial displacement 888 which is less than the radial thickness of rotor 640 and stator 690, enabling the motor to produce a significant EMF even for relatively small vertical motions. Using the existing motor hardware structure as described above, the motor can capture this vibration-induced EMF without requiring separate rotor and stator cores for this purpose, which would add to the weight and complexity of the motor.

FIGS. 18A and 18B are perspective views, respectively, showing stator 690 and rotor 640 at one particular instance of time (FIG. 18A), and at a later instance of time (FIG. 18B), where rotor 640 has rotated by a slight amount relative to stator 690. This produces a fine pitched reluctance variation in the azimuth direction 662 which can be sensed by the switched reluctance winding which has the same pitch. For the synchronous reluctance winding, whose phase ranges over a multitude of the switched reluctance mode pitches, the rapid reluctance variations generally average out. This is especially true when the synchronous reluctance and the switched reluctance saliencies are relatively prime; it can be shown mathematically, in such cases, that the averaged torque over one synchronous reluctance period would not include the switched reluctance saliency-induced reluctance fluctuations, because the particular contributions from the switched reluctance saliencies would cancel each other out over the synchronous reluctance period.

Figure 19A:
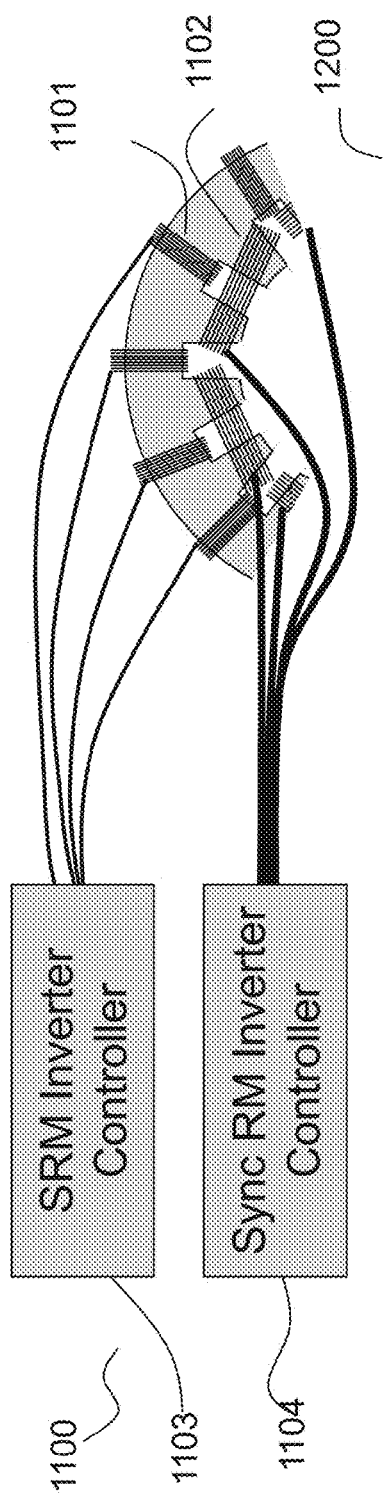
FIG. 19A schematically depicts controls of the synchronous reluctance stator windings and the switched reluctance stator windings for a motor in accordance with one embodiment.

FIG. 19A shows a controller 1103 for the switched reluctance stator windings 1101 and a controller 1104 for the synchronous reluctance stator windings 1102 for a motor in accordance with one embodiment.

Figure 19B:
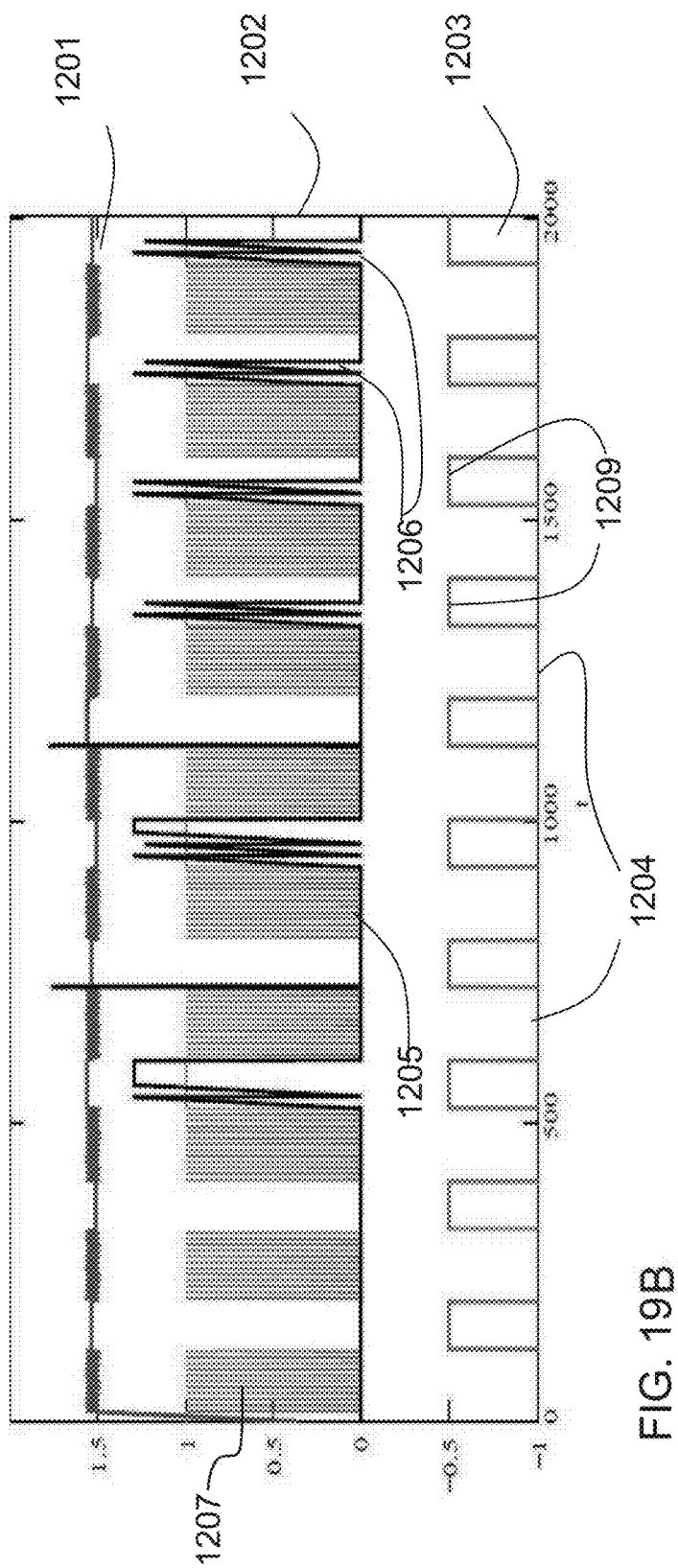
FIG. 19B is a graph illustrating successive applications of controls for synchronous reluctance mode and switched reluctance mode and its effect on the rotation speed of the rotor.

FIG. 19B is a graph 1200 illustrating successive applications of controls for synchronous reluctance mode and switched reluctance mode and their effect on the rotation speed of the rotor. Waveform 1203 in graph 1200 depicts the synchronous reluctance mode control signal and its corresponding duty cycle. Portions 1204 of waveform 1203 represent the switched reluctance control period and portions 1209 of waveform 1203 represent the synchronous reluctance control period. In the FIG. 19B example, about 60% of the time is allotted to switched reluctance control and the remaining 40% of the time is allotted to synchronous reluctance control.

Curve 1205 in graph 1200 shows pulses 1207 representing the phase voltage waveform of the switched reluctance control. Curve 1206 represents the phase voltage of the synchronous reluctance control. The maximum voltages of the switched reluctance and synchronous reluctance controls are not necessarily the same since they generally have different phase reluctances, with the finer pitched switched reluctance mode having much smaller reluctance. Their respective maximum voltages are determined by their continuous as well as pulsed current limits. In the illustrated example, the switched reluctance control voltage pulses are PWM controlled (as seen in curve 1205) to generate a nearly constant current waveform during its torque producing periods. The synchronous reluctance voltage waveform 1206 is predisposed to generate sinusoidal current waveform. The rotation speed, represented by curve 1201, has large speed fluctuation during periods 1204 of switched reluctance control, and smooth speed profile during periods 1209 of synchronous reluctance control. In the illustrated example, each switched reluctance control period 1204 is about 10 ms, while each synchronous reluctance control period 1209 is slightly over 5 ms. Since switched reluctance mode can output far higher torque than synchronous reluctance mode, switched reluctance mode accounts for the majority of the acceleration. Synchronous reluctance mode does not generate enough torque to overcome the load resistance, and there is a slight deceleration during its control period. However, neither of these disadvantages is evident in the graph 1200 due to the fast switching between the two modes and the typically large vehicular inertia.

Solid state power electronics switching can actually be much faster than a few milliseconds. However, high-speed solid state switching can result in substantial switching loss. In addition, the high inductance values of the motor windings may impose practical limits on the speed of switching. Rapid (e.g. on the order of 1 millisecond) speed switching generates audible noise and torque ripples, the latter being most prominent during switching between low torque and high torque modes. These issues can be addressed with improved sound insulation and compliant mechanical coupling of the machine output shaft to the driven apparatus, such as for example, the wheel hub rim.

The fast (e.g. on the order of a few milliseconds) PWM-like switching scheme described herein and shown in FIG. 19B is preferable to a discrete and continuous switching scheme. While a discrete and discontinuous change from synchronous reluctance mode to switched reluctance mode may result in increased torque, it is typically undesirable to stay in the switched reluctance mode for more than a few seconds, because the armature windings for the switched reluctance mode are typically of relatively gauge copper to stay within the space and weight constraints and so sustaining switched reluctance mode for an overly long duration can cause overheating. However, if discrete switches were to occur every few seconds, the resulting motion would be jerky, which can be uncomfortable for the passengers of the vehicle and can have an impact, especially over time, on the mechanical structure of the vehicle. There is also no gradation to the amount of torque the motor can apply—if the vehicle climbs a hill that is gently sloped, but not so gentle as to allow straight synchronous reluctance operation, the discrete switching scheme would cause the vehicle to surge forward briefly while the motor is in the switched reluctance mode, and then slide back down slightly when the motor is in the synchronous reluctance mode.

By contrast, by switching between the two modes in rapid, millisecond PWM-like fashion (e.g. for some embodiments, the PWM periods may be on the order of less 20 ms, 10 ms or thereabouts, and less than 10 ms), each switch would produce only a small quantum of momentum change. i.e., the momentum would increase while in switched reluctance mode and decrease only slightly in the synchronous reluctance mode. Such small momentum changes minimize jerky motion. The large inertia of the vehicle acts like a low pass filter, so that the torque experienced by the vehicle is the averaged torque of the hybrid synchronous reluctance/switched reluctance motor. This filters out the switching noise and results in smooth and continuous speed and torque changes. The high torque impulses during the switched reluctance control periods 1204 are accumulated in the form of a significant increase in the kinetic energy of the vehicle and in the rotational kinetic energy of the rotor and wheels even though the increase in the rotation speed is small due to the vehicle inertia. The excess kinetic energy is subsequently released when the synchronous reluctance control periods 1209 take over.

The hybrid synchronous reluctance/switched reluctance motor which operates with this PWM-type control may be considered to be a type of continuously variable speed machine with wide speed and torque ranges. The switching between the switched reluctance and synchronous reluctance modes permits balancing of tradeoffs between torque output and speed at any speed. This behavior is akin to that of an electric machine coupled to a continuously variable transmission box (but in this case without requiring the assistance of any mechanical aids such as a multi-speed gear box to extend the speed and torque ranges). The operational principle can be compared to trying to climb a modest grade on a two speed bicycle by constantly switching between low gear and high gear in succession, using low gear to gain enough upward momentum, and high gear to avoid losing too much speed too fast. The difference here is that all of the switching for the motor takes place in milliseconds, within such a time scale that there would be minimal (e.g. non-humanly discernable) speed increases or reductions. Hence, the synchronous reluctance/switched reluctance motor behaves almost like a true continuously variable machine. By contrast, mechanical switching between two speeds would be too slow and cumbersome to achieve such an effect. Even if it were possible to design a mechanical gear switching mechanism capable of sub-second switching, it would not likely withstand such rapid switching reliably over a long period. Therefore, conventional electric motors generally have a flat torque characteristic at speeds below the base speed and constant power/falling torque behavior at higher speeds.

Figure 20:
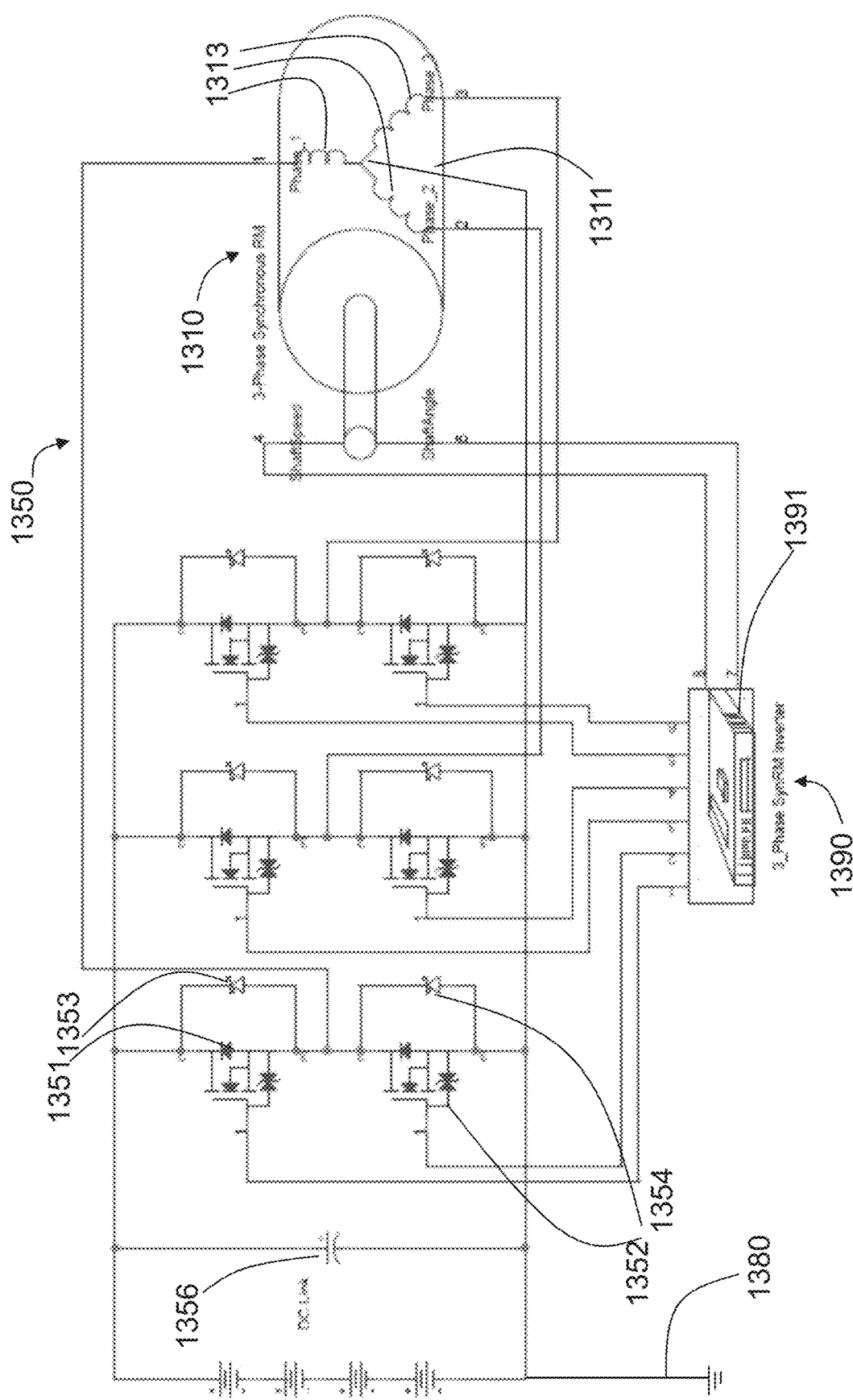
FIG. 20 is a schematic diagram for a three-phase inverter and controller for a synchronous reluctance mode according to a particular embodiment.

FIG. 20 illustrates a 3-phase inverter 1350 and controller 1390 of a synchronous reluctance machine 1310. Each phase winding 1313 is switched by a half bridge having a high side solid state switch 1351 and a low side solid state switch 1352, and a high side flyback diode 1353 and a low side flyback diode 1354 to permit back current flow whenever the associated switch has been turned off. Switches 1351, 1352 may be, for example, high power IGBT (insulated gate bipolar transistor) switches or MOSFET (metal oxide field effect transistor) switches. Both the inverter 1350 and the synchronous reluctance machine 1310 are assumed to have a common ground 1380 to where the phase currents are returned.

Figure 21:
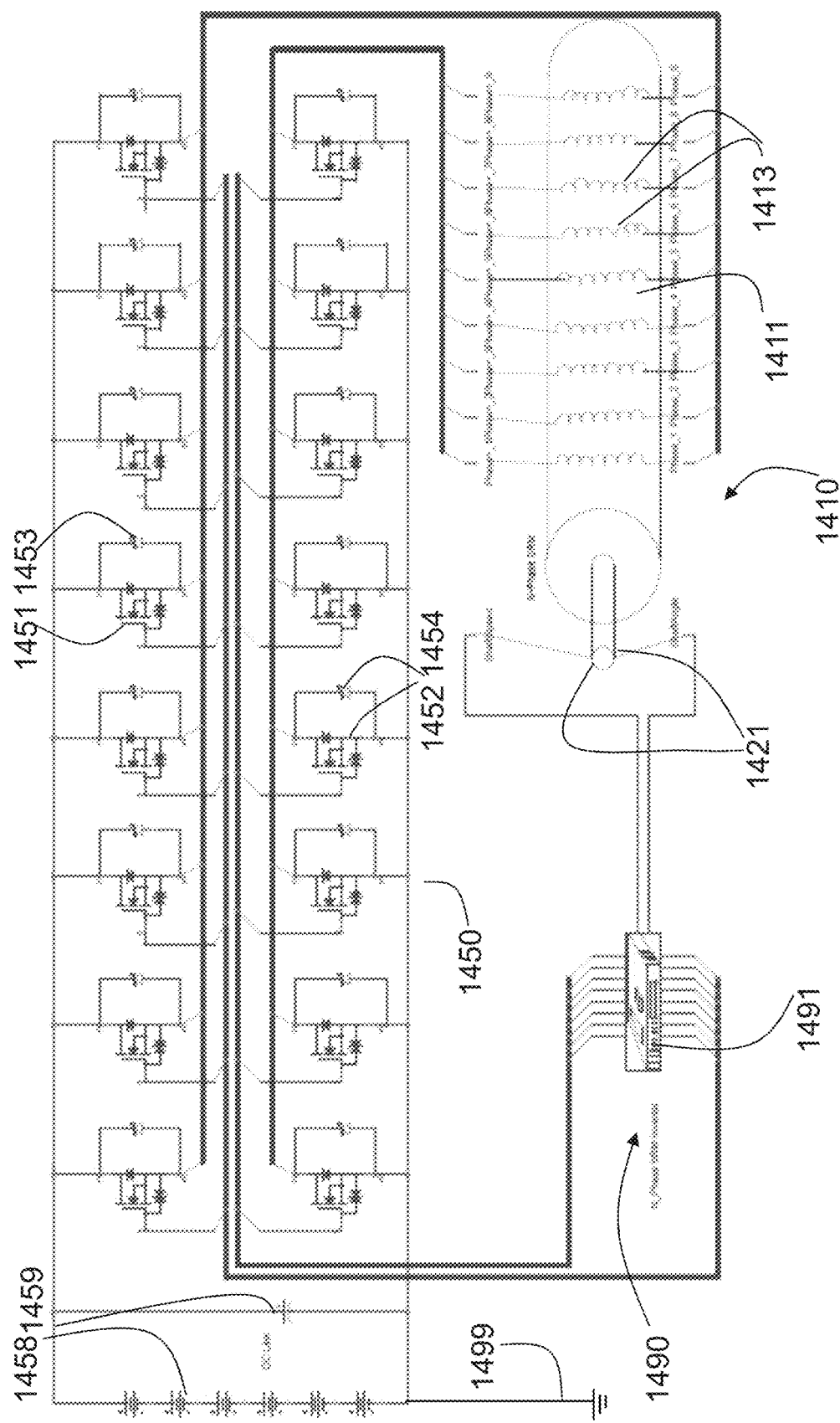
FIG. 21 is a schematic diagram of a N-phase inverter and controller for switched reluctance mode according to a particular embodiment.

FIG. 21 illustrates an N-phase inverter 1450 and controller 1490 of a switched reluctance machine 1410. Similarly to the FIG. 20 synchronous reluctance inverter configuration, each phase winding 1413 is switched by a half bridge having a high side solid state switch 1451 and a low side solid state switch 1452, and a high side flyback diode 1453 and a low side flyback diode 1454 to permit back current flow whenever the associated switch has been turned off. The main difference between the synchronous reluctance inverter 1350 and the switched reluctance inverter 1450 is that for switched reluctance control, each phase winding 1413 is not directly connected to ground 1499, but is instead isolated by low side solid state switch 1452 and low side flyback diode 1454. Since the high side solid state switch 1451 is not directly connected to the low side solid state switch 1452, but instead is connected via a phase winding 1413 which has a large inductance, there is little danger of cross conduction. No guard period is needed to prevent the conduction period of the high side solid state switch 1451 and that of the low side solid state switch 1452 to overlap. While the two-switch per phase configuration is somewhat redundant, it provides advantages in its increased reliability and flexibility over the so-called N+1 switch configurations (where N is the number of phases). The switched reluctance inverter configuration 1450 is also called a unipolar configuration since the phase current is permitted to flow only in one direction.

The poly-phase controllers described above for the synchronous reluctance and switched reluctance machines can be used for motoring operations as well as for regenerative braking operations. For regenerative braking in the synchronous reluctance mode, the stator phase windings 1313 are first excited by DC-link 1356 briefly by turning on the low side solid state switch 1352 as the rotor is rotating away from the lowest reluctance position (see FIG. 20). Since the rotor's d-axis has a lower reluctance flux path than that of the q-axis, the rotor's d-axis moves away from the energized stator tooth. Since the phase windings 1313 are energized away from the lowest reluctance position, a reverse torque is generated, wherein the rotor is briefly decelerated or is opposed by the driving torque imposed on the rotor. Consequently the EMF experienced by windings 1313 is opposite in sign to the DC-link 1356 voltage, which causes the phase current to rise sharply. After the brief excitation stage, the low side solid state switch 1352 is turned off. However, the phase current will continue to rise as the negative torque increases due to the presence of the forward EMF. The phase current, having been blocked by both the high side and low side solid state switches 1351, 1352, is now flowing through the high side flyback diode 1353 to recharge the DC-link 1356 while drawing the current from the ground 1380. This stage is the regeneration stage. This differs substantially from other types of generators such as synchronous permanent magnet generators and synchronous generators with electromagnetic rotor poles, which do not have a separate excitation stage.

Switched reluctance regeneration is similar in many respects to that of the synchronous reluctance generation described above. However, no d- or q-axis reluctances are of concern with respect to switched reluctance regeneration. Instead, the lowest reluctance position corresponds to the aligned position between the rotor and stator teeth. Here again, the regeneration comprises two separate stages, one to energize the stator windings 1413, and the second one for regeneration. During excitation by DC-links 1458, 1459, both the high side and low side solid states switches 1451, 1452 are turned on briefly with attendant negative torque generation, and then are turned off (see FIG. 21). The second stage commences immediately after both switches 1451, 1452 are turned off, during which time the phase current continues to rise, generating increasing negative torque. The phase current is now drawn from the ground 1499 through the low side flyback diode 1454 and continues on through the phase windings 1413 and the high side flyback diode 1453 to recharge the DC-links 1458, 1459.

Since the switched reluctance windings 1413 (which are shared by the switched reluctance generation operation) comprise generally thinner wires with increased phase resistance, some of the regenerative potential may be lost to copper loss. The copper resistance, along with the forward voltage drop from diodes 1453, 1454, can actually reduce the amount of phase current generated, thereby reducing the damping torque. Hence, this mode of current control can be reserved for situations when more damping force is called for, but where the regenerated phase current is still small so that copper loss is not significant. When large damping force is desired, the excitation stage duration may be extended to ramp up the phase current more quickly to thereby permit high negative torque to be generated. In the extreme limit, the regeneration stage becomes unimportant. In this limit, the forward EMF generated by the negative torque is almost completely opposed by the copper resistance, hence there is no regeneration and the control process in effect turns the switched reluctance motor into an eddy current damper.

Switched reluctance windings have a tendency to overheat, due to the thinness of the wires. At very low speeds (e.g. speeds less than 3 mph), the switched reluctance regenerative current becomes highly intermittent, since there is far less braking energy to recapture—recall that braking power is braking force times the speed, hence the lower the speed, the lower the braking power, assuming the braking torques are the same. Therefore, switched reluctance braking can be operated at low speeds for longer durations without overheating. At speeds above the low base speed of the switched reluctance regenerative braking mode (e.g. around 5 to 8 mph for the aforementioned configuration), the back EMF can become higher than the DC-link voltage. Consequently, when high braking force is desired, switched reluctance regenerative braking may be used for a short duration. To minimize the likelihood overheating, the switched reluctance excitation duration may be maintained relatively short, and the battery protection circuitry can disconnect the battery from the DC-link capacitor to prevent over voltage (and the DC-link capacitor can withstand the high voltage). In addition, switching between synchronous reluctance regenerative braking and switched reluctance regenerative braking (e.g. using PWM-like switching between the two) may be performed to reduce the risk of overheating during switched reluctance regenerative braking In some embodiments, a plurality of separate sets of DC-link capacitors may be provided, the plurality of sets of capacitors comprising a high capacity but lower voltage rated set of capacitors behind the battery protection circuitry, and a lower capacity yet higher voltage rated set of capacitor (which are more expensive and occupy much larger volume for the same storage capacity) directly connected to the electric buses of the hybrid motor. During high speed emergency braking, the protection circuit may disconnect the battery and high capacity DC-link capacitors and allows the voltage of the high side bus to float until the higher voltage rated DC-link capacitors are full or the stator temperature rises to a dangerous level, and then the switched reluctance circuitry may be cut off to allow the stator to cool down. The process can be repeated as soon as the stator temperature drops to the normal level. Allowing some portion of the DC-link voltage to be high voltage rated would permit higher speed/high torque switched reluctance regenerative braking without causing more stator heating since the switched reluctance torque (motoring or braking) is proportional to switched reluctance armature current and the back EMF (which in turn is proportional to the rotor speed). Hence, even without increasing the maximum current, at higher speed the switched reluctance regenerative braking torque can be proportionally increased if the DC-link voltage is allowed to rise above its nominal level.

It is also possible to use an off-board (on the chassis, not in-wheel) dump resistor to dissipate additional current to avoid filling up the high voltage DC-link capacitor(s). When the dump resistor is switched on to dissipate heat, the switched reluctance motor becomes fully dissipative, without any regenerative operation. In some embodiments, the off-board dump resistor may be oil cooled to increase its capacity to absorb heat and, since the dump-resistor may be off-board, it will not increase the unsprung weight.

A further possibility which may be used in some embodiments, comprises using a small capacity, high voltage DC-link capacitor bank and switched reluctance PWM switching regulation to keep the switched reluctance armature current low enough to increase the switched reluctance braking pulse duration for more effective switched reluctance braking at high speeds, relying primarily on the dump resistor to dissipate the regenerative current. This configuration would make the switched reluctance braking as effective as the Eddy current electromagnetic braking, since both rely on converting the kinetic energy into heat. Since the dump resistor is located off-board, it could be more effectively cooled without making the brake itself too heavy. The DC-link protection mechanism in effect increases the speed range available for high torque switched reluctance braking without increasing the overheating potential.

The excess regenerative power produced by switched reluctance regenerative braking could be put to good use to power other vehicular systems—e.g. the air conditioning system, the headlights, the cabin lights, etc. This power could additionally or alternatively be used to provide "active cooling" such as a heat pump or fan cooling to remove the heat from the oil bath used to cool the dump resistor or the motor itself. The possibility of using an off-wheel dump resistor and associated cooling system to dissipate the kinetic energy of the vehicle could make it possible to apply maximum braking torque for a much longer duration than could a mechanical brake, since a mechanical brake would dissipate all of the kinetic energy within the small confines of the wheel hub (or the braking disc), and without active cooling, a mechanical brake would tend to overheat.

Figure 22:
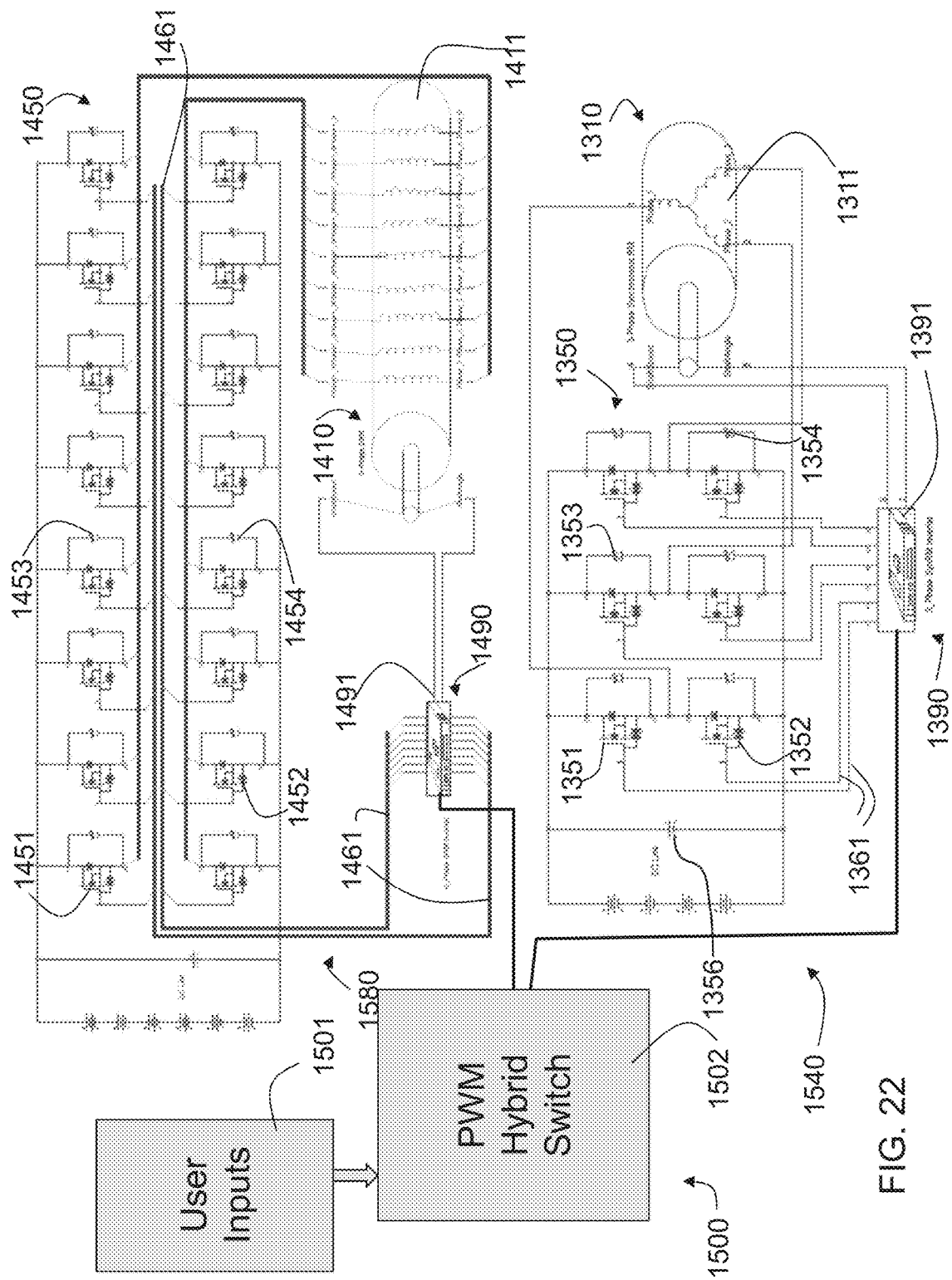
FIG. 22 is a schematic diagram of an exemplary control system for a hybrid synchronous reluctance/switched reluctance motor according to one embodiment.

FIG. 22 illustrates an exemplary control system 1500 for a hybrid synchronous reluctance/switched reluctance motor in accordance with one embodiment. System 1500 includes a controller 1502 under control of the user-provided inputs 1501. Controller 1502 controls the fast, PWM-like switching (e.g. for some embodiments, the PWM periods may be on the order of less 20 ms, 10 ms or thereabouts, and less than 10 ms) between the switched reluctance mode of operation (as controlled by switched reluctance control subsystem 1580) and the synchronous reluctance mode of operation (as controlled by synchronous reluctance control subsystem 1540). Although the switched reluctance apparatus and the synchronous reluctance apparatus are depicted as two separate machines 1410, 1310 respectively in FIG. 22, this is for clarity of illustration only. It is to be understood that they can both reside within the same stator armature as separate groups of windings, as described in the motor embodiments above.

In particular embodiments the fast PWM-like switching is achieved by controller 1502 turning on or off the respective synchronous reluctance and switched reluctance controllers 1390, 1490, or by blocking their respective gate control signals 1361, 1461. For example, a gate control signal turns the switch under its control on or off by energizing/discharging its gate. Both IGBT and MOSFET are "gated", meaning that they can be turned on or off depending on their gate voltage. A high gate voltage turns on the switch, and a low gate voltage turns it off. Since relatively small currents are involved in turning the switch on or off, this switching scheme is generally faster and uses less power than a direct two level switching scheme where a common DC-link switch is provided for each inverter to perform the second level switching.

Regenerative braking energy is typically stored in one or more DC-link capacitors, such as DC-link 1356 shown in FIGS. 20 and 22. The DC-link capacitor(s) may comprise one or more regular capacitor(s) and/or supercapacitor(s). While a regular capacitor has a relatively smaller charge capacity, it tends to be more robust and is less lossy than a supercapacitor. A supercapacitor can store more charge than a regular capacitor, but is not as efficient or robust. Therefore a supercapacitor is often used with a regular capacitor as a buffer (with the expectation that most of the time, the regular capacitor would store only excess charge). While the amount of energy stored even in a supercapacitor is small, in a dynamic driving situation the stored energy is used almost immediately. Switched reluctance mode requires constant recapturing of the magnetic energy for storage in the DC-link capacitor during the non-firing period, to be reused during the firing period. Unlike most other electric motor types, during a switched reluctance operation cycle, roughly half of the magnetic energy is converted to mechanical work, while the other half is stored for the next cycle.

If an electric vehicle is driven entirely by an electric motor, regenerative braking does not generate more charge than the motor uses. Even if the vehicle is started from the top of a hill, the relatively small amount of charge generated by regenerative braking during a long stretch of downhill driving could still be absorbed by the DC-link capacitor and the battery since the battery is almost never completely full of charge. For example, after 8 hours of recharging the battery, the battery would be about 99%-99.5% full of charge, which would be considered a full charge. The energy recouped from regenerative braking in going down a 1 km decline would contribute to less than 0.2% of the full charge that can be absorbed by the battery. The battery becomes less efficient in storing the charge when it is nearly full, and a charge controller can automatically reduce the charging current once the threshold voltage (typically between 4.1 V to 4.2 V per cell) is reached to prevent overcharging. The current generated by regenerative braking would amount to trickle charging the battery.

As already noted above, a motor in accordance with some of the embodiments described herein may be mounted as an in-wheel or hub motor. This is a potentially attractive way to free up packaging space on an electric vehicle, allowing for more battery space to extend the driving range of a vehicle before it requires charging.

In-wheel motors face challenges to meet space, weight, performance, and cost objectives. In-wheel motors may be designed to replace as many components as possible while still preserving performance and safety objectives without substantially increasing the unsprung weight of the vehicle. For example, if an in-wheel motor can provide a large enough braking torque to provide similar or better stopping distance braking performance than conventional mechanical friction brakes, the expected increase in unsprung weight may be greatly reduced.

Further weight, space, and cost savings can be realized if the suspension damper function can be partially or entirely implemented within the in-wheel motor itself. Doing so would allow the in-wheel motor to actively control the damping, effective spring rate, ride height, and other attributes of the suspension system. However, conventional active suspension systems, whether hydraulic, pneumatic, or electromagnetic in nature, are complex, heavy, and costly compared to their simple shock absorber counterparts. The replacement of conventional shocks or active dampers with an in-wheel motor that provides regeneration of vibration energy (as discussed above with reference to FIG. 11) not only reduces weight and space of vehicle components, but also can be more energy efficient and cost-effective.

Figures 23A, 23B:
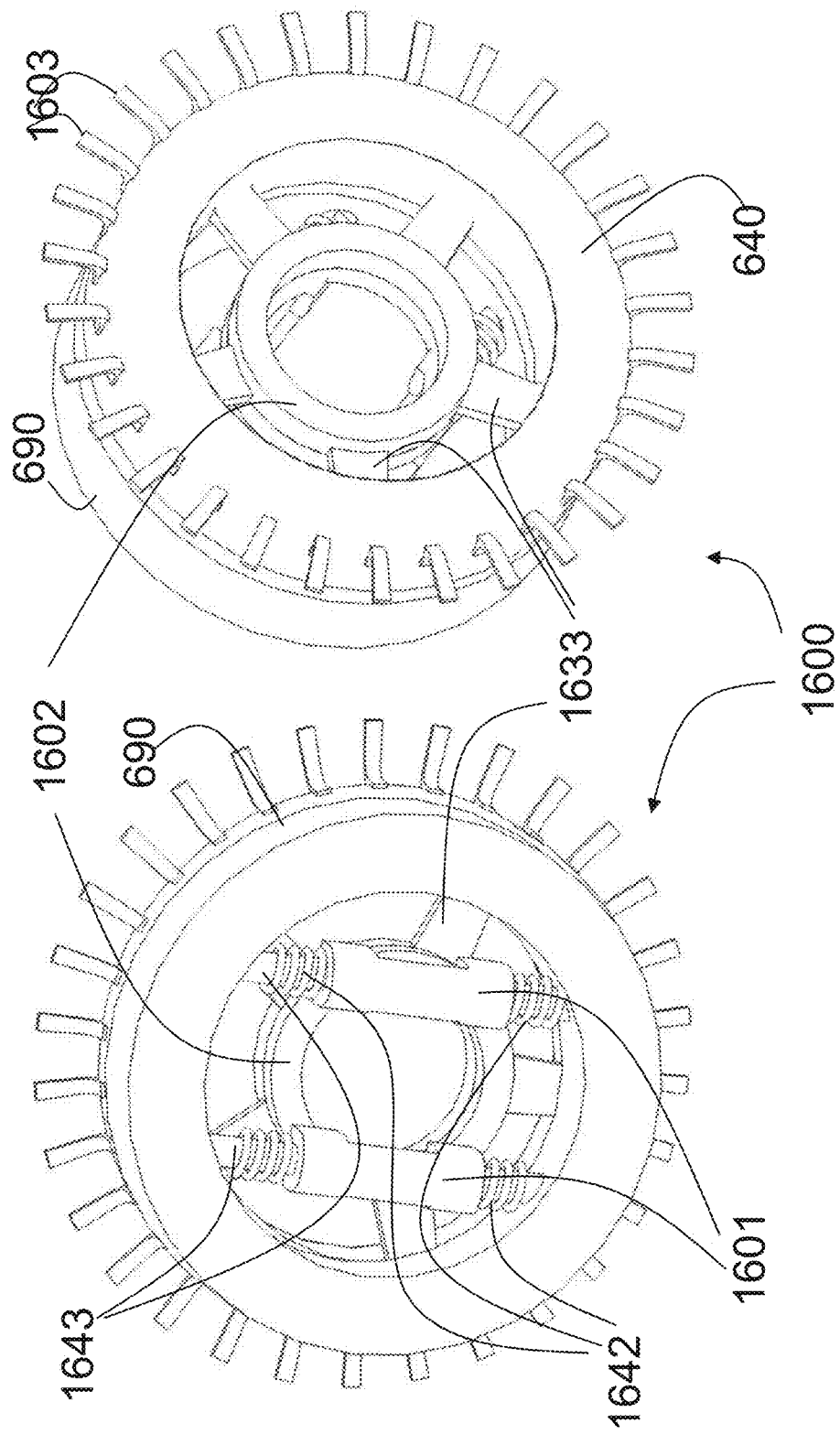
FIGS. 23A and 23B illustrate rear and front perspective views of a wheel hub motor suspension system according to one embodiment.

FIGS. 23A and 23B (collectively, FIG. 23) illustrate rear and front perspective views of a wheel hub motor suspension system 1600 according to one embodiment. Motor suspension system 1600 can be used to permit and constrain movements of the rotor core relative to the stator core along a vertical/radial axis, to enable regenerative suspension (capturing of vibration-induced EMF as described above). For example, a motor 600 as described in FIGS. 11-18 above may be suspended by motor suspension system 1600. The same armature winding for the switched reluctance mode of operation, and the same stator 690 and rotor 640, may be used to recapture the vertical/radial movements without the need to provide separate windings and stator or rotor cores. As already described above, regenerative suspension relies on a separate set of rotor core features (e.g. radial saliencies 635, 685) which have smaller pitches than the switched reluctance features.

FIG. 23B is an outside view of a hybrid synchronous reluctance/switched reluctance motor, oriented so that the rotor 640 appears in the foreground. FIG. 23A is an inside view of the same motor, oriented so that the stator 690 appears in the foreground. In the illustrated embodiment, small stubby springs 1603 radiating from the outer diameter of the rotor housing provide a laterally stiff but transversally compliant mounting of the rotor 640 to a wheel rim (not shown in FIG. 23).

The smaller diameter annular shaped member 1602 supported from the rotor inner diameter by sturdy spokes 1633 is the rotational bearing between the rotor 640 and the stator 690. In the illustrated embodiment of FIG. 23, bearing 1602 is suspended by a plurality of vertically oriented cylindrical rods 1643. Rods 1643 are mounted rigidly to the stator housing with a plurality of linear guides 1601 sprung by short stiff springs 1642. Slider guides 1601 are mounted to the rotor core. A vertical linear suspension assembly between stator 690 and rotor 640 is thus provided by rods 1643, linear guides 1601 and linear guide springs 1642. The suspension assembly permits slight relative vertical/radial movements between rotor 640 and stator 690. Rotary motion between rotor 640 and stator 690 is enabled by bearing 1602. Hence rotor 640 can move both rotationally and vertically relative to stator 690. The additional vertical degree of freedom of rotor 640 shields stator 690 from the violent vibration motions of the tire rim which is semi-rigidly attached to the rotor core. This additional vertical degree of freedom also enables the machine to recapture the vibration energy of the wheel. Since rotor 640 is lighter in weight than stator 690 and less complex, the compliance between rotor 640 and stator 690 insulates the 690 from much of the surface irregularities of the road, which may in turn prolong the life of the motor.

In addition, the stiffness of both the linear guide springs 1642 and the stubby perimeter rotor mounting springs 1603, coupled with the light rotor mass, may provide a high resonance frequency for the rotor spring mass sub-assembly which amplifies the vibration at around the same frequency. This resonance can be taken advantage of by optimizing the vertical regenerative damping to this resonance frequency as previously described with reference to FIG. 11. The regenerative damping force may be adjusted to limit the resonant movement while at the same time permitting the amplification effect of the resonance to promote regeneration.

FIGS. 24A and 24B are perspective views of the FIG. 23 motor suspension system 1600 with the addition of a steering spindle 1701 and disc spring 1733. FIG. 24C depicts the bushings 1620 for the spoke springs 1603 of the motor suspension system. In the FIG. 24A embodiment, steering spindle 1701 is mounted to stator 690 through a pair of horizontal linear bearings 1718 which may be sprung (not shown) to keep spindle 1701 centered when no horizontal load is exerted on wheel 1760. Sprung horizontal linear bearings 1718 permit compliant horizontal motion of stator 690 relative to steering spindle 1701. This compliant motion, together with the main suspension members (typically including a coil spring 1721 shown in FIG. 25 and control arms (not shown)), shield stator 690 from sudden, violent impact loadings from the road on the wheel side, and the flexures of the suspension members brought about by the large inertia of the car body during maneuvers such as hard accelerations, braking, sharp cornering, and the like. Without compliant linkages, the motor's housings and cores may be directly subjected to flexural deformations which could cause stator 690 and rotor 640 to contact one another. Stator 690 is further suspended by the rotor housing through the linear vertical bearings 1601, and rotor 640 itself is mounted to the wheel rim through the stiff spoke springs 1603. In the illustrated embodiment horizontal linear bearings 1718 comprise two separate parts: a horizontal rod attached to the steering spindle 1701, and two short sleeves near the two ends of the horizontal rod which are mounted on the stator housing. As a result, steering spindle 1701 is allowed to slide horizontally relative to the stator housing or the wheel itself. The horizontal bearings may comprise stiffly sprung so that normal motoring and braking operations are not affected. The horizontal bearings and spring shield the vehicle's suspension rods from horizontal impact forces and are important to the "self-steering" mechanism described below.

Spoke spring bushings 1620, shown in FIG. 24B and in more detail in FIG. 24C, may comprise a hollow elastic sleeve 1624 (such as hard synthetic rubber or polyurethane) encased in a strong metal outer casing 1623. The tongues of spoke springs 1603 may be inserted into elastic sleeves 1624 of bushings 1620. Bushings 1620 may then be attached by securing outer casing 1623 of bushing 1620 to wheel rim face 1734 (shown in FIG. 25) by welding, riveting or other suitable attachment technique(s). Elastic sleeve 1624 serves to provide damping and cushioning of the energy transmitted through bushing 1620. Due to their inherent hysteresis, rubber and polyurethane do not respond to vibration at high frequencies, effectively becoming stiff and non-compliant. However, metal springs 1603 have little hysteresis and can respond to very high frequencies to help to provide compliant motions at these frequencies. Stubby spoke springs 1603 also function to couple the rotational torque of stator and rotor cores 640, 690 to the wheel.

In the illustrated embodiment, disc spring 1733 is affixed to the inner radius of the rotating rotor body and is mounted on the hub of the wheel to further locate and isolate rotor 640. The overall rotational stiffness of disc spring 1733 may approximately match that of the spoke springs 1603 to distribute the torque load from rotor 640 equally between the stubby spoke springs 1603 and disc spring 1733 suspensions. This \stiffness matching may reduce the shear stress on the laminated rotor 690.

Figures 25, 25A, 25B, 25C:
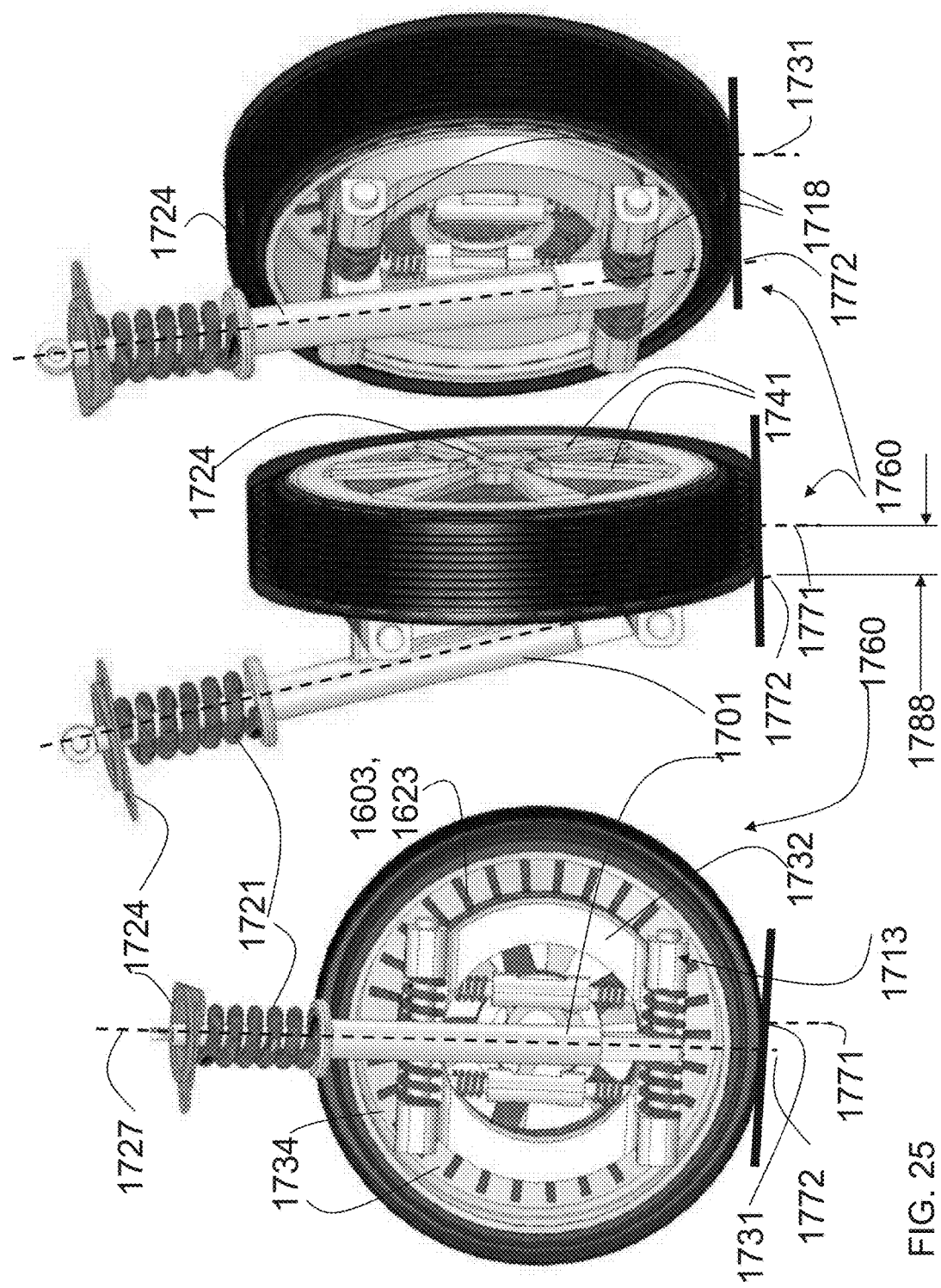
FIG. 25A is a rear perspective view.
FIGS. 25B and 25C are side perspective views, of the FIG. 23 motor suspension system.

FIGS. 25A, 25B and 25C (collectively, FIG. 25) are respectively rear, first side and second side perspective views of the FIG. 23 motor suspension system 1600, shown mounted on a wheel 1760. As seen in FIG. 25, center line 1731 of tire 1724 and ground point 1772 at which the steering axis 1727 hits the ground do not coincide. This circumstance is known as a "positive scrub radius" 1788 suspension geometry. Positive scrub radius 1788 is shown greatly exaggerated in FIG. 25B. Coil spring 1721 provides both normal compression force and torsion force to the steering spindle 1701. The combination of a slight positive scrub radius 1788 and the horizontal linear bearings 1718 produces a self-steering torque on wheel 1760. When wheel 1760 is being driven forward, the net moment arm between the tire's contact patch 1731 and the ground point 1772 of the steering axis 1727 produces a turning torque on the wheel 1760, which causes the center 1731 of the tire 1724 to move ahead of the ground point 1772 of the steering axis 1727. The horizontal linear bearings 1718 also perform the same task by allowing the motor to move past the neutral point, compressing the front bearing springs. These two effects cooperate to produce a moment arm (the fixed one from positive scrub radius 1788 and the dynamic one from the sliding motion of the motor past the neutral point of horizontal linear bearings 1718) which cause the wheel 1760 to turn until this torque is eliminated.

If both front wheels are driven with equal torque, the moment arm causes the front wheels to turn slightly toward each other in the "toe in" configuration, and the net torque would be eliminated. The toe in configuration is preferable since it makes straight line driving stable against random steering inputs from the road. However, if one front wheel is driven slightly harder than the other, the more strongly driven wheel will turn toward the less strongly driven wheel. In addition, the less strongly driven wheel will turn away from the more strongly driven wheel, until the tire center of each wheel leads the projections of steering axis 1727 and eliminates the dynamic torque arms. Since the torque arm can only be eliminated if and when the tire center is directly in front of the ground point 1772 of steering axis 1727 along the tangent of the trajectory in which the wheel is moving, the wheel can thus steer itself through the turn by controlling the hub motors to supply differential torques to their respective wheels. If all four wheels are equipped with steering spindles 1701, then four wheel steering could be accomplished by controlling the torque exerted on each wheel by the motor. Coil spring 1721 provides additional centering force to keep the wheels pointing forward when they are not driven. However, the centering force may be made small enough to allow the self-steering mechanism to function properly. Further, coil spring 1721 may be designed to produce no additional centering torque when the wheel hits a bump. To avoid bump steer, two (or more) separate coil springs 1721 may be used, one specifically for suspension, and the other to provide self-centering torque.

FIG. 26A is a side cross sectional perspective view, FIG. 26B is a rear perspective view, and FIG. 26C is a perspective side view (collectively, FIG. 26), of a motor suspension system 1600' according to another embodiment, shown mounted on a wheel 1760. In this embodiment, steering spindle 1801 is mechanically constrained to the stator housing by a parallel four-bar linkage 1860 with compliant bushings on all four joints 1866 to provide for a larger degree of horizontal movement and also some vertical movement as well. As the horizontal movement is preferably restricted to less than about 1 cm, the primary constraint is to keep the spindle 1801 at almost exactly the same distance from the stator housing.

Neither the four-bar linkage 1860 nor the lower connection link 1802 provides much support for vertical load transfer. The four-bar linkage 1860, together with lower connection link 1802, permits the stator to transfer lateral impact from the wheel 1760 to the main suspension members. The illustrated embodiment has a modified Peaucellier straight line linkage 1805 for transfer of lateral impact. This linkage 1805 has four stiff equal length parallelepiped links, forming the four-bar linkage 1860, supported by an axle passing through the center of the stator housing (but not necessarily that of the rotor). The linkage 1805 also has two equal length arms 1867 pivoted from below, and a single shorter arm 1868 pivoted from above the stator center. If all six links were perfectly rigid, the center of the stator would be constrained to move only in the horizontal direction. However, in the illustrated embodiment, the four-bar linkage 1860 is made with stiff leave spring like construction 1865 with wide span to ensure flexural rigidity, but permits some bending so that a true horizontal line is no longer strictly observed. This provides vertical support of the stator while still allowing some springy vertically compliant movements of the stator relative to that of the steering spindle assembly.

Since the constraints of linkage 1805 (and to a lesser degree, the lateral restraints of linkage 1860 and lower link 1802) allow the motor to move more freely in the horizontal direction than in the vertical direction, wheel 1760 can perform self-steering in a similar manner as described above for the FIG. 25 embodiment. The additional spring force enabled by the linkage 1860 causes the motor assembly to be further isolated from the main suspension members, producing a higher order low pass filtering effect which blocks more of the high frequency road noises from reaching the chassis of the vehicle. This improves not only ride comfort, but also the fuel efficiency. The fuel efficiency is improved because the main cabin of the vehicle is effectively an energy sink for high frequency vibrations. By blocking such road noise from reaching the cabin, more energy can be returned. A suitably deformable bushing (e.g. made of rubber or polymer) which damps high frequency noise can be paired with a metal springy element in series (much like bushings 1620 for spoke springs 1603) so that at the highest frequencies, the metal springs can take over to provide compliant relief for the "frozen" high hysteresis rubber, when it is forced to respond to swift movement from high frequency road irregularities.

Figure 27:
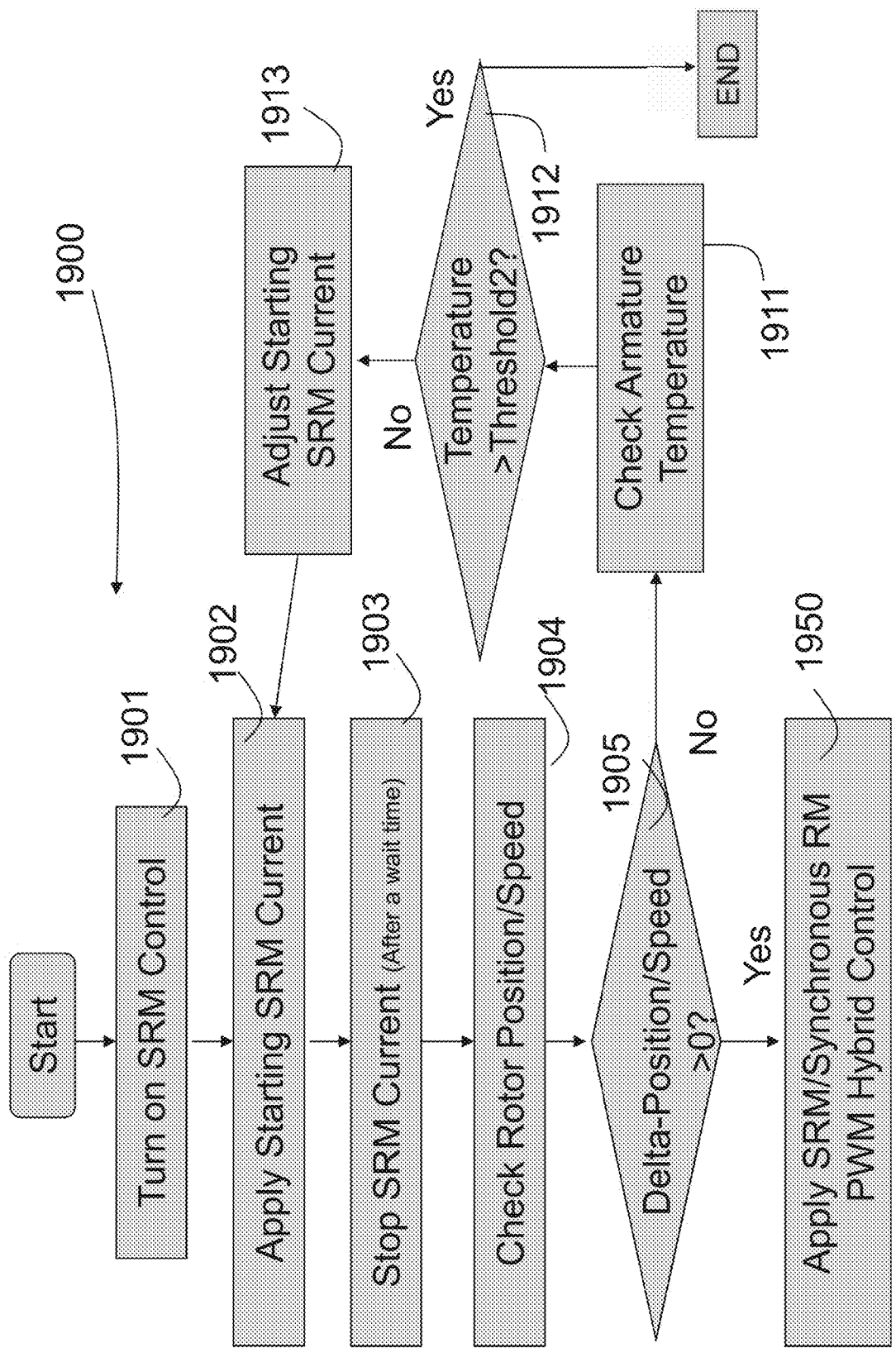
FIG. 27 is a flowchart of a method of controlling and operating a motor according to one embodiment that may be used for high torque operations.
Figure 28:
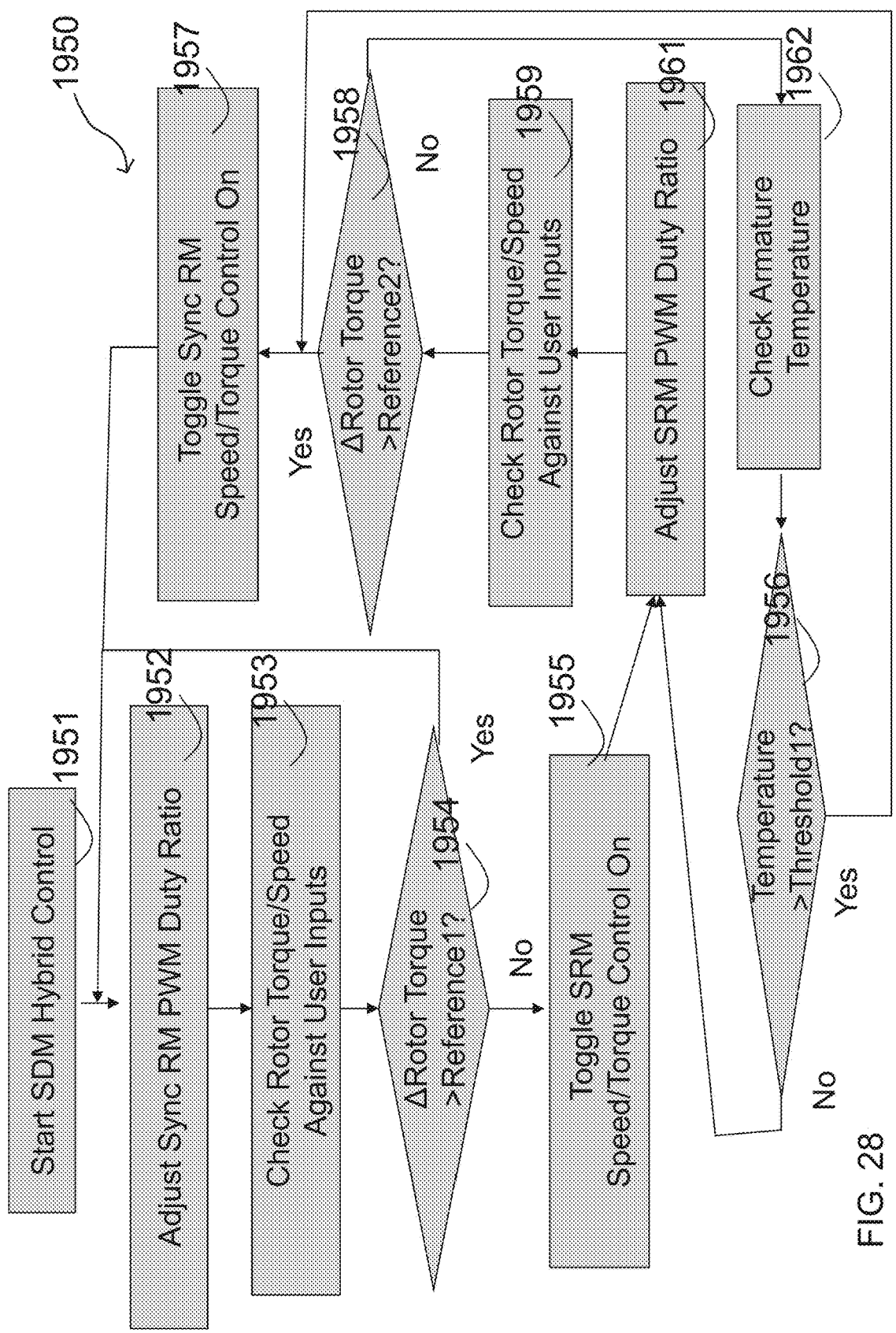
FIG. 28 is a flowchart of a method of driving a motor (for motoring operations) using both synchronous reluctance and switched reluctance modes according to one embodiment.
Figure 29:
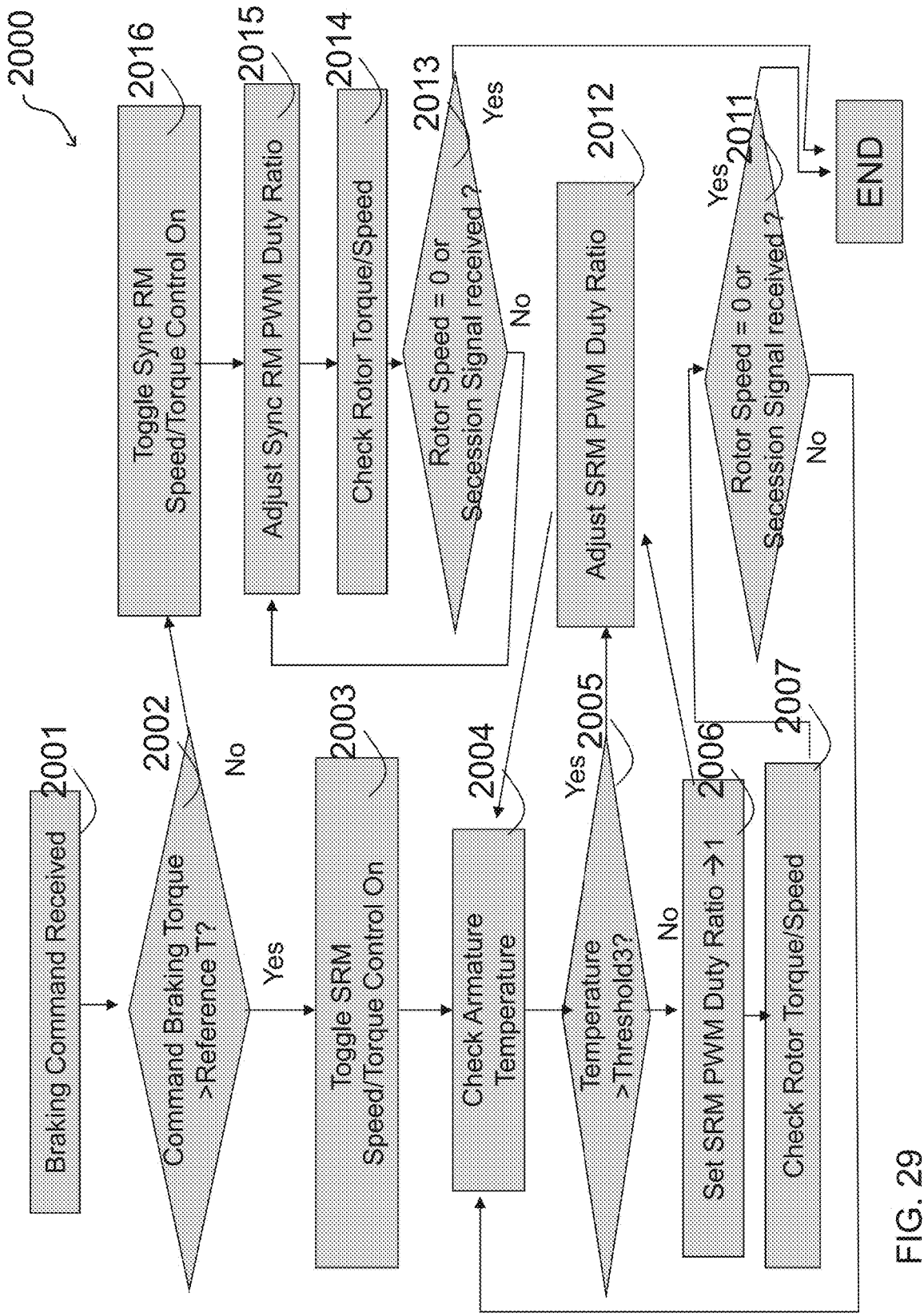
FIG. 29 is a flowchart of a method of providing braking using both synchronous reluctance and switched reluctance modes according to one embodiment.

FIGS. 27, 28 and 29 illustrate exemplary methods for controlling a hybrid synchronous reluctance/switched reluctance or software-defined motor in a vehicle. The steps of the methods shown in FIGS. 27, 28 and 29 may be implemented as software, hardware, firmware or a combination thereof. All or parts of such software, hardware or firmware may be embodied in controllers 1502, 1390 and 1490 of FIG. 22. Where the steps are implemented as software, one or more processors may carry out the steps by executing software instructions provided by software contained in a program memory accessible to the processor(s).

FIG. 27 shows a method 1900 that may be performed for high torque applications (e.g. starting a vehicle from rest, or accelerating up a hill) according to a particular embodiment. Since the switched reluctance mode is predisposed to provide a much higher starting torque and generally a higher torque relative to the synchronous reluctance mode, method 1900 begins by turning on the switched reluctance control at block 1901 (e.g. controller 1490 of FIG. 22 is activated). Once the switched reluctance control is started, a large starting current pulse is sent to the switched reluctance coils at block 1902. The starting current pulse is stopped at block 1903, and the rotor position and torque or speed is sensed at block 1904. At this point there may still be switched reluctance current in the coils through the flyback diodes 1453, 1454. The duration of the current pulse can be used to provide an estimate of how fast the armature temperature is expected to rise and how long it may take for the armature temperature to reach an unacceptable level. This current pulse duration can be used during the hybrid control method of FIG. 28 to assess armature temperature. If the rotor displacement and speed are detected to be nonzero at block 1905 (block 1905 YES branch), then the control is switched over to a hybrid control method 1950 discussed below in FIG. 28. However, if no rotor movement is detected at block 1905 (block 1905 NO branch), then the armature temperature is compared at block 1911 to a configurable threshold value "threshold2" at block 1912. If the armature temperature is above the threshold value at block 1912 (block 1912 YES branch), then the method 1900 terminates with the output of a fault condition to protect the motor. If the armature temperature is lower than the threshold value (block 1912 NO branch), the switched reluctance starting current pulse is adjusted at block 1913 and the process is repeated, starting at block 1902. The starting current pulse can be adjusted upward by a factor (such as, for example, 1.25) to produce a higher starting torque since the previous starting torque is not sufficient to move the vehicle. This procedure can be repeated several times until the starting current value exceeds a predetermined safe limit. The repetition of method 1900 may be performed on the basis that when there is too much inertia of the vehicle, the vehicle might not have moved sufficiently for reliable detection of its movement even if the switched reluctance operation is capable of providing sufficient torque. Since torque is not normally directly measured, only repeated testing can provide an adequate estimate of the speed and torque of the motor.

FIG. 28 is a method 1950 of providing hybrid control to drive a motor by toggling between synchronous reluctance and switched reluctance modes according to a particular embodiment. Method 1950 may be executed so that the switching between the motor's synchronous reluctance and switched reluctance modes takes place quickly, such as on the order of every few milliseconds. Method 1950 therefore provides fast, PWM-like or hysteresis switching between the two modes. Method 1950 begins at block 1951 by starting the hybrid controller (e.g. controller 1502 of FIG. 22) and the synchronous reluctance controller (e.g. controller 1390 of FIG. 22). The synchronous reluctance mode PWM duty cycle (the ratio of the excitation duration to the phase period) is computed and adjusted at block 1952. (To control the synchronous reluctance operation, an inner loop-outer loop feedback control strategy may be applied wherein the inner current loop controls the torque and the outer loop controls the speed by either increasing or decreasing the set torque. A vector control scheme or field oriented control algorithm may be used to control the inner loop. The field oriented control algorithm may employ PWM switching to control the direct axis (d-axis) current and the quadrate axis (q-axis) current of the synchronous reluctance windings. The PWM duty cycle for each axis is first estimated and applied. When the d- or q-axis current differs from its desired value, the PWM duty cycle is either increased or decreased slightly (using a predictive algorithm) until the current values are within a configurable tolerance level. PWM switching may be used instead of analog control to minimize converter power loss. In some embodiments, however, analog control could be used. The concept of providing an inner loop and an outer loop is so that the driver can set a value for the target speed, and the control algorithm would find a torque value which would cause the vehicle to travel at close to the target speed. If the motor speed is lower than the target speed, the target torque value is increased. Otherwise, it is either decreased, or not changed if the motor speed is within the tolerance of the target speed.

At block 1953 the rotor torque and speed are compared with their corresponding desired values (e.g. user inputs 1501 as provided in FIG. 22). If at block 1954 the rotor torque is greater than the corresponding desired value by a configurable reference torque value "reference1" for synchronous reluctance mode (block 1954 YES branch), the PWM duty cycle is readjusted based on the new data, and the steps at blocks 1952, 1953 and 1954 are repeated. If, on the other hand, the rotor torque is less than the corresponding desired value plus the reference torque value "reference1" (meaning that the synchronous reluctance mode cannot handle the high torque load—block 1954 NO branch), then the control is toggled to the switched reluctance control at block 1955 (e.g. controller 1490 of FIG. 22). At block 1961, the switched reluctance mode PWM duty cycle is computed and adjusted (similar to the inner loop-outer loop feedback control strategy described above for switched reluctance mode; the PWM duty cycle in this case may be used to control how long the phase coil of the switched reluctance winding is excited by the DC-link voltage within a switching period which is fixed in such a scheme. For example, the PWM switching frequency could be 100 times a second, which is achieved by setting the PWM timer to 10 ms. Typically, the PWM duty cycle, or the percentage of the time the coil is excited, is first set to 100%. Thus the coil is excited/the switches are turned on for the entire 10 ms. If the torque produced is larger than the target value, then the PWM duty cycle is reduced gradually until the torque is smaller than the target torque and this process is repeated as many times as it takes for the produced torque to approach the target torque. Note that the PWM duty cycle adjustments described above, for the adjustment of torque/speed for either synchronous reluctance or switched reluctance operations, are not to be confused with the fast PWM-like switching between synchronous reluctance and switched reluctance modes of operation described herein.

At block 1959, the rotor torque and speed are again compared with their corresponding desired values. If at block 1958 the rotor torque is greater than the corresponding desired value by a configurable reference torque value "reference2" for switched reluctance mode (block 1958 YES branch), then the control is toggled back to synchronous reluctance mode at block 1957. If, on the other hand, the rotor torque is less than the corresponding desired value plus the reference torque value "reference2" (block 1958 NO branch), then the armature temperature is checked at block 1962 to ensure no overheating has occurred. The switched reluctance mode of operation continues only as long as the temperature is low enough that no overheating has taken place, and where synchronous reluctance mode cannot provide sufficient torque for the vehicle operation desired. This control method assumes that there is no overheating with the synchronous reluctance mode of operation. In some embodiments, the armature temperature can be checked periodically even in the synchronous reluctance mode of operation to protect the motor from overheating.

Note that the two reference torque values "reference1" and "reference2" at blocks 1954 and 1958 may be different to provide hysteresis-like switching (much like a thermostat which switches on a heater if the room temperature is below a lower threshold value and switches off the heater if the room temperature is above a higher threshold value). If the two reference values are equal, then continuous back and forth switching could result; such chattering could be avoided by setting reference torque value "reference1"<reference torque value "reference2", for example.

FIG. 29 is a method 2000 of providing braking using both synchronous reluctance and switched reluctance modes according to a particular embodiment. Since the synchronous reluctance mode is generally more suitable for regenerative braking than switched reluctance mode, for this particular embodiment of method 2000, regenerative braking capability is provided only by synchronous reluctance mode. Switched reluctance mode is used to apply high torque dissipative braking similar to a mechanical brake.

Method 2000 begins by receiving a braking command 2001 (e.g. the user may depress the vehicle's brake pedal which sends a braking command indicating a braking force to controller 1502). If the braking force requested is larger than a configurable reference value T at block 2002 (block 2002 YES branch), then synchronous reluctance mode does not have sufficient torque capability for the braking request, and the switched reluctance mode is activated at block 2003. During the switched reluctance mode of operation, wherein switched reluctance dissipative braking is applied, the armature temperature is periodically checked at block 2004. If the temperature is below a configurable threshold temperature value "threshold3" at block 2005 (block 2005 NO branch), then switched reluctance mode is permitted to proceed with the PWM duty ratio set to 100% at block 2006, until the rotor speed reaches zero at block 2007, or when a secession of braking command is received at 2011 (e.g. the user lifts his foot off the brake pedal). If the armature temperature increase beyond the threshold temperature value "threshold3" at block 2005 (block 2005 YES branch), then the switched reluctance mode PWM duty ratio is reduced at block 2012 to reduce the rise in armature current. However, the switched reluctance mode would be permitted to continue, since continued braking would take precedence over preserving the motor. If the braking request is less than the reference value T at block 2002 (block 2002 NO branch), then regenerative braking (synchronous reluctance mode) is turned on at block 2016. The PWM switched reluctance duty cycle would be set and adjusted at block 2015 in accordance with the rotor speed and torque sensed at block 2014. Once the rotor speed has reached zero, or a secession of braking command is received at block 2013 (block 2013 YES branch), the motor power is turned off (END). If at any point in the above-described process, there is any change of braking command (as indicated by the driver's operation of the braking pedal), this is treated as a new braking command, and method 2000 proceeds to block 2001.

Figure 30:
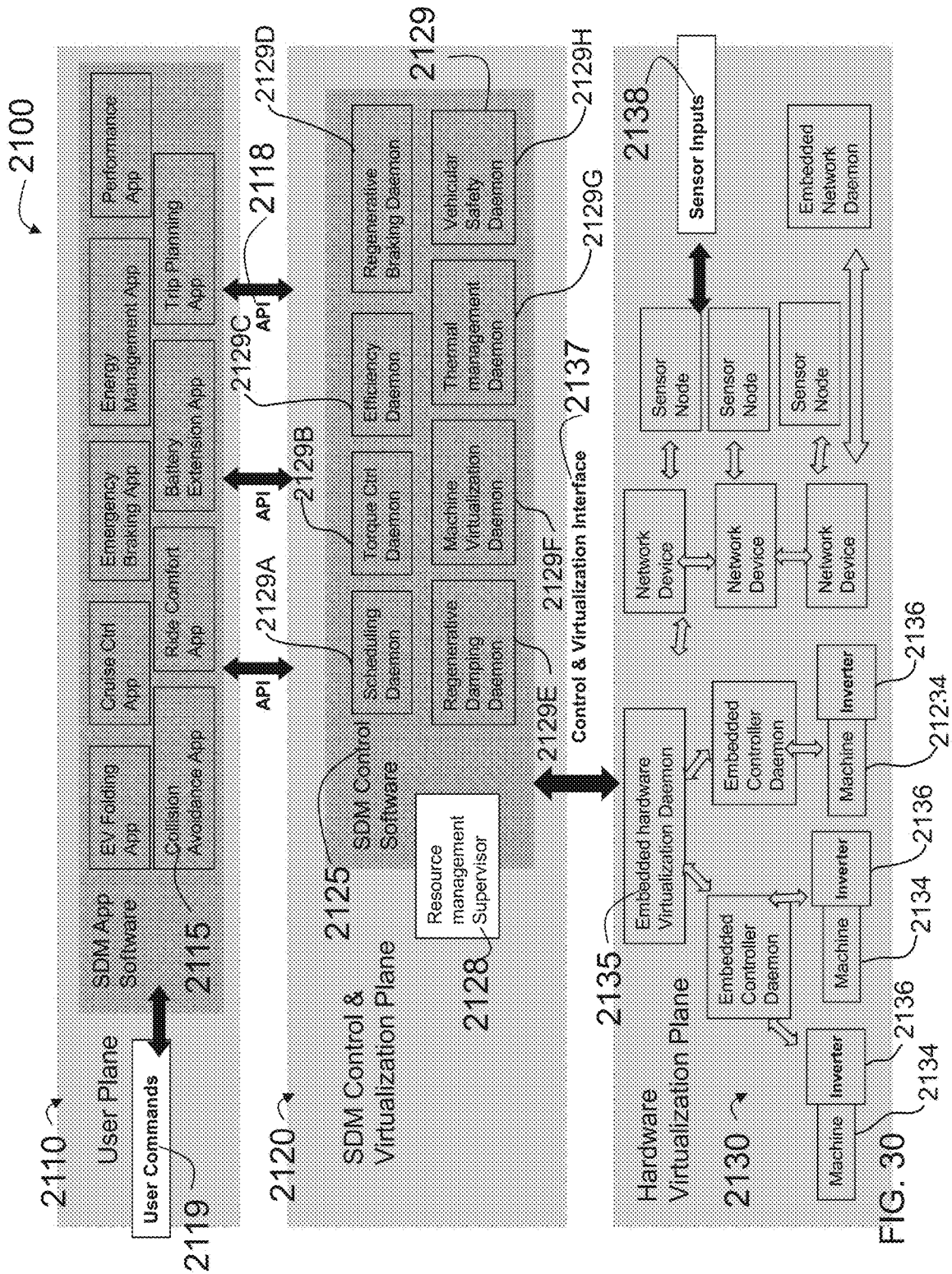
FIG. 30 is a schematic illustration of the architecture for a control system for driving a vehicle using one or more of the software-defined motors in accordance with embodiments described herein.

FIG. 30 is a schematic illustration of the architecture for a control system 2100 for driving a vehicle using one or more of the software-defined motors described herein according to a particular embodiment. Control system 2100 has a logical architecture which comprises a number of layers including a hardware virtualization plane 2130, a software control and virtualization plane 2120, and a user plane 2110. The machine intelligence centrally resides in the software control and virtualization plane 2120. Due to the machine intelligence, the machine appears to user plane 2110 as a single logical machine capable of morphing into one of a plurality of distinct machines, each with unique operational characteristics, or a hybrid between two or more of these machines. By way of example, such a logical machine could be operating as a power efficient electric motor with modest torque capable of high speed operations, a high torque electric motor capable of delivering increased power at lower speed, an efficient regenerative brake, a high torque dissipative brake, a regenerative damper, and anything in between or a combination thereof. Thus this logical machine, with its ability to provide torque and speed reduction over a wide continuous speed and torque range, could be considered as a software-defined equivalent of an electric machine that is mechanically coupled to a continuous variable speed transmission. However, this software-defined machine would not require the use of any physical continuous variable transmission.

The logical machine of the FIG. 30 embodiment is controlled by a set of software-defined motor control daemons 2129. Daemons 2129 include:

daemons which provide a specific software virtualization task such as scheduling daemon 2129A, torque control daemon 2129B (which varies the PWM duty ratio to magnify or reduce torque), efficiency daemon 2129C, regenerative braking daemon 2129D, regenerative damping daemon 2129E, etc.;

helper daemons which protect the machine, such as thermal management daemon 2129G, machine virtualization daemon 2129F which facilitates hardware virtualization (by coordinating and collaborating with embedded hardware virtualization daemons 2135 in hardware virtualization plane 2130); and safety daemons 2129H which provide safety overrides to ensure the safety of the vehicle and its drivers and passengers.

In addition, software control and virtualization plane 2120 includes a resource management supervisor 2128 which monitors resource usage and overrides and optimizes the various control plane tasks implemented by daemons 2129 to prevent the depletion of resources.

Machine virtualization tasks are carried out within hardware virtualization plane 2130. Hardware virtualization plane 2130 communicates with software control and virtualization plane 2120 through a predefined control and virtualization interface 2137. Hardware virtualization plane 2130 comprises a plurality of electric machines 2134 (e.g. there may be one such machine or motor 2134 installed in each wheel), each coupled to a corresponding inverter 2135 to supply electromagnetic waveforms to the machine. In addition, hardware virtualization plane 2130 also comprises hardware controller devices. These may include embedded hardware controller daemons 2135 for performing hardware torque control by adjusting in real time the instantaneous torque production on the active poles using a torque control algorithm. This is in contrast with software torque control performed at the software control and virtualization plane 2120 which examines resource requirements and performance criteria to schedule the activation of individual machines and issues torque commands to the embedded hardware controller daemons 2135 to perform the actual torque control. The hardware controller daemons 2135 also receive inputs from a plurality of sensor nodes 2138. Sensor nodes 2138 may include speed sensors, phase sensors, current and voltage sensors, and temperature sensors, providing output to hardware controller daemons 2135 to enable feedback and feedforward controls.

User plane 2110 provides an application layer on top of software control and virtualization plane 2120. User plane 2110 includes various applications 2115 which enable complex driving tasks such as cruise control, performance optimization, folding of the electric vehicle (for space saving when standing), perpendicular parking, collision avoidance, ride control, etc., to be performed autonomously or under user command 2119. In particular embodiments, higher level applications such as trip planning, battery extension, etc. can also be performed within user plane 2110. Applications 2115 are implemented via a set of application programming interfaces (APIs) 2118 which enable the application programs 2115 to call daemons 2129 at the software control and virtualization plane 2120 to perform desired tasks.

Particular advantages of the logical architecture of the control system 2100 outlined above can be appreciated when contrasted with the ad hoc architecture underlying a conventional electronically-controlled electric machine. For such conventional machines, the electric machine is typically directly energized by an inverter which provides the waveform for the machine. The inverter is in turn controlled by an embedded controller which controls a two loop feedback control: a slow loop (outer loop) which provides a feedback speed control according to a specific control algorithm, and a fast loop (inner loop) which controls the waveform generated by the inverter to control the instantaneous torque generation by the machine using another feedback control algorithm. Sensor inputs and user commands are intercepted by the controller which interprets such information and adjusts the control accordingly. Although such schemes may be capable of controlling the torque or speed of the electric machine to some extent, the speed and torque curve has a defined limiting performance envelope. Therefore, a conventional electric machine which is designed for low torque and high efficiency would generally require the help of a transmission system or a speed reduction gear box to output large torque when desired. Similarly, although the conventional electric machine control can provide regenerative braking, the machine would be unable to provide sufficient braking torque during regenerative braking to do away with mechanical brakes. Even when such machines are mechanically coupled to a gear box to provide torque amplification, such amplification is seldom large enough to generate sufficient braking torque for emergency stopping. Furthermore, even if a gear box is coupled to such a machine to provide sufficient braking torque, the constant abrupt gear switching would wear out the gear box within a short amount of time.

The software-defined motor architecture described herein is a development in electronically controlled electric machinery which enables extremely fast solid-state PWM-like switching between distinct hardware configurations to achieve continuous virtual hybridization of the underlying machine hardware.

Where a component (e.g. coil, winding, stator, rotor, core, flux barrier, tooth, pole, module, processor, program memory, power source, switch, diode, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which perform the function in the illustrated exemplary embodiments.

While a number of exemplary aspects and embodiments have been discussed above, those of skill in the art will recognize certain modifications, permutations, additions and sub-combinations thereof. For example:

The above-described embodiments provide a motor for driving an electric vehicle. However, the technology described herein can be applied to drive other types of vehicles or electric hybrid vehicles, or for non-vehicular applications such as rotary power tools, industrial rotary machines, robotics, household rotary appliances such as washers, dryers, and vacuum cleaners, aeronautics, shipping and marine engineering, space exploration, and the like.

The above-described embodiments use synchronous reluctance mode as the high efficiency mode and switched reluctance mode as the high torque mode. In addition to the hybrid synchronous reluctance/switched reluctance motor described above, other motor types or variations are possible and other binary combinations and combinations with more than two modes of operation are possible. For example, in some embodiments, permanent magnets can be placed in at least some of the slots/flux barriers of the rotor to bias the rotor for improvement in performance and efficiency of the motor. In other variants, the motor can include embedded magnets, or be electromagnetic-coil based (e.g. brushless DC electric motor, induction motor, permanent magnet synchronous motor, etc.), or be entirely magnet based (e.g. Halbach motor). Alternative combinations of modes may include rotor geometries with multiple periodicity permanent magnet configurations, multiple periodicity squirrel cage rotor configurations, and/or multiple periodicity rotor windings, and the like.

Since a flux barrier has a very low permeability (such as air), and a permanent magnet has a permeability close to one since it is already fully saturated, a permanent magnet could be mounted inside a flux barrier so that it would not affect the flux barrier characteristics. Preferably, the permanent magnet flux barrier is close to the air gap, which means that it is more suited for the switched reluctance flux barriers than synchronous reluctance barriers. However, this does not mean that those additional permanent magnets would only affect switched reluctance operations. On the contrary, whether the added permanent magnets would assist switched reluctance or synchronous reluctance operation depends on the spatial periodicity of the permanent magnet placement. If, for example, the permanent magnets are placed such that they all have the same polarity within the synchronous reluctance pitch, then they would resonate with the synchronous reluctance excitation and would have almost no effect on the switched reluctance operation. The added permanent magnets would provide a biased magnetic field, hence in the previous example, the synchronous reluctance operation would be bipolar since the permanent magnet's magnetic field would either subtract or add to the stator field. This allows both attraction and repulsion mechanism to work and can potentially increase the synchronous reluctance torque/power by more than a third since it is similar to having both a synchronous reluctance motor and a permanent magnet motor within the same core. However, since permanent magnets can be demagnetized at higher temperature, it may not be as robust. The mounting of the permanent magnets inside the flux barriers does solve one of the major weaknesses of the permanent magnet motor since the flux barrier would provide a natural housing for the embedded magnet, hence no mechanical bracing is required to secure the magnet and the same mechanical advantage of the reluctance motors relative to permanent magnet motors is maintained.

The embodiments described above include one stator core. In some embodiments there may be two substantially circular, symmetric non-rotating stator cores. A primary winding (e.g. synchronous reluctance coils) may be wound around one of the stator cores, while a secondary winding (e.g. switched reluctance coils) may be wound around the other one of the stator cores.

The embodiments described above include two distinct sets of flux barriers or slots: one set in resonance with the switched reluctance stator windings, and the other set in resonance with the synchronous reluctance stator windings. In some embodiments, some or all of these flux barriers may be replaced with explicitly salient poles. For example, switched reluctance flux barriers 301 (FIG. 5) or 601 (FIG. 11B) could be replaced by explicit salient pole structures with the same periodicity. In yet some embodiments, rotor saliencies may be produced by using highly anisotropic magnetic materials and properly orienting their major and minor magnetic axis to introduce different reluctance values at different rotor angles. Due to the higher number of stator saliencies desired for switched reluctance mode, the switched reluctance rotor saliency features (whether they are flux barriers or explicit saliencies on the rotor core) may be closer to the air gap since the magnetic field generated by the switched reluctance winding has a shorter penetration depth. The converse is true for synchronous reluctance rotor saliencies.

In some cases it may be possible to generalize the converter concept by turning on the armature current of a particular pole only when the phase reluctance associated with that pole is decreasing and vice versa, irrespective of the flux barrier type. With appropriate switches and control algorithm, this may improve the efficiency of motoring and regeneration of a hybrid synchronous reluctance/switched reluctance machine.

It may be possible in some cases to operate the motor contemporaneously in both the synchronous reluctance and switched reluctance modes without much interference to each other. For example this may be applicable for light loads where the armature currents are not sufficient to cause flux saturation. However, for heavy loads, it is preferable to use fast PWM-like switching between synchronous reluctance and switched reluctance modes to blend the distinct physical characteristics of the two modes. For example if the motor is already in the synchronous reluctance mode but the torque generated by the synchronous reluctance mode is insufficient for the load, then since the air gap flux has already reached saturation, any additional switched reluctance mode excitation would not increase the flux; it may be desirable to excite the synchronous reluctance and switched reluctance windings at different times. This could be accomplished with fast PWM-like switching as described herein.

It is therefore intended that the scope of the following appended claims and claims hereafter introduced should not be limited by the embodiments set forth in the examples, but should be given the broadest interpretation consistent with the description as a whole.

What is claimed is:

1. An electric motor configured so as to be capable of being electronically switched in rapid succession between operation in a high torque mode and operation in a low torque mode, a torque output of the motor higher in the high torque mode than in the low torque mode, the motor comprising:

a stator having first and second sets of armature windings, wherein the first set of armature windings comprise synchronous reluctance windings and the second set of armature windings comprise switched reluctance windings; and a rotor having first and second sets of flux barriers, each set of flux barriers adapted to shape a magnetic flux distribution generated by a corresponding one of the first and second sets of armature windings upon excitation of the windings;

wherein excitation of the switched reluctance windings causes the motor to operate as a switched reluctance motor with a high pole number in the high torque mode of operation and wherein excitation of the synchronous reluctance windings causes the same motor to operate as a synchronous reluctance motor in the low torque mode of operation and wherein to switch the motor between the high torque and low torque modes a first inverter and a first controller are connected to the switched reluctance windings and a second inverter and a second controller are connected to the synchronous reluctance windings, the first controller and the second controller controlling the excitation of their respective windings so that the switching time between the motor operating as the switched reluctance motor in the high torque of operation and the motor operating as the synchronous reluctance motor in the low torque mode of operation is within a few milliseconds; and a plurality of teeth circumferentially spaced apart around a rotation axis of the motor, wherein each of the switched reluctance windings is wrapped around a corresponding single tooth and each of the synchronous reluctance windings is wrapped around a corresponding plurality of adjacent teeth.

2. A motor according to claim 1 comprising a plurality of teeth circumferentially spaced apart around a rotation axis of the motor, wherein each of the switched reluctance windings is wrapped around a back iron of the stator in a corresponding location between a pair of circumferentially adjacent teeth and each of the synchronous reluctance windings is wrapped around a corresponding plurality of adjacent teeth.

3. A motor according to claim 1 wherein the one or more switched reluctance armature windings occupy less volume than the one or more synchronous reluctance windings.

4. A motor according to claim 1 wherein the stator and the rotor are axially located adjacent one another in an axial direction that is parallel to the rotation axis of the motor so that respective pole faces of the stator and the rotor face each other along the axial direction.

5. A motor according to claim 4 wherein the flux barriers are arranged to shape the magnetic flux distributions in the axial direction through the stator and the rotor.

6. A motor according to claim 5 wherein locations of the flux barriers along the axial direction vary periodically around a circumferential direction to promote sinusoidal reluctance variation.

7. A motor according to claim 1 wherein the stator and the rotor are concentrically located about the rotation axis of the motor so that respective pole faces of the stator and the rotor face each other along radial directions which are orthogonal to the rotation axis of the motor.

8. A motor according to claim 7 wherein the first set of flux barriers is located distally to the pole face area of the rotor to affect primarily the magnetic flux distribution generated by the synchronous reluctance windings.

9. A motor according to claim 8 wherein the second set of flux barriers is located proximally to the pole face area of the rotor to affect primarily the magnetic flux distribution generated by the switched reluctance windings.

10. A motor according to claim 1 wherein the switched reluctance windings comprise a higher number of alternating polarity coil pairs than the synchronous reluctance windings.

11. A motor according to claim 10 wherein the switched reluctance windings are located closer to a pole face area of the rotor than the synchronous reluctance windings.

12. A motor according to claim 1 wherein the flux barriers comprise slots, the motor comprising permanent magnets disposed in at least some of the slots.

\* \* \* \* \*